(12) United States Patent
Chaudhri et al.

(10) Patent No.: US 12,554,382 B2
(45) Date of Patent: *Feb. 17, 2026

(54) REMOTE USER INTERFACE

(71) Applicant: Apple Inc., Cupertino, CA (US)

(72) Inventors: Imran Chaudhri, San Francisco, CA (US); Stephen O. Lemay, Palo Alto, CA (US); Alan C. Dye, San Francisco, CA (US); Christopher Patrick Foss, San Francisco, CA (US); Lawrence Y. Yang, Bellevue, WA (US); David Chance Graham, Columbus, OH (US); Jonathan P. Ive, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,435

(22) Filed: May 24, 2024

(65) Prior Publication Data

US 2024/0310982 A1    Sep. 19, 2024

Related U.S. Application Data

(63) Continuation of application No. 17/975,141, filed on Oct. 27, 2022, now Pat. No. 12,093,515, which is a
(Continued)

(51) Int. Cl.
*G06F 3/04842*   (2022.01)
*G06F 3/0346*    (2013.01)
(Continued)

(52) U.S. Cl.
CPC ...... *G06F 3/04842* (2013.01); *G06F 3/04817* (2013.01); *G06F 3/0488* (2013.01);
(Continued)

(58) Field of Classification Search
CPC ............. G06F 3/04842; G06F 3/04817; G06F 3/0488; G06F 3/04883; G06F 3/0346;
(Continued)

(56) References Cited

U.S. PATENT DOCUMENTS 3,148,500 A    9/1964    Thomas
4,174,606 A    11/1979   Masuda et al.
(Continued)

FOREIGN PATENT DOCUMENTS

AU    2010249319 A1    6/2012
AU    2015101019 A4    9/2015
(Continued)

OTHER PUBLICATIONS

Non-Final Office Action received for U.S. Appl. No. 18/197,681, mailed on Apr. 3, 2025, 30 pages.
(Continued)

*Primary Examiner* — Ting Z Lee
(74) *Attorney, Agent, or Firm* — YHE Law LLP

(57) ABSTRACT

Target electronic devices can be remotely controlled using a personal electronic device are disclosed. The personal electronic device can identify target devices that are responsive to remote control. The personal electronic device displays graphical user interface objects that, when selected, cause the personal electronic device to instruct the target electronic device to perform an operation.

42 Claims, 33 Drawing Sheets

Related U.S. Application Data continuation of application No. 16/147,523, filed on Sep. 28, 2018, now Pat. No. 11,604,571, which is a continuation of application No. 14/805,403, filed on Jul. 21, 2015, now Pat. No. 10,135,905.

(60) Provisional application No. 62/129,798, filed on Mar. 7, 2015, provisional application No. 62/027,764, filed on Jul. 22, 2014, provisional application No. 62/027,145, filed on Jul. 21, 2014.

(51) Int. Cl.
*G06F 3/04817* (2022.01)
*G06F 3/0488* (2022.01)
*G06F 3/04883* (2022.01)
*H04L 67/025* (2022.01)
*H04M 1/72412* (2021.01)
*H04M 1/72415* (2021.01)
*H04M 1/72442* (2021.01)
*G06F 1/16* (2006.01)

(52) U.S. Cl.
CPC ........ *G06F 3/04883* (2013.01); *G06F 1/1626* (2013.01); *G06F 1/163* (2013.01); *G06F 1/1694* (2013.01); *G06F 3/0346* (2013.01); *G06F 2203/04105* (2013.01); *H04L 67/025* (2013.01); *H04M 1/72412* (2021.01); *H04M 1/72415* (2021.01); *H04M 1/72442* (2021.01); *H04M 2250/12* (2013.01); *H04M 2250/22* (2013.01)

(58) Field of Classification Search
CPC ...... G06F 1/1694; G06F 1/1626; G06F 1/163; G06F 2203/04105; H04L 67/025; H04M 1/72412; H04M 1/72415; H04M 1/72442; H04M 2250/12; H04M 2250/22
See application file for complete search history.

(56) References Cited

U.S. PATENT DOCUMENTS

| | | |
|---|---|---|
| 4,803,487 A | 2/1989 | Willard et al. |
| 5,208,790 A | 5/1993 | Sato et al. |
| 5,220,541 A | 6/1993 | Vuilleumier |
| 5,455,808 A | 10/1995 | Grupp et al. |
| 5,487,054 A | 1/1996 | Capps et al. |
| 5,508,979 A | 4/1996 | Eisenegger |
| 5,617,031 A | 4/1997 | Tuttle |
| 5,659,693 A | 8/1997 | Hansen et al. |
| 5,793,366 A | 8/1998 | Mano et al. |
| 5,825,353 A | 10/1998 | Will |
| 5,845,257 A | 12/1998 | Fu et al. |
| 5,853,327 A | 12/1998 | Gilboa |
| 5,870,683 A | 2/1999 | Wells et al. |
| 5,892,519 A | 4/1999 | Hirai et al. |
| 5,986,655 A | 11/1999 | Chiu et al. |
| 5,999,195 A | 12/1999 | Santangeli |
| 6,008,807 A | 12/1999 | Bretschneider et al. |
| 6,016,248 A | 1/2000 | Anzai et al. |
| 6,043,818 A | 3/2000 | Nakano et al. |
| 6,097,371 A | 8/2000 | Siddiqui et al. |
| 6,167,353 A | 12/2000 | Piernot et al. |
| 6,190,174 B1 | 2/2001 | Lam et al. |
| 6,199,012 B1 | 3/2001 | Hasegawa |
| 6,232,972 B1 | 5/2001 | Arcuri et al. |
| 6,359,837 B1 | 3/2002 | Tsukamoto |
| 6,359,839 B1 | 3/2002 | Schenk et al. |
| 6,416,471 B1 | 7/2002 | Kumar et al. |
| 6,429,896 B1 | 8/2002 | Aruga et al. |
| 6,449,219 B1 | 9/2002 | Hepp et al. |
| 6,477,117 B1 | 11/2002 | Narayanaswami et al. |
| 6,496,780 B1 | 12/2002 | Harris et al. |
| 6,522,347 B1 | 2/2003 | Sakai et al. |
| 6,556,222 B1 | 4/2003 | Narayanaswami |
| 6,650,894 B1 | 11/2003 | Berstis et al. |
| 6,728,533 B2 | 4/2004 | Ishii et al. |
| 6,809,724 B1 | 10/2004 | Shiraishi et al. |
| 6,809,759 B1 | 10/2004 | Chiang |
| 6,819,867 B2 | 11/2004 | Mayer et al. |
| 6,857,105 B1 | 2/2005 | Fox et al. |
| 6,871,076 B2 | 3/2005 | Samn et al. |
| 6,889,138 B1 | 5/2005 | Krull et al. |
| 7,036,090 B1 | 4/2006 | Nguyen |
| 7,203,380 B2 | 4/2007 | Chiu et al. |
| 7,257,254 B2 | 8/2007 | Tunney et al. |
| 7,463,304 B2 | 12/2008 | Murray |
| 7,515,509 B2 | 4/2009 | Klein et al. |
| 7,537,162 B1 | 5/2009 | Siu |
| 7,571,014 B1 | 8/2009 | Lambourne et al. |
| 7,593,749 B2 | 9/2009 | Vallström et al. |
| 7,593,755 B2 | 9/2009 | Colando et al. |
| 7,637,204 B2 | 12/2009 | Sumser et al. |
| 7,653,883 B2 | 1/2010 | Hotelling et al. |
| 7,656,393 B2 | 2/2010 | King et al. |
| 7,751,285 B1 | 7/2010 | Cain et al. |
| 7,843,471 B2 | 11/2010 | Doan et al. |
| 7,843,769 B2 | 11/2010 | Ishida et al. |
| 7,898,542 B1 | 3/2011 | Yu et al. |
| 7,905,815 B2 | 3/2011 | Ellis et al. |
| 8,105,208 B2 | 1/2012 | Oleson et al. |
| 8,189,087 B2 | 5/2012 | Misawa et al. |
| D661,612 S | 6/2012 | Asu et al. |
| 8,196,043 B2 | 6/2012 | Crow et al. |
| 8,290,603 B1 | 10/2012 | Lambourne |
| 8,364,855 B2 | 1/2013 | James et al. |
| 8,375,326 B2 | 2/2013 | Bucher et al. |
| 8,405,663 B2 | 3/2013 | Wikkerink et al. |
| 8,584,031 B2 | 11/2013 | Moore et al. |
| 8,595,649 B2 | 11/2013 | Sherrard et al. |
| 8,613,070 B1 | 12/2013 | Borzycki et al. |
| 8,624,836 B1 | 1/2014 | Miller et al. |
| 8,675,084 B2 | 3/2014 | Bolton et al. |
| 8,686,961 B2 | 4/2014 | Yamano |
| 8,732,609 B1 | 5/2014 | Bayersdorfer et al. |
| 8,742,890 B2 | 6/2014 | Gocho et al. |
| 8,762,895 B2 | 6/2014 | Mehta et al. |
| 8,811,951 B1 | 8/2014 | Faaborg et al. |
| 8,825,445 B2 | 9/2014 | Hoffman et al. |
| 8,866,761 B2 | 10/2014 | Enami |
| 8,868,338 B1 | 10/2014 | Chau et al. |
| 8,884,874 B1 | 11/2014 | Kim et al. |
| 8,894,462 B2 | 11/2014 | Huang et al. |
| 8,903,671 B2 | 12/2014 | Park et al. |
| 8,924,894 B1 | 12/2014 | Yaksick et al. |
| 8,963,894 B2 | 2/2015 | Klassen et al. |
| 8,983,539 B1 | 3/2015 | Kim et al. |
| 8,996,639 B1 | 3/2015 | Faaborg et al. |
| 9,070,092 B2 | 6/2015 | Shieh et al. |
| 9,071,945 B1 | 6/2015 | Rubin et al. |
| 9,100,944 B2 | 8/2015 | Sauhta et al. |
| 9,112,849 B1 | 8/2015 | Werkelin et al. |
| 9,141,270 B1 | 9/2015 | Stuart et al. |
| 9,146,124 B2 | 9/2015 | Parada et al. |
| 9,164,663 B1 | 10/2015 | Berard |
| 9,171,268 B1 | 10/2015 | Penilla et al. |
| 9,172,866 B2 | 10/2015 | Ito et al. |
| 9,173,052 B2 | 10/2015 | Hauser et al. |
| 9,191,988 B2 | 11/2015 | Newham |
| 9,223,296 B2 | 12/2015 | Yang et al. |
| 9,244,562 B1 | 1/2016 | Moscovich et al. |
| 9,329,831 B1 | 5/2016 | Fullerton et al. |
| 9,369,537 B1 | 6/2016 | Mathew et al. |
| 9,400,489 B2 | 7/2016 | Jihwan et al. |
| D765,118 S | 8/2016 | Bachman et al. |
| 9,405,766 B2 | 8/2016 | Robbin et al. |
| 9,423,868 B2 | 8/2016 | Iwasaki |
| 9,451,144 B2 | 9/2016 | Dye |
| 9,459,781 B2 | 10/2016 | Kocienda et al. |
| 9,462,340 B1 | 10/2016 | Mathurin |
| 9,477,208 B2 | 10/2016 | Park et al. |
| 9,489,074 B2 | 11/2016 | Oonishi |

(56) References Cited

U.S. PATENT DOCUMENTS

| | | | |
|---|---|---|---|
| 9,495,575 B2 | 11/2016 | Kim et al. | |
| D773,510 S | 12/2016 | Foss et al. | |
| 9,544,563 B1 | 1/2017 | Cheng et al. | |
| 9,547,419 B2 | 1/2017 | Yang et al. | |
| 9,547,425 B2 | 1/2017 | Kocienda et al. | |
| 9,560,629 B2 | 1/2017 | Migicovsky et al. | |
| 9,574,896 B2 | 2/2017 | Mcgavran et al. | |
| 9,582,165 B2 | 2/2017 | Wilson et al. | |
| 9,594,354 B1 | 3/2017 | Kahn et al. | |
| 9,628,950 B1 | 4/2017 | Noeth et al. | |
| 9,652,741 B2 | 5/2017 | Goldberg et al. | |
| D789,381 S | 6/2017 | Okumura et al. | |
| 9,704,386 B2 | 7/2017 | Yoon et al. | |
| 9,729,730 B2 | 8/2017 | Levesque et al. | |
| 9,753,543 B2 | 9/2017 | Jeon et al. | |
| 9,800,525 B1 | 10/2017 | Lerner et al. | |
| 9,820,323 B1 | 11/2017 | Young et al. | |
| 9,832,697 B2 | 11/2017 | Kotecha et al. | |
| 9,892,715 B2 | 2/2018 | Komulainen et al. | |
| 9,927,957 B1 | 3/2018 | Sagar et al. | |
| 9,942,463 B2 | 4/2018 | Kuo et al. | |
| 9,973,674 B2 | 5/2018 | Dye et al. | |
| 10,019,599 B1 | 7/2018 | Moran et al. | |
| 10,055,121 B2 | 8/2018 | Chaudhri et al. | |
| 10,135,905 B2 | 11/2018 | Chaudhri et al. | |
| 10,182,138 B2 | 1/2019 | Motika et al. | |
| 10,216,392 B2 | 2/2019 | Zhao | |
| 10,282,078 B2 | 5/2019 | Choi | |
| 10,299,300 B1 | 5/2019 | Young | |
| 10,310,697 B2 | 6/2019 | Roberts et al. | |
| 10,324,590 B2 | 6/2019 | Yang et al. | |
| 10,356,070 B2 | 7/2019 | Cha et al. | |
| 10,466,881 B2 | 11/2019 | Sasaki et al. | |
| 10,524,300 B2 | 12/2019 | Ueda et al. | |
| 10,627,914 B2 | 4/2020 | Ang et al. | |
| 10,643,246 B1 | 5/2020 | Suprasadachandran Pillai | |
| 10,671,174 B2 | 6/2020 | Ang et al. | |
| 10,684,693 B2 | 6/2020 | Kletsov et al. | |
| 10,691,332 B2 | 6/2020 | Offenberg et al. | |
| 10,721,711 B2 | 7/2020 | Kirov et al. | |
| 10,802,598 B2 | 10/2020 | Ang et al. | |
| 10,966,149 B2 | 3/2021 | Yoon et al. | |
| 11,048,334 B2 | 6/2021 | Rothberg et al. | |
| 11,050,873 B2 | 6/2021 | Kim et al. | |
| 11,099,647 B2 | 8/2021 | Ang et al. | |
| 11,543,887 B2 | 1/2023 | Ang et al. | |
| 11,868,531 B1 | 1/2024 | Tasci | |
| 2001/0030597 A1 | 10/2001 | Inoue et al. | |
| 2001/0031622 A1 | 10/2001 | Kivela et al. | |
| 2002/0038384 A1 | 3/2002 | Khan et al. | |
| 2002/0054066 A1 | 5/2002 | Kikinis et al. | |
| 2002/0054541 A1 | 5/2002 | Hall et al. | |
| 2002/0068600 A1 | 6/2002 | Chihara et al. | |
| 2002/0081976 A1 | 6/2002 | Fujisawa et al. | |
| 2002/0098857 A1 | 7/2002 | Ishii | |
| 2002/0115478 A1 | 8/2002 | Fujisawa et al. | |
| 2002/0131331 A1 | 9/2002 | Molander et al. | |
| 2002/0140633 A1 | 10/2002 | Rafii et al. | |
| 2002/0140803 A1 | 10/2002 | Gutta et al. | |
| 2002/0142734 A1 | 10/2002 | Wickstead | |
| 2002/0171737 A1 | 11/2002 | Tullis et al. | |
| 2002/0180797 A1 | 12/2002 | Bachmann | |
| 2003/0025802 A1 | 2/2003 | Mayer, Jr. et al. | |
| 2003/0027621 A1 | 2/2003 | Libby et al. | |
| 2003/0067497 A1 | 4/2003 | Pichon et al. | |
| 2003/0074647 A1 | 4/2003 | Andrew et al. | |
| 2003/0079057 A1 | 4/2003 | Ruskin et al. | |
| 2003/0081506 A1 | 5/2003 | Karhu et al. | |
| 2003/0128237 A1 | 7/2003 | Sakai | |
| 2003/0151982 A1 | 8/2003 | Brewer et al. | |
| 2003/0158927 A1 | 8/2003 | Sagey et al. | |
| 2003/0164847 A1 | 9/2003 | Zaima et al. | |
| 2003/0171984 A1 | 9/2003 | Wodka et al. | |
| 2003/0182628 A1 | 9/2003 | Lira | |
| 2003/0214885 A1 | 11/2003 | Powell et al. | |
| 2004/0001105 A1 | 1/2004 | Chew et al. | |
| 2004/0017733 A1 | 1/2004 | Sullivan | |
| 2004/0021699 A1 | 2/2004 | Fildebrandt et al. | |
| 2004/0027396 A1 | 2/2004 | Lection | |
| 2004/0044953 A1 | 3/2004 | Watkins et al. | |
| 2004/0047244 A1 | 3/2004 | Tino et al. | |
| 2004/0077462 A1 | 4/2004 | Brown et al. | |
| 2004/0100389 A1 | 5/2004 | Naito et al. | |
| 2004/0192332 A1 | 9/2004 | Samn | |
| 2004/0218472 A1 | 11/2004 | Narayanaswami et al. | |
| 2004/0264916 A1 | 12/2004 | Van et al. | |
| 2005/0015803 A1 | 1/2005 | Macrae et al. | |
| 2005/0041667 A1 | 2/2005 | Miller et al. | |
| 2005/0117601 A1 | 6/2005 | Anderson et al. | |
| 2005/0125744 A1 | 6/2005 | Hubbard et al. | |
| 2005/0134695 A1 | 6/2005 | Deshpande et al. | |
| 2005/0168566 A1 | 8/2005 | Tada et al. | |
| 2005/0188856 A1 | 9/2005 | Sumser et al. | |
| 2005/0197063 A1 | 9/2005 | White et al. | |
| 2005/0198319 A1 | 9/2005 | Chan et al. | |
| 2005/0200611 A1 | 9/2005 | Goto et al. | |
| 2005/0237194 A1 | 10/2005 | Voba et al. | |
| 2005/0246642 A1 | 11/2005 | Valderas et al. | |
| 2005/0278757 A1 | 12/2005 | Grossman et al. | |
| 2006/0019649 A1 | 1/2006 | Feinleib et al. | |
| 2006/0035632 A1 | 2/2006 | Sorvari et al. | |
| 2006/0055700 A1 | 3/2006 | Niles et al. | |
| 2006/0069604 A1 | 3/2006 | Leukart et al. | |
| 2006/0079973 A1 | 4/2006 | Bacharach et al. | |
| 2006/0085765 A1 | 4/2006 | Peterson et al. | |
| 2006/0092770 A1 | 5/2006 | Demas | |
| 2006/0098634 A1 | 5/2006 | Umemoto et al. | |
| 2006/0132456 A1 | 6/2006 | Anson | |
| 2006/0135064 A1 | 6/2006 | Cho et al. | |
| 2006/0160090 A1 | 7/2006 | Macina et al. | |
| 2006/0197753 A1 | 9/2006 | Hotelling | |
| 2006/0210092 A1 | 9/2006 | Navid | |
| 2006/0214935 A1 | 9/2006 | Boyd et al. | |
| 2006/0217104 A1 | 9/2006 | Cho | |
| 2007/0006096 A1 | 1/2007 | Kim et al. | |
| 2007/0021153 A1 | 1/2007 | Novak | |
| 2007/0025711 A1 | 2/2007 | Marcus et al. | |
| 2007/0030256 A1 | 2/2007 | Akaike et al. | |
| 2007/0040810 A1 | 2/2007 | Dowe et al. | |
| 2007/0082707 A1 | 4/2007 | Flynt et al. | |
| 2007/0094330 A1 | 4/2007 | Russell et al. | |
| 2007/0096283 A1 | 5/2007 | Ljung et al. | |
| 2007/0097113 A1 | 5/2007 | Lee et al. | |
| 2007/0109417 A1 | 5/2007 | Hyttfors et al. | |
| 2007/0143495 A1 | 6/2007 | Porat | |
| 2007/0150842 A1 | 6/2007 | Chaudhri et al. | |
| 2007/0152979 A1 | 7/2007 | Jobs et al. | |
| 2007/0157103 A1 | 7/2007 | Arneson et al. | |
| 2007/0162872 A1 | 7/2007 | Hong et al. | |
| 2007/0165103 A1 | 7/2007 | Arima et al. | |
| 2007/0180392 A1 | 8/2007 | Russo | |
| 2007/0191008 A1 | 8/2007 | Bucher et al. | |
| 2007/0213955 A1 | 9/2007 | Ishida et al. | |
| 2007/0239754 A1 | 10/2007 | Schnitman et al. | |
| 2007/0254640 A1 | 11/2007 | Bliss | |
| 2007/0259654 A1 | 11/2007 | Oijer | |
| 2007/0279190 A1 | 12/2007 | Lugt et al. | |
| 2008/0004113 A1 | 1/2008 | Avery et al. | |
| 2008/0024459 A1 | 1/2008 | Poupyrev et al. | |
| 2008/0033779 A1 | 2/2008 | Coffman et al. | |
| 2008/0046839 A1 | 2/2008 | Mehra et al. | |
| 2008/0052643 A1 | 2/2008 | Ike et al. | |
| 2008/0055263 A1 | 3/2008 | Lemay et al. | |
| 2008/0057926 A1 | 3/2008 | Forstall et al. | |
| 2008/0062141 A1 | 3/2008 | Chaudhri | |
| 2008/0076637 A1 | 3/2008 | Gilley et al. | |
| 2008/0077673 A1 | 3/2008 | Thomas et al. | |
| 2008/0082934 A1 | 4/2008 | Kocienda et al. | |
| 2008/0098313 A1 | 4/2008 | Pollack | |
| 2008/0100693 A1 | 5/2008 | Jobs et al. | |
| 2008/0120029 A1 | 5/2008 | Zelek et al. | |
| 2008/0122796 A1 | 5/2008 | Jobs et al. | |
| 2008/0127268 A1 | 5/2008 | Bergeron et al. | |
| 2008/0155428 A1 | 6/2008 | Lee | |

(56) References Cited

U.S. PATENT DOCUMENTS

| | | |
|---|---|---|
| 2008/0165136 A1 | 7/2008 | Christie et al. |
| 2008/0168396 A1 | 7/2008 | Matas et al. |
| 2008/0168404 A1 | 7/2008 | Ording |
| 2008/0172634 A1 | 7/2008 | Choi et al. |
| 2008/0186808 A1 | 8/2008 | Lee |
| 2008/0192021 A1 | 8/2008 | Lim et al. |
| 2008/0214191 A1 | 9/2008 | Yach et al. |
| 2008/0219151 A1 | 9/2008 | Ma et al. |
| 2008/0246778 A1 | 10/2008 | Ham et al. |
| 2008/0259829 A1 | 10/2008 | Rosenblatt |
| 2008/0284855 A1 | 11/2008 | Umeyama et al. |
| 2008/0305742 A1 | 12/2008 | Basir |
| 2009/0011821 A1 | 1/2009 | Griswold et al. |
| 2009/0051649 A1 | 2/2009 | Rondel |
| 2009/0060170 A1 | 3/2009 | Coughlan et al. |
| 2009/0068984 A1 | 3/2009 | Burnett |
| 2009/0088207 A1 | 4/2009 | Sweeney et al. |
| 2009/0100342 A1 | 4/2009 | Jakobson et al. |
| 2009/0102933 A1 | 4/2009 | Harris et al. |
| 2009/0141046 A1 | 6/2009 | Rathnam et al. |
| 2009/0143114 A1 | 6/2009 | Vargas et al. |
| 2009/0144391 A1 | 6/2009 | Jung et al. |
| 2009/0144639 A1 | 6/2009 | Nims et al. |
| 2009/0164923 A1 | 6/2009 | Ovi et al. |
| 2009/0174680 A1 | 7/2009 | Anzures et al. |
| 2009/0177538 A1 | 7/2009 | Brewer et al. |
| 2009/0178007 A1 | 7/2009 | Matas et al. |
| 2009/0189915 A1 | 7/2009 | Mercer et al. |
| 2009/0195402 A1 | 8/2009 | Izadi et al. |
| 2009/0195497 A1 | 8/2009 | Fitzgerald et al. |
| 2009/0199130 A1 | 8/2009 | Tsern et al. |
| 2009/0203315 A1 | 8/2009 | Kawabata et al. |
| 2009/0207743 A1 | 8/2009 | Huq et al. |
| 2009/0216556 A1 | 8/2009 | Martin et al. |
| 2009/0222748 A1 | 9/2009 | Lejeune et al. |
| 2009/0225060 A1 | 9/2009 | Rizoiu et al. |
| 2009/0228868 A1 | 9/2009 | Forstall et al. |
| 2009/0231356 A1 | 9/2009 | Barnes et al. |
| 2009/0231960 A1 | 9/2009 | Hutcheson |
| 2009/0239587 A1 | 9/2009 | Negron et al. |
| 2009/0244015 A1 | 10/2009 | Sengupta et al. |
| 2009/0249247 A1 | 10/2009 | Tseng et al. |
| 2009/0254624 A1 | 10/2009 | Baudin et al. |
| 2009/0256780 A1 | 10/2009 | Small et al. |
| 2009/0259958 A1 | 10/2009 | Ban |
| 2009/0262088 A1 | 10/2009 | Moll-Carrillo et al. |
| 2009/0284476 A1 | 11/2009 | Bull et al. |
| 2009/0300513 A1 | 12/2009 | Nims et al. |
| 2009/0305732 A1 | 12/2009 | Marcellino et al. |
| 2009/0311993 A1 | 12/2009 | Horodezky |
| 2009/0313299 A1 | 12/2009 | Bonev et al. |
| 2009/0315671 A1 | 12/2009 | Gocho et al. |
| 2009/0325630 A1 | 12/2009 | Tiitola et al. |
| 2009/0327886 A1 | 12/2009 | Whytock et al. |
| 2010/0017748 A1 | 1/2010 | Taylor et al. |
| 2010/0026640 A1 | 2/2010 | Kim et al. |
| 2010/0048358 A1 | 2/2010 | Tchao et al. |
| 2010/0050086 A1 | 2/2010 | Sherrard et al. |
| 2010/0054497 A1 | 3/2010 | Bull et al. |
| 2010/0064255 A1 | 3/2010 | Rottler et al. |
| 2010/0085203 A1 | 4/2010 | Kahn et al. |
| 2010/0099462 A1 | 4/2010 | Baek et al. |
| 2010/0107070 A1 | 4/2010 | Devineni et al. |
| 2010/0110082 A1 | 5/2010 | Myrick et al. |
| 2010/0114974 A1 | 5/2010 | Jung et al. |
| 2010/0123724 A1 | 5/2010 | Moore et al. |
| 2010/0125785 A1 | 5/2010 | Moore et al. |
| 2010/0125811 A1 | 5/2010 | Moore et al. |
| 2010/0138764 A1 | 6/2010 | Hatambeiki et al. |
| 2010/0138780 A1 | 6/2010 | Marano et al. |
| 2010/0141606 A1 | 6/2010 | Bae et al. |
| 2010/0146463 A1 | 6/2010 | Cho et al. |
| 2010/0149090 A1 | 6/2010 | Morris et al. |
| 2010/0156807 A1 | 6/2010 | Stallings et al. |
| 2010/0156833 A1 | 6/2010 | Kim et al. |
| 2010/0157742 A1 | 6/2010 | Relyea et al. |
| 2010/0162160 A1 | 6/2010 | Stallings et al. |
| 2010/0169790 A1 | 7/2010 | Vaughan et al. |
| 2010/0175006 A1 | 7/2010 | Li |
| 2010/0178873 A1 | 7/2010 | Lee et al. |
| 2010/0194692 A1 | 8/2010 | Orr et al. |
| 2010/0198453 A1 | 8/2010 | Dorogusker et al. |
| 2010/0205563 A1 | 8/2010 | Haapsaari et al. |
| 2010/0226213 A1 | 9/2010 | Drugge |
| 2010/0228836 A1 | 9/2010 | Lehtovirta et al. |
| 2010/0235726 A1 | 9/2010 | Ording et al. |
| 2010/0243516 A1 | 9/2010 | Martin et al. |
| 2010/0251176 A1 | 9/2010 | Fong et al. |
| 2010/0269108 A1 | 10/2010 | Boudreau et al. |
| 2010/0271312 A1 | 10/2010 | Alameh et al. |
| 2010/0271343 A1 | 10/2010 | Nagashima et al. |
| 2010/0281374 A1 | 11/2010 | Schulz et al. |
| 2010/0284389 A1 | 11/2010 | Ramsay et al. |
| 2010/0287513 A1 | 11/2010 | Singh et al. |
| 2010/0289740 A1 | 11/2010 | Kim et al. |
| 2010/0289910 A1 | 11/2010 | Kamshilin et al. |
| 2010/0292600 A1 | 11/2010 | Dibenedetto et al. |
| 2010/0295789 A1 | 11/2010 | Shin et al. |
| 2010/0295803 A1 | 11/2010 | Kim et al. |
| 2010/0299436 A1 | 11/2010 | Khalid et al. |
| 2010/0304729 A1 | 12/2010 | Sabotta et al. |
| 2010/0321201 A1 | 12/2010 | Huang et al. |
| 2011/0003587 A1 | 1/2011 | Belz et al. |
| 2011/0003665 A1 | 1/2011 | Burton et al. |
| 2011/0007611 A1 | 1/2011 | Kato et al. |
| 2011/0012772 A1* | 1/2011 | Chuang .................. G08C 23/04 341/176 |
| 2011/0016425 A1 | 1/2011 | Homburg et al. |
| 2011/0018695 A1 | 1/2011 | Bells et al. |
| 2011/0029750 A1 | 2/2011 | Jang et al. |
| 2011/0029870 A1 | 2/2011 | May et al. |
| 2011/0037712 A1 | 2/2011 | Kim et al. |
| 2011/0047014 A1 | 2/2011 | De Angelo |
| 2011/0057903 A1 | 3/2011 | Yamano et al. |
| 2011/0058052 A1 | 3/2011 | Bolton et al. |
| 2011/0059769 A1 | 3/2011 | Brunolli |
| 2011/0061017 A1 | 3/2011 | Ullrich et al. |
| 2011/0071818 A1 | 3/2011 | Jiang |
| 2011/0074699 A1 | 3/2011 | Marr et al. |
| 2011/0078622 A1 | 3/2011 | Missig et al. |
| 2011/0080411 A1 | 4/2011 | Wikkerink et al. |
| 2011/0081860 A1 | 4/2011 | Brown et al. |
| 2011/0081923 A1 | 4/2011 | Bednar et al. |
| 2011/0098928 A1 | 4/2011 | Hoffman et al. |
| 2011/0106921 A1 | 5/2011 | Brown et al. |
| 2011/0111735 A1 | 5/2011 | Pietrow |
| 2011/0115721 A1 | 5/2011 | Li et al. |
| 2011/0115932 A1 | 5/2011 | Shin et al. |
| 2011/0130168 A1 | 6/2011 | Vendrow et al. |
| 2011/0138284 A1 | 6/2011 | Wigdor et al. |
| 2011/0138329 A1 | 6/2011 | Wells et al. |
| 2011/0151415 A1 | 6/2011 | Darling et al. |
| 2011/0153628 A1 | 6/2011 | Basu et al. |
| 2011/0157046 A1 | 6/2011 | Lee et al. |
| 2011/0157055 A1* | 6/2011 | Tilley .................. G06F 3/04883 345/173 |
| 2011/0159469 A1 | 6/2011 | Hwang et al. |
| 2011/0159927 A1 | 6/2011 | Choi |
| 2011/0167369 A1 | 7/2011 | Van Os |
| 2011/0167382 A1 | 7/2011 | Van Os |
| 2011/0175832 A1 | 7/2011 | Miyazawa et al. |
| 2011/0181520 A1 | 7/2011 | Boda et al. |
| 2011/0181521 A1 | 7/2011 | Reid et al. |
| 2011/0183613 A1 | 7/2011 | Nocera |
| 2011/0183650 A1 | 7/2011 | Mckee |
| 2011/0191695 A1 | 8/2011 | Dinka et al. |
| 2011/0197165 A1 | 8/2011 | Filippov et al. |
| 2011/0202861 A1 | 8/2011 | Fritzley et al. |
| 2011/0202883 A1 | 8/2011 | Oh et al. |
| 2011/0205182 A1 | 8/2011 | Miyazawa et al. |
| 2011/0205851 A1 | 8/2011 | Harris |
| 2011/0225492 A1 | 9/2011 | Boettcher et al. |
| 2011/0227872 A1 | 9/2011 | Huska et al. |
| 2011/0234633 A1 | 9/2011 | Ogura et al. |

(56) References Cited

U.S. PATENT DOCUMENTS

| | | |
|---|---|---|
| 2011/0237221 A1 | 9/2011 | Prakash et al. |
| 2011/0252146 A1 | 10/2011 | Santamaria et al. |
| 2011/0252318 A1 | 10/2011 | Helms |
| 2011/0265002 A1 | 10/2011 | Hong et al. |
| 2011/0279852 A1 | 11/2011 | Oda et al. |
| 2011/0281568 A1 | 11/2011 | Le |
| 2011/0285656 A1 | 11/2011 | Yaksick et al. |
| 2011/0302518 A1 | 12/2011 | Zhang |
| 2011/0306393 A1 | 12/2011 | Goldman et al. |
| 2011/0306421 A1 | 12/2011 | Nishimoto et al. |
| 2011/0316858 A1 | 12/2011 | Shen et al. |
| 2011/0316884 A1 | 12/2011 | Giambalvo et al. |
| 2012/0011449 A1 | 1/2012 | Sasson et al. |
| 2012/0015779 A1 | 1/2012 | Powch et al. |
| 2012/0019400 A1 | 1/2012 | Patel et al. |
| 2012/0019513 A1 | 1/2012 | Fong et al. |
| 2012/0019610 A1 | 1/2012 | Hornyak et al. |
| 2012/0026110 A1 | 2/2012 | Yamano et al. |
| 2012/0028707 A1 | 2/2012 | Raitt et al. |
| 2012/0040719 A1 | 2/2012 | Lee et al. |
| 2012/0044062 A1 | 2/2012 | Jersa et al. |
| 2012/0051560 A1 | 3/2012 | Sanders |
| 2012/0052921 A1 | 3/2012 | Lim et al. |
| 2012/0054651 A1 | 3/2012 | Tsai |
| 2012/0059664 A1 | 3/2012 | Georgiev et al. |
| 2012/0059787 A1 | 3/2012 | Brown et al. |
| 2012/0066629 A1 | 3/2012 | Lee et al. |
| 2012/0069206 A1 | 3/2012 | Hsieh |
| 2012/0071146 A1 | 3/2012 | Shrivastava et al. |
| 2012/0071770 A1 | 3/2012 | Grey et al. |
| 2012/0084692 A1 | 4/2012 | Bae |
| 2012/0084729 A1 | 4/2012 | Lin et al. |
| 2012/0089300 A1 | 4/2012 | Wolterman et al. |
| 2012/0092383 A1 | 4/2012 | Hysek et al. |
| 2012/0096069 A1 | 4/2012 | Chan |
| 2012/0102399 A1 | 4/2012 | Nicholson |
| 2012/0105358 A1 | 5/2012 | Momeyer et al. |
| 2012/0113008 A1 | 5/2012 | Makinen et al. |
| 2012/0115608 A1 | 5/2012 | Pfeifer et al. |
| 2012/0117507 A1 | 5/2012 | Tseng et al. |
| 2012/0120277 A1 | 5/2012 | Tsai et al. |
| 2012/0124499 A1 | 5/2012 | Tsai et al. |
| 2012/0146899 A1* | 6/2012 | Teng .................. G06F 3/014 345/157 |
| 2012/0154293 A1 | 6/2012 | Hinckley et al. |
| 2012/0159380 A1 | 6/2012 | Kocienda et al. |
| 2012/0167008 A1 | 6/2012 | Zaman et al. |
| 2012/0192094 A1 | 7/2012 | Goertz et al. |
| 2012/0197419 A1 | 8/2012 | Dhruv et al. |
| 2012/0198531 A1 | 8/2012 | Ort et al. |
| 2012/0204123 A1 | 8/2012 | Bauer et al. |
| 2012/0214458 A1 | 8/2012 | Levien et al. |
| 2012/0218177 A1 | 8/2012 | Pang et al. |
| 2012/0218201 A1 | 8/2012 | Tamas et al. |
| 2012/0223890 A1 | 9/2012 | Borovsky et al. |
| 2012/0223935 A1 | 9/2012 | Renwick et al. |
| 2012/0236037 A1 | 9/2012 | Lessing et al. |
| 2012/0254263 A1 | 10/2012 | Hiestermann et al. |
| 2012/0254318 A1 | 10/2012 | Poniatowskl |
| 2012/0254804 A1 | 10/2012 | Sheha et al. |
| 2012/0266093 A1 | 10/2012 | Park et al. |
| 2012/0287290 A1 | 11/2012 | Jain et al. |
| 2012/0290109 A1 | 11/2012 | Engelberg et al. |
| 2012/0304084 A1 | 11/2012 | Kim et al. |
| 2012/0316777 A1 | 12/2012 | Kitta et al. |
| 2012/0320141 A1 | 12/2012 | Bowen et al. |
| 2012/0322508 A1 | 12/2012 | Forstall et al. |
| 2012/0324357 A1 | 12/2012 | Viegers et al. |
| 2012/0324390 A1 | 12/2012 | Tao et al. |
| 2013/0014019 A1 | 1/2013 | Kim et al. |
| 2013/0016048 A1 | 1/2013 | So et al. |
| 2013/0016818 A1 | 1/2013 | Cohn |
| 2013/0017846 A1 | 1/2013 | Schoppe |
| 2013/0019175 A1 | 1/2013 | Kotler et al. |
| 2013/0024781 A1 | 1/2013 | Douillet et al. |
| 2013/0024802 A1 | 1/2013 | Zeng et al. |
| 2013/0026293 A1 | 1/2013 | Schneider et al. |
| 2013/0027341 A1 | 1/2013 | Mastandrea |
| 2013/0027412 A1 | 1/2013 | Roddy |
| 2013/0038771 A1 | 2/2013 | Brunner et al. |
| 2013/0044080 A1 | 2/2013 | Chiang |
| 2013/0046397 A1 | 2/2013 | Fadell et al. |
| 2013/0050263 A1 | 2/2013 | Khoe et al. |
| 2013/0057472 A1 | 3/2013 | Dizac et al. |
| 2013/0057566 A1 | 3/2013 | Kriese et al. |
| 2013/0063364 A1 | 3/2013 | Moore |
| 2013/0063366 A1 | 3/2013 | Paul |
| 2013/0063383 A1 | 3/2013 | Anderssonreimer et al. |
| 2013/0065482 A1 | 3/2013 | Trickett et al. |
| 2013/0067391 A1 | 3/2013 | Pittappilly et al. |
| 2013/0067407 A1 | 3/2013 | Dehmann |
| 2013/0069893 A1 | 3/2013 | Brinda et al. |
| 2013/0076591 A1 | 3/2013 | Sirpal et al. |
| 2013/0076757 A1 | 3/2013 | Pritting |
| 2013/0082965 A1 | 4/2013 | Wada et al. |
| 2013/0085931 A1 | 4/2013 | Runyan |
| 2013/0091205 A1 | 4/2013 | Kotler et al. |
| 2013/0093715 A1 | 4/2013 | Marsden et al. |
| 2013/0093904 A1 | 4/2013 | Wagner et al. |
| 2013/0103797 A1 | 4/2013 | Park et al. |
| 2013/0106603 A1 | 5/2013 | Weast et al. |
| 2013/0107674 A1 | 5/2013 | Gossweiler et al. |
| 2013/0111550 A1 | 5/2013 | Naveh et al. |
| 2013/0116967 A1 | 5/2013 | Akcasu et al. |
| 2013/0117058 A1 | 5/2013 | Norton et al. |
| 2013/0117383 A1 | 5/2013 | Hymel et al. |
| 2013/0117693 A1 | 5/2013 | Anderson et al. |
| 2013/0120106 A1 | 5/2013 | Cauwels et al. |
| 2013/0121119 A1 | 5/2013 | Umamoto |
| 2013/0125016 A1 | 5/2013 | Pallakoff et al. |
| 2013/0134212 A1 | 5/2013 | Chang et al. |
| 2013/0137073 A1 | 5/2013 | Nacey et al. |
| 2013/0138272 A1 | 5/2013 | Louise-Babando et al. |
| 2013/0141325 A1 | 6/2013 | Bailey et al. |
| 2013/0141331 A1 | 6/2013 | Shiu et al. |
| 2013/0141362 A1 | 6/2013 | Asanuma et al. |
| 2013/0141365 A1 | 6/2013 | Lynn et al. |
| 2013/0141371 A1 | 6/2013 | Hallford et al. |
| 2013/0142495 A1 | 6/2013 | Terai |
| 2013/0143512 A1 | 6/2013 | Hernandez et al. |
| 2013/0145316 A1 | 6/2013 | Heo |
| 2013/0157729 A1 | 6/2013 | Tabe |
| 2013/0162411 A1 | 6/2013 | Moses et al. |
| 2013/0166679 A1 | 6/2013 | Kuwahara et al. |
| 2013/0168444 A1 | 7/2013 | Hsieh et al. |
| 2013/0169870 A1 | 7/2013 | Lee et al. |
| 2013/0170324 A1 | 7/2013 | Tu et al. |
| 2013/0173699 A1 | 7/2013 | Parks et al. |
| 2013/0174044 A1 | 7/2013 | Hill |
| 2013/0191785 A1 | 7/2013 | Wu et al. |
| 2013/0197679 A1 | 8/2013 | Balakrishnan et al. |
| 2013/0201098 A1 | 8/2013 | Schilit et al. |
| 2013/0205194 A1 | 8/2013 | Decker et al. |
| 2013/0205210 A1 | 8/2013 | Jeon et al. |
| 2013/0209972 A1 | 8/2013 | Carter et al. |
| 2013/0212492 A1 | 8/2013 | Chen et al. |
| 2013/0215044 A1 | 8/2013 | Ahn et al. |
| 2013/0219285 A1 | 8/2013 | Iwasaki et al. |
| 2013/0219303 A1 | 8/2013 | Eriksson et al. |
| 2013/0222270 A1 | 8/2013 | Winkler et al. |
| 2013/0223279 A1 | 8/2013 | Tinnakornsrisuphap et al. |
| 2013/0225152 A1 | 8/2013 | Matthews et al. |
| 2013/0227412 A1 | 8/2013 | Ornstein et al. |
| 2013/0234924 A1 | 9/2013 | Janefalkar et al. |
| 2013/0234929 A1 | 9/2013 | Libin |
| 2013/0234969 A1 | 9/2013 | Yeh et al. |
| 2013/0243924 A1 | 9/2013 | Bhandari et al. |
| 2013/0244633 A1 | 9/2013 | Jacobs et al. |
| 2013/0254705 A1 | 9/2013 | Mooring et al. |
| 2013/0262298 A1 | 10/2013 | Morley et al. |
| 2013/0263043 A1 | 10/2013 | Sarbin et al. |
| 2013/0275875 A1 | 10/2013 | Gruber et al. |
| 2013/0286251 A1 | 10/2013 | Wood et al. |
| 2013/0314204 A1 | 11/2013 | Ho et al. |

(56) References Cited

U.S. PATENT DOCUMENTS

| | | |
|---|---|---|
| 2013/0314302 A1 | 11/2013 | Jeung et al. |
| 2013/0318158 A1 | 11/2013 | Teng et al. |
| 2013/0325524 A1 | 12/2013 | Boudville |
| 2013/0326418 A1 | 12/2013 | Utsuki et al. |
| 2013/0329074 A1 | 12/2013 | Zhang et al. |
| 2013/0329924 A1 | 12/2013 | Fleizach et al. |
| 2013/0331130 A1* | 12/2013 | Lee ............... A61K 31/196 455/457 |
| 2013/0339436 A1 | 12/2013 | Gray |
| 2013/0345978 A1 | 12/2013 | Lush et al. |
| 2013/0346882 A1 | 12/2013 | Shiplacoff et al. |
| 2014/0006949 A1 | 1/2014 | Briand et al. |
| 2014/0007021 A1 | 1/2014 | Akiyama et al. |
| 2014/0013414 A1 | 1/2014 | Bruck et al. |
| 2014/0015546 A1 | 1/2014 | Frederick et al. |
| 2014/0015784 A1 | 1/2014 | Oonishi |
| 2014/0022399 A1 | 1/2014 | Rashid et al. |
| 2014/0028546 A1 | 1/2014 | Jeon et al. |
| 2014/0032706 A1 | 1/2014 | Kuscher et al. |
| 2014/0033100 A1 | 1/2014 | Noda et al. |
| 2014/0036639 A1 | 2/2014 | Boni et al. |
| 2014/0037107 A1 | 2/2014 | Marino et al. |
| 2014/0040831 A1* | 2/2014 | Akasaka ............... G08C 17/02 715/841 |
| 2014/0043367 A1 | 2/2014 | Sakaino et al. |
| 2014/0045463 A1 | 2/2014 | Hsieh et al. |
| 2014/0047525 A1 | 2/2014 | Bonhoff |
| 2014/0055388 A1 | 2/2014 | Yook et al. |
| 2014/0057569 A1 | 2/2014 | Toivanen et al. |
| 2014/0059125 A1 | 2/2014 | Hillier |
| 2014/0059493 A1 | 2/2014 | Kim |
| 2014/0068526 A1 | 3/2014 | Figelman et al. |
| 2014/0068755 A1 | 3/2014 | King et al. |
| 2014/0073252 A1 | 3/2014 | Lee et al. |
| 2014/0073256 A1 | 3/2014 | Newham et al. |
| 2014/0074570 A1 | 3/2014 | Hope et al. |
| 2014/0075003 A1 | 3/2014 | Tanaka et al. |
| 2014/0075311 A1 | 3/2014 | Boettcher et al. |
| 2014/0078371 A1 | 3/2014 | Kinoshita |
| 2014/0082533 A1 | 3/2014 | Kelley et al. |
| 2014/0084857 A1 | 3/2014 | Liu et al. |
| 2014/0095225 A1 | 4/2014 | Williams et al. |
| 2014/0101169 A1 | 4/2014 | Kurata et al. |
| 2014/0104449 A1 | 4/2014 | Masarik et al. |
| 2014/0118563 A1 | 5/2014 | Mehta et al. |
| 2014/0122331 A1 | 5/2014 | Vaish et al. |
| 2014/0123005 A1 | 5/2014 | Forstall et al. |
| 2014/0123043 A1 | 5/2014 | Schmidt et al. |
| 2014/0125620 A1 | 5/2014 | Panther et al. |
| 2014/0126336 A1 | 5/2014 | Goeller et al. |
| 2014/0129959 A1 | 5/2014 | Battles et al. |
| 2014/0136986 A1 | 5/2014 | Martin et al. |
| 2014/0139422 A1 | 5/2014 | Mistry et al. |
| 2014/0139637 A1 | 5/2014 | Mistry et al. |
| 2014/0141721 A1 | 5/2014 | Kim et al. |
| 2014/0142851 A1 | 5/2014 | Larmo et al. |
| 2014/0143671 A1 | 5/2014 | Kovalick |
| 2014/0143678 A1 | 5/2014 | Mistry et al. |
| 2014/0143682 A1 | 5/2014 | Druck et al. |
| 2014/0143737 A1 | 5/2014 | Mistry et al. |
| 2014/0149859 A1 | 5/2014 | Van Dyken et al. |
| 2014/0149878 A1 | 5/2014 | Mischari et al. |
| 2014/0155123 A1 | 6/2014 | Lee et al. |
| 2014/0156801 A1 | 6/2014 | Fernandes et al. |
| 2014/0157167 A1 | 6/2014 | Zhu |
| 2014/0160033 A1 | 6/2014 | Brikman et al. |
| 2014/0160078 A1 | 6/2014 | Seo et al. |
| 2014/0160304 A1 | 6/2014 | Galor et al. |
| 2014/0164544 A1 | 6/2014 | Gagneraud |
| 2014/0164907 A1 | 6/2014 | Jung et al. |
| 2014/0164930 A1 | 6/2014 | Lieb et al. |
| 2014/0164945 A1 | 6/2014 | Junqua et al. |
| 2014/0164955 A1 | 6/2014 | Thiruvidam et al. |
| 2014/0167986 A1 | 6/2014 | Parada et al. |
| 2014/0168056 A1 | 6/2014 | Swaminathan et al. |
| 2014/0171156 A1 | 6/2014 | Pattikonda et al. |
| 2014/0173439 A1 | 6/2014 | Gutierrez et al. |
| 2014/0173455 A1 | 6/2014 | Shimizu et al. |
| 2014/0176475 A1 | 6/2014 | Myers et al. |
| 2014/0180582 A1 | 6/2014 | Pontarelli et al. |
| 2014/0181183 A1 | 6/2014 | Yamamoto et al. |
| 2014/0181219 A1 | 6/2014 | Wang et al. |
| 2014/0181654 A1 | 6/2014 | Kumar et al. |
| 2014/0184524 A1 | 7/2014 | Schiefer et al. |
| 2014/0189577 A1 | 7/2014 | Haslam et al. |
| 2014/0189584 A1 | 7/2014 | Weng et al. |
| 2014/0189589 A1 | 7/2014 | Kim et al. |
| 2014/0191715 A1 | 7/2014 | Wechlin et al. |
| 2014/0195943 A1 | 7/2014 | Zheng et al. |
| 2014/0195972 A1 | 7/2014 | Lee et al. |
| 2014/0197946 A1 | 7/2014 | Park et al. |
| 2014/0197965 A1 | 7/2014 | Park et al. |
| 2014/0204229 A1 | 7/2014 | Leung et al. |
| 2014/0210708 A1 | 7/2014 | Simmons et al. |
| 2014/0218599 A1 | 8/2014 | Nakamura et al. |
| 2014/0223490 A1 | 8/2014 | Pan et al. |
| 2014/0228063 A1 | 8/2014 | Harris et al. |
| 2014/0237389 A1 | 8/2014 | Ryall et al. |
| 2014/0240122 A1 | 8/2014 | Roberts et al. |
| 2014/0240216 A1 | 8/2014 | Bukurak et al. |
| 2014/0240577 A1 | 8/2014 | Masugi |
| 2014/0244165 A1 | 8/2014 | Bells et al. |
| 2014/0245177 A1 | 8/2014 | Maklouf et al. |
| 2014/0250391 A1 | 9/2014 | Jong et al. |
| 2014/0258935 A1 | 9/2014 | Nishida et al. |
| 2014/0267303 A1 | 9/2014 | Larkin et al. |
| 2014/0269614 A1* | 9/2014 | Maguire ............... H04L 67/125 370/331 |
| 2014/0273975 A1 | 9/2014 | Barat et al. |
| 2014/0282068 A1 | 9/2014 | Levkovitz et al. |
| 2014/0282254 A1 | 9/2014 | Feiereisen et al. |
| 2014/0289660 A1 | 9/2014 | Min |
| 2014/0302834 A1 | 10/2014 | Jones |
| 2014/0304664 A1 | 10/2014 | Lee et al. |
| 2014/0306898 A1 | 10/2014 | Cueto |
| 2014/0310348 A1 | 10/2014 | Keskitalo et al. |
| 2014/0310350 A1 | 10/2014 | Borggaard et al. |
| 2014/0310598 A1 | 10/2014 | Sprague et al. |
| 2014/0320387 A1 | 10/2014 | Eriksson et al. |
| 2014/0328147 A1 | 11/2014 | Yang et al. |
| 2014/0331314 A1 | 11/2014 | Fujioka |
| 2014/0333602 A1 | 11/2014 | Yang et al. |
| 2014/0337450 A1 | 11/2014 | Choudhary et al. |
| 2014/0337748 A1 | 11/2014 | Lee |
| 2014/0337791 A1 | 11/2014 | Agnetta et al. |
| 2014/0343843 A1 | 11/2014 | Yanku |
| 2014/0344951 A1 | 11/2014 | Brewer |
| 2014/0347289 A1 | 11/2014 | Lee et al. |
| 2014/0358707 A1 | 12/2014 | Perkins et al. |
| 2014/0359124 A1 | 12/2014 | Adimatyam et al. |
| 2014/0359481 A1 | 12/2014 | Graham et al. |
| 2014/0359637 A1 | 12/2014 | Yan |
| 2014/0365113 A1 | 12/2014 | Yue et al. |
| 2014/0368719 A1 | 12/2014 | Kaneko et al. |
| 2014/0370807 A1 | 12/2014 | Pierce et al. |
| 2014/0380187 A1 | 12/2014 | Gardenfors et al. |
| 2014/0380229 A1 | 12/2014 | Volodin et al. |
| 2015/0011199 A1 | 1/2015 | Lee et al. |
| 2015/0017956 A1 | 1/2015 | Jeong |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0022674 A1 | 1/2015 | Koss et al. |
| 2015/0026615 A1 | 1/2015 | Choi et al. |
| 2015/0026647 A1 | 1/2015 | Park et al. |
| 2015/0033136 A1 | 1/2015 | Sasaki et al. |
| 2015/0035762 A1 | 2/2015 | Lu |
| 2015/0036853 A1 | 2/2015 | Solum et al. |
| 2015/0049033 A1 | 2/2015 | Kim et al. |
| 2015/0049233 A1 | 2/2015 | Choi |
| 2015/0049591 A1 | 2/2015 | Adams et al. |
| 2015/0052461 A1 | 2/2015 | Sullivan et al. |
| 2015/0055197 A1 | 2/2015 | Romanoff et al. |
| 2015/0057945 A1 | 2/2015 | White et al. |

(56) References Cited

U.S. PATENT DOCUMENTS

| | | |
|---|---|---|
| 2015/0061842 A1 | 3/2015 | Yoon et al. |
| 2015/0061972 A1 | 3/2015 | Kang et al. |
| 2015/0065035 A1 | 3/2015 | Son et al. |
| 2015/0067513 A1 | 3/2015 | Zambetti et al. |
| 2015/0067580 A1 | 3/2015 | Um et al. |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0098309 A1 | 4/2015 | Adams et al. |
| 2015/0100537 A1 | 4/2015 | Grieves et al. |
| 2015/0100621 A1 | 4/2015 | Pan |
| 2015/0106221 A1 | 4/2015 | Tapley et al. |
| 2015/0110419 A1 | 4/2015 | Xu et al. |
| 2015/0112990 A1 | 4/2015 | Van Os et al. |
| 2015/0113435 A1 | 4/2015 | Phillips |
| 2015/0113468 A1 | 4/2015 | Clark |
| 2015/0117162 A1 | 4/2015 | Tsai et al. |
| 2015/0121231 A1 | 4/2015 | Edwardson et al. |
| 2015/0130830 A1 | 5/2015 | Nagasaki et al. |
| 2015/0131121 A1 | 5/2015 | Kang |
| 2015/0153952 A1 | 6/2015 | Grossman et al. |
| 2015/0160806 A1 | 6/2015 | Fey et al. |
| 2015/0163788 A1 | 6/2015 | Karunakaran |
| 2015/0185703 A1 | 7/2015 | Tanaka |
| 2015/0189162 A1 | 7/2015 | Kuo et al. |
| 2015/0193130 A1 | 7/2015 | Cho et al. |
| 2015/0193138 A1 | 7/2015 | Relyea et al. |
| 2015/0194050 A1 | 7/2015 | Lee |
| 2015/0195179 A1 | 7/2015 | Skare et al. |
| 2015/0205511 A1 | 7/2015 | Vinna et al. |
| 2015/0217163 A1 | 8/2015 | Amis et al. |
| 2015/0242065 A1 | 8/2015 | Ko et al. |
| 2015/0243246 A1 | 8/2015 | Mun et al. |
| 2015/0248200 A1 | 9/2015 | Cho et al. |
| 2015/0248235 A1 | 9/2015 | Offenberg et al. |
| 2015/0261493 A1 | 9/2015 | Lemmon et al. |
| 2015/0264202 A1 | 9/2015 | Pawlowski |
| 2015/0269848 A1 | 9/2015 | Yuen et al. |
| 2015/0271120 A1 | 9/2015 | Langholz |
| 2015/0286372 A1 | 10/2015 | Swindell et al. |
| 2015/0287403 A1 | 10/2015 | Holzer Zaslansky et al. |
| 2015/0297185 A1 | 10/2015 | McCormack et al. |
| 2015/0301608 A1 | 10/2015 | Nagaraju et al. |
| 2015/0312175 A1 | 10/2015 | Langholz |
| 2015/0312617 A1 | 10/2015 | Chen et al. |
| 2015/0324751 A1 | 11/2015 | Orenstein et al. |
| 2015/0339261 A1 | 11/2015 | Jha et al. |
| 2015/0346834 A1 | 12/2015 | Martinez Fernandez et al. |
| 2015/0350029 A1 | 12/2015 | Skrobotov |
| 2015/0358043 A1 | 12/2015 | Jeong et al. |
| 2015/0370469 A1 | 12/2015 | Leong et al. |
| 2015/0373172 A1 | 12/2015 | Boesen |
| 2015/0379476 A1 | 12/2015 | Chaudhri et al. |
| 2016/0005189 A1 | 1/2016 | Gray et al. |
| 2016/0012294 A1 | 1/2016 | Bouck |
| 2016/0014266 A1 | 1/2016 | Bhatt |
| 2016/0018846 A1 | 1/2016 | Zenoff |
| 2016/0021168 A1 | 1/2016 | Chaudhri et al. |
| 2016/0026425 A1 | 1/2016 | Lee et al. |
| 2016/0028869 A1 | 1/2016 | Bhatt |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0034742 A1 | 2/2016 | Kim et al. |
| 2016/0036996 A1 | 2/2016 | Midholt et al. |
| 2016/0043905 A1 | 2/2016 | Fiedler |
| 2016/0048369 A1 | 2/2016 | Zenoff |
| 2016/0048370 A1 | 2/2016 | Zenoff |
| 2016/0050476 A1 | 2/2016 | Patil |
| 2016/0054710 A1 | 2/2016 | Jo et al. |
| 2016/0058336 A1 | 3/2016 | Blahnik et al. |
| 2016/0061613 A1 | 3/2016 | Jung et al. |
| 2016/0062567 A1 | 3/2016 | Yang et al. |
| 2016/0062572 A1 | 3/2016 | Yang et al. |
| 2016/0062589 A1 | 3/2016 | Wan et al. |
| 2016/0062606 A1 | 3/2016 | Vega et al. |
| 2016/0062719 A1 | 3/2016 | Romano et al. |
| 2016/0063748 A1 | 3/2016 | Kim et al. |
| 2016/0065505 A1 | 3/2016 | Iskander |
| 2016/0065707 A1 | 3/2016 | Yang et al. |
| 2016/0065708 A1 | 3/2016 | Yang et al. |
| 2016/0065827 A1 | 3/2016 | Dye et al. |
| 2016/0066277 A1 | 3/2016 | Yang et al. |
| 2016/0092053 A1 | 3/2016 | Loganathan et al. |
| 2016/0097651 A1 | 4/2016 | Jung et al. |
| 2016/0103970 A1 | 4/2016 | Liu et al. |
| 2016/0116941 A1 | 4/2016 | Kuwabara et al. |
| 2016/0117147 A1 | 4/2016 | Zambetti et al. |
| 2016/0134737 A1 | 5/2016 | Pulletikurty |
| 2016/0142763 A1 | 5/2016 | Kim et al. |
| 2016/0156597 A1 | 6/2016 | Meng et al. |
| 2016/0156957 A1 | 6/2016 | Yun |
| 2016/0165037 A1 | 6/2016 | Youn et al. |
| 2016/0188181 A1 | 6/2016 | Smith |
| 2016/0191511 A1 | 6/2016 | Tijerina et al. |
| 2016/0193502 A1 | 7/2016 | Kang et al. |
| 2016/0195864 A1 | 7/2016 | Kim |
| 2016/0196760 A1 | 7/2016 | Koo et al. |
| 2016/0202866 A1 | 7/2016 | Zambetti |
| 2016/0209939 A1 | 7/2016 | Zambetti et al. |
| 2016/0210568 A1 | 7/2016 | Krupa et al. |
| 2016/0212374 A1 | 7/2016 | Usbergo et al. |
| 2016/0246566 A1 | 8/2016 | Fullerton et al. |
| 2016/0256741 A1 | 9/2016 | Holma et al. |
| 2016/0259489 A1 | 9/2016 | Yang |
| 2016/0259542 A1 | 9/2016 | Chaudhri et al. |
| 2016/0260414 A1 | 9/2016 | Yang |
| 2016/0269176 A1 | 9/2016 | Pang et al. |
| 2016/0270717 A1 | 9/2016 | Luna et al. |
| 2016/0283194 A1 | 9/2016 | Patil et al. |
| 2016/0313875 A1 | 10/2016 | Williams et al. |
| 2016/0316147 A1 | 10/2016 | Bernstein et al. |
| 2016/0327911 A1 | 11/2016 | Eim et al. |
| 2016/0337206 A1 | 11/2016 | Bugenhagen et al. |
| 2016/0342141 A1 | 11/2016 | Koumaiha et al. |
| 2016/0345039 A1 | 11/2016 | Billmeyer |
| 2016/0357507 A1 | 12/2016 | Decker et al. |
| 2017/0006210 A1 | 1/2017 | Dye et al. |
| 2017/0010677 A1 | 1/2017 | Roh et al. |
| 2017/0011210 A1 | 1/2017 | Cheong et al. |
| 2017/0019517 A1 | 1/2017 | Wilder et al. |
| 2017/0031648 A1 | 2/2017 | So et al. |
| 2017/0034253 A1 | 2/2017 | Jiang et al. |
| 2017/0053542 A1 | 2/2017 | Wilson et al. |
| 2017/0068407 A1 | 3/2017 | Wilson et al. |
| 2017/0068439 A1 | 3/2017 | Mohseni |
| 2017/0083188 A1 | 3/2017 | Yang et al. |
| 2017/0087469 A1 | 3/2017 | Hardee et al. |
| 2017/0123571 A1 | 5/2017 | Huang et al. |
| 2017/0123640 A1 | 5/2017 | Wilson et al. |
| 2017/0134553 A1 | 5/2017 | Jeon et al. |
| 2017/0134872 A1 | 5/2017 | Silva et al. |
| 2017/0149795 A1 | 5/2017 | Day |
| 2017/0156110 A1 | 6/2017 | Ueno et al. |
| 2017/0160098 A1 | 6/2017 | Mcgavran et al. |
| 2017/0160819 A1 | 6/2017 | Yi et al. |
| 2017/0180843 A1 | 6/2017 | Perianu et al. |
| 2017/0185373 A1 | 6/2017 | Kim et al. |
| 2017/0192730 A1 | 7/2017 | Yang et al. |
| 2017/0192743 A1 | 7/2017 | Chun et al. |
| 2017/0195772 A1 | 7/2017 | Han et al. |
| 2017/0205854 A1 | 7/2017 | Zenoff |
| 2017/0212590 A1 | 7/2017 | Vanblon et al. |
| 2017/0230236 A1 | 8/2017 | Kim et al. |
| 2017/0239524 A1 | 8/2017 | Lee et al. |
| 2017/0243508 A1 | 8/2017 | Cheng et al. |
| 2017/0269792 A1 | 9/2017 | Xu et al. |
| 2017/0308292 A1 | 10/2017 | Choi |
| 2017/0322711 A1 | 11/2017 | Robinson et al. |
| 2017/0322713 A1 | 11/2017 | Hwang et al. |
| 2017/0331901 A1 | 11/2017 | Sarlandie De La Robertie et al. |
| 2017/0354845 A1 | 12/2017 | Williams et al. |

(56) References Cited

U.S. PATENT DOCUMENTS

| | | |
|---|---|---|
| 2017/0357426 A1 | 12/2017 | Wilson et al. |
| 2017/0357477 A1 | 12/2017 | Im et al. |
| 2018/0013815 A1 | 1/2018 | Gold |
| 2018/0067633 A1 | 3/2018 | Wilson et al. |
| 2018/0067712 A1 | 3/2018 | Behzadi et al. |
| 2018/0069957 A1 | 3/2018 | Mushikabe et al. |
| 2018/0137266 A1 | 5/2018 | Kim et al. |
| 2018/0199137 A1 | 7/2018 | Mate et al. |
| 2018/0218636 A1 | 8/2018 | Alaouf et al. |
| 2018/0253151 A1 | 9/2018 | Kletsov et al. |
| 2018/0259915 A1 | 9/2018 | Hosoi et al. |
| 2018/0262677 A1 | 9/2018 | Dye et al. |
| 2018/0267773 A1 | 9/2018 | Kim et al. |
| 2018/0288560 A1 | 10/2018 | Naik et al. |
| 2018/0307303 A1 | 10/2018 | Powderly et al. |
| 2018/0321842 A1 | 11/2018 | Lee et al. |
| 2018/0329585 A1 | 11/2018 | Carrigan et al. |
| 2018/0329586 A1 | 11/2018 | Sundstrom et al. |
| 2018/0335903 A1 | 11/2018 | Coffman et al. |
| 2018/0341448 A1 | 11/2018 | Behzadi et al. |
| 2018/0349022 A1 | 12/2018 | Chaudhri et al. |
| 2018/0352435 A1 | 12/2018 | Donley et al. |
| 2018/0364648 A1 | 12/2018 | Chi et al. |
| 2019/0026011 A1 | 1/2019 | Wang et al. |
| 2019/0028865 A1 | 1/2019 | Raleigh et al. |
| 2019/0037004 A1 | 1/2019 | Chaudhri et al. |
| 2019/0057593 A1 | 2/2019 | Park et al. |
| 2019/0121300 A1 | 4/2019 | Peterson et al. |
| 2019/0129661 A1 | 5/2019 | Hirota et al. |
| 2019/0138696 A1 | 5/2019 | Carpenter et al. |
| 2019/0146422 A1 | 5/2019 | Meyer et al. |
| 2019/0158645 A1 | 5/2019 | Yang et al. |
| 2019/0172016 A1 | 6/2019 | Chaudhri et al. |
| 2019/0179423 A1 | 6/2019 | Rose et al. |
| 2019/0182749 A1 | 6/2019 | Breaux et al. |
| 2019/0187861 A1 | 6/2019 | Yang |
| 2019/0196600 A1 | 6/2019 | Rothberg et al. |
| 2019/0232110 A1 | 8/2019 | Williams et al. |
| 2019/0232111 A1 | 8/2019 | Williams et al. |
| 2019/0238675 A1 | 8/2019 | Soni et al. |
| 2019/0265849 A1 | 8/2019 | Yang et al. |
| 2019/0268771 A1 | 8/2019 | Seo et al. |
| 2019/0281547 A1 | 9/2019 | Yoon et al. |
| 2019/0297439 A1 | 9/2019 | Maeda |
| 2019/0306607 A1 | 10/2019 | Clayton et al. |
| 2019/0340348 A1 | 11/2019 | Yu et al. |
| 2019/0347181 A1 | 11/2019 | Cranfill et al. |
| 2019/0349469 A1 | 11/2019 | Skogen et al. |
| 2019/0370094 A1 | 12/2019 | Louch et al. |
| 2019/0372862 A1 | 12/2019 | Carrigan et al. |
| 2020/0042087 A1 | 2/2020 | Ang et al. |
| 2020/0042088 A1 | 2/2020 | Ang et al. |
| 2020/0042089 A1 | 2/2020 | Ang et al. |
| 2020/0042094 A1 | 2/2020 | Ang et al. |
| 2020/0042145 A1 | 2/2020 | Williams et al. |
| 2020/0042311 A1 | 2/2020 | Shin |
| 2020/0067245 A1 | 2/2020 | Maley |
| 2020/0125037 A1 | 4/2020 | Jo et al. |
| 2020/0133206 A1 | 4/2020 | Jo et al. |
| 2020/0149921 A1 | 5/2020 | Hoffman et al. |
| 2020/0159374 A1 | 5/2020 | Yang et al. |
| 2020/0174734 A1 | 6/2020 | Gomes et al. |
| 2020/0201540 A1 | 6/2020 | Zambetti et al. |
| 2020/0213437 A1 | 7/2020 | Bhatt |
| 2020/0228646 A1 | 7/2020 | Hotes et al. |
| 2020/0264764 A1 | 8/2020 | Seymour et al. |
| 2020/0285379 A1 | 9/2020 | George-Svahn |
| 2020/0304917 A1 | 9/2020 | Ryu |
| 2020/0342144 A1 | 10/2020 | Alameh et al. |
| 2020/0348827 A1 | 11/2020 | Wilson et al. |
| 2020/0356242 A1 | 11/2020 | Wilson et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379712 A1 | 12/2020 | Carrigan |
| 2020/0379713 A1 | 12/2020 | Carrigan |
| 2020/0379716 A1 | 12/2020 | Carrigan et al. |
| 2021/0073741 A1 | 3/2021 | Chaudhri et al. |
| 2021/0103338 A1 | 4/2021 | Ang et al. |
| 2021/0173431 A1 | 6/2021 | Yang et al. |
| 2021/0203765 A1 | 7/2021 | Yang et al. |
| 2021/0216654 A1 | 7/2021 | Ko et al. |
| 2021/0255750 A1 | 8/2021 | Al et al. |
| 2021/0263702 A1 | 8/2021 | Carrigan |
| 2021/0373718 A1 | 12/2021 | Yang et al. |
| 2021/0407507 A1 | 12/2021 | Zhou et al. |
| 2022/0043626 A1 | 2/2022 | Carrigan |
| 2022/0047918 A1 | 2/2022 | Williams et al. |
| 2022/0083183 A1 | 3/2022 | Patton |
| 2022/0101719 A1 | 3/2022 | Bojic et al. |
| 2022/0129858 A1 | 4/2022 | Chaudhri et al. |
| 2022/0179497 A1 | 6/2022 | Jung et al. |
| 2022/0240408 A1 | 7/2022 | Faulkner et al. |
| 2022/0244782 A1 | 8/2022 | Robert et al. |
| 2022/0276780 A1 | 9/2022 | Ko et al. |
| 2022/0291793 A1 | 9/2022 | Zambetti et al. |
| 2022/0374085 A1 | 11/2022 | Nguyen et al. |
| 2023/0052490 A1 | 2/2023 | Chaudhri et al. |
| 2023/0066552 A1 | 3/2023 | Van Os et al. |
| 2023/0131489 A1 | 4/2023 | Marzorati et al. |
| 2023/0179700 A1 | 6/2023 | Bhatt |
| 2023/0214089 A1 | 7/2023 | Yang et al. |
| 2023/0214107 A1 | 7/2023 | Zambetti et al. |
| 2023/0252737 A1 | 8/2023 | Dreyer et al. |
| 2023/0291824 A1 | 9/2023 | Yang et al. |
| 2023/0334432 A1 | 10/2023 | Chaudhri et al. |
| 2023/0335139 A1 | 10/2023 | Breton et al. |
| 2023/0353862 A1 | 11/2023 | Yi et al. |
| 2023/0376193 A1 | 11/2023 | Han et al. |
| 2023/0376268 A1 | 11/2023 | Carrigan et al. |
| 2024/0220009 A1 | 7/2024 | Dryer et al. |
| 2024/0316404 A1 | 9/2024 | Williams et al. |
| 2024/0385691 A1 | 11/2024 | Nie et al. |
| 2025/0047777 A1 | 2/2025 | Bhatt |
| 2025/0094021 A1 | 3/2025 | Yang et al. |
| 2025/0153004 A1 | 5/2025 | Williams et al. |
| 2025/0165134 A1 | 5/2025 | Wilson et al. |
| 2025/0165136 A1 | 5/2025 | Zambetti et al. |
| 2025/0165930 A1 | 5/2025 | Chaudhri et al. |
| 2025/0238127 A1 | 7/2025 | Alonso et al. |
| 2025/0238128 A1 | 7/2025 | Manzari et al. |
| 2025/0238129 A1 | 7/2025 | Moussette et al. |
| 2025/0240516 A1 | 7/2025 | Zumbrunnen et al. |
| 2025/0315796 A1 | 10/2025 | Chaudhri et al. |

FOREIGN PATENT DOCUMENTS

| | | |
|---|---|---|
| CA | 2781636 A1 | 7/2010 |
| CA | 2729388 A1 | 9/2011 |
| CA | 2792987 A1 | 10/2011 |
| CH | 707412 A2 | 6/2014 |
| CN | 1556955 A | 12/2004 |
| CN | 1558690 A | 12/2004 |
| CN | 1705346 A | 12/2005 |
| CN | 1997957 A | 7/2007 |
| CN | 101042618 A | 9/2007 |
| CN | 101098535 A | 1/2008 |
| CN | 101118469 A | 2/2008 |
| CN | 101203821 A | 6/2008 |
| CN | 101232528 A | 7/2008 |
| CN | 101243383 A | 8/2008 |
| CN | 101382438 A | 3/2009 |
| CN | 101427574 A | 5/2009 |
| CN | 101433034 A | 5/2009 |
| CN | 101620494 A | 1/2010 |
| CN | 101627349 A | 1/2010 |
| CN | 101627361 A | 1/2010 |
| CN | 101702112 A | 5/2010 |
| CN | 101819486 A | 9/2010 |
| CN | 101872240 A | 10/2010 |
| CN | 101873386 A | 10/2010 |
| CN | 101910992 A | 12/2010 |
| CN | 101943883 A | 1/2011 |
| CN | 101978374 A | 2/2011 |

(56) References Cited

FOREIGN PATENT DOCUMENTS

| | | | |
|---|---|---|---|
| CN | 101981987 A | 2/2011 |
| CN | 102012738 A | 4/2011 |
| CN | 102163098 A | 8/2011 |
| CN | 201928419 U | 8/2011 |
| CN | 102301415 A | 12/2011 |
| CN | 102375690 A | 3/2012 |
| CN | 102426490 A | 4/2012 |
| CN | 102430244 A | 5/2012 |
| CN | 102438092 A | 5/2012 |
| CN | 102446059 A | 5/2012 |
| CN | 102446435 A | 5/2012 |
| CN | 102449560 A | 5/2012 |
| CN | 102449561 A | 5/2012 |
| CN | 102450040 A | 5/2012 |
| CN | 102455860 A | 5/2012 |
| CN | 202309894 U | 7/2012 |
| CN | 102687176 A | 9/2012 |
| CN | 102695302 A | 9/2012 |
| CN | 102754071 A | 10/2012 |
| CN | 102763066 A | 10/2012 |
| CN | 102769705 A | 11/2012 |
| CN | 102772211 A | 11/2012 |
| CN | 102790826 A | 11/2012 |
| CN | 102800045 A | 11/2012 |
| CN | 102830795 A | 12/2012 |
| CN | 102833345 A | 12/2012 |
| CN | 102859480 A | 1/2013 |
| CN | 102981727 A | 3/2013 |
| CN | 102982401 A | 3/2013 |
| CN | 102984342 A | 3/2013 |
| CN | 102989159 A | 3/2013 |
| CN | 103003668 A | 3/2013 |
| CN | 103092469 A | 5/2013 |
| CN | 103399480 A | 11/2013 |
| CN | 103399750 A | 11/2013 |
| CN | 103415084 A | 11/2013 |
| CN | 203311163 U | 11/2013 |
| CN | 103425451 A | 12/2013 |
| CN | 103558916 A | 2/2014 |
| CN | 103562832 A | 2/2014 |
| CN | 103562841 A | 2/2014 |
| CN | 103576902 A | 2/2014 |
| CN | 103604272 A | 2/2014 |
| CN | 103607660 A | 2/2014 |
| CN | 103713843 A | 4/2014 |
| CN | 103744671 A | 4/2014 |
| CN | 103778082 A | 5/2014 |
| CN | 103793075 A | 5/2014 |
| CN | 103839023 A | 6/2014 |
| CN | 103853493 A | 6/2014 |
| CN | 103876721 A | 6/2014 |
| CN | 103902165 A | 7/2014 |
| CN | 103914238 A | 7/2014 |
| CN | 103970208 A | 8/2014 |
| CN | 104024987 A | 9/2014 |
| CN | 104102388 A | 10/2014 |
| CN | 104160362 A | 11/2014 |
| CN | 203930358 U | 11/2014 |
| CN | 104205785 A | 12/2014 |
| CN | 104272854 A | 1/2015 |
| CN | 104281257 A | 1/2015 |
| CN | 104281430 A | 1/2015 |
| CN | 104288983 A | 1/2015 |
| CN | 104346297 A | 2/2015 |
| CN | 104360735 A | 2/2015 |
| CN | 104423581 A | 3/2015 |
| CN | 104434314 A | 3/2015 |
| CN | 104464010 A | 3/2015 |
| CN | 104508426 A | 4/2015 |
| CN | 104917794 A | 9/2015 |
| CN | 104956182 A | 9/2015 |
| CN | 105208511 A | 12/2015 |
| CN | 105260078 A | 1/2016 |
| CN | 105388998 A | 3/2016 |
| CN | 105574378 A | 5/2016 |
| CN | 105657465 A | 6/2016 |
| CN | 105959906 A | 9/2016 |
| CN | 205608658 U | 9/2016 |
| CN | 106060772 A | 10/2016 |
| CN | 103914238 B | 2/2017 |
| CN | 106797415 A | 5/2017 |
| CN | 106851528 A | 6/2017 |
| CN | 106936929 A | 7/2017 |
| CN | 107637073 A | 1/2018 |
| CN | 107683470 A | 2/2018 |
| CN | 107797657 A | 3/2018 |
| CN | 107852572 A | 3/2018 |
| CN | 107949879 A | 4/2018 |
| CN | 108289239 A | 7/2018 |
| CN | 108292203 A | 7/2018 |
| CN | 108958608 A | 12/2018 |
| CN | 208188782 U | 12/2018 |
| CN | 109347581 A | 2/2019 |
| CN | 109461462 A | 3/2019 |
| CN | 109584879 A | 4/2019 |
| CN | 109584879 B | 7/2021 |
| CN | 108958608 B | 7/2022 |
| EP | 0831629 A2 | 3/1998 |
| EP | 0836074 A2 | 4/1998 |
| EP | 1079371 A1 | 2/2001 |
| EP | 1406176 A1 | 4/2004 |
| EP | 1614992 A1 | 1/2006 |
| EP | 1659504 A2 | 5/2006 |
| EP | 1674977 A2 | 6/2006 |
| EP | 1679879 A2 | 7/2006 |
| EP | 1705883 A1 | 9/2006 |
| EP | 1777611 A1 | 4/2007 |
| EP | 1832969 A2 | 9/2007 |
| EP | 1858238 A2 | 11/2007 |
| EP | 1885109 A2 | 2/2008 |
| EP | 1953663 A1 | 8/2008 |
| EP | 2040146 A2 | 3/2009 |
| EP | 2096413 A1 | 9/2009 |
| EP | 2194508 A1 | 6/2010 |
| EP | 2194698 A1 | 6/2010 |
| EP | 2204702 A1 | 7/2010 |
| EP | 2284646 A1 | 2/2011 |
| EP | 2302493 A2 | 3/2011 |
| EP | 2306692 A1 | 4/2011 |
| EP | 2312512 A1 | 4/2011 |
| EP | 2360902 A2 | 8/2011 |
| EP | 2367098 A2 | 9/2011 |
| EP | 2394711 A1 | 12/2011 |
| EP | 2407219 A2 | 1/2012 |
| EP | 2413577 A2 | 2/2012 |
| EP | 2423810 A1 | 2/2012 |
| EP | 2428947 A2 | 3/2012 |
| EP | 2437148 A2 | 4/2012 |
| EP | 2466260 A1 | 6/2012 |
| EP | 2523439 A1 | 11/2012 |
| EP | 2547117 A1 | 1/2013 |
| EP | 2602759 A2 | 6/2013 |
| EP | 2615607 A2 | 7/2013 |
| EP | 2629483 A1 | 8/2013 |
| EP | 2632131 A1 | 8/2013 |
| EP | 1614992 B1 | 10/2013 |
| EP | 2653961 A1 | 10/2013 |
| EP | 2677775 A1 | 12/2013 |
| EP | 2693382 A2 | 2/2014 |
| EP | 2703972 A1 | 3/2014 |
| EP | 2720126 A1 | 4/2014 |
| EP | 2720442 A1 | 4/2014 |
| EP | 2733598 A2 | 5/2014 |
| EP | 2738640 A2 | 6/2014 |
| EP | 2742404 A2 | 6/2014 |
| EP | 2821912 A1 | 1/2015 |
| EP | 2892240 A1 | 7/2015 |
| EP | 2980715 A1 | 2/2016 |
| EP | 2993602 A1 | 3/2016 |
| EP | 2998822 A2 | 3/2016 |
| EP | 3001282 A1 | 3/2016 |
| EP | 3032537 A2 | 6/2016 |
| EP | 3057342 A1 | 8/2016 |
| EP | 3073703 A1 | 9/2016 |

(56) References Cited

FOREIGN PATENT DOCUMENTS

| | | |
|---|---|---|
| EP | 3276905 A1 | 1/2018 |
| EP | 3379853 A1 | 9/2018 |
| EP | 3833002 A1 | 6/2021 |
| GB | 2370208 A | 6/2002 |
| GB | 0412212 | 7/2004 |
| GB | 2402105 A | 12/2004 |
| GB | 2475669 A | 6/2011 |
| JP | 5-90390 U | 12/1993 |
| JP | 8-110955 A | 4/1996 |
| JP | 8-285964 A | 11/1996 |
| JP | 9-251084 A | 9/1997 |
| JP | 11-160470 A | 6/1999 |
| JP | 11-183183 A | 7/1999 |
| JP | 11-232013 A | 8/1999 |
| JP | 2000-122957 A | 4/2000 |
| JP | 2000-241199 A | 9/2000 |
| JP | 2001-309455 A | 11/2001 |
| JP | 2001-318852 A | 11/2001 |
| JP | 2002-507718 A | 3/2002 |
| JP | 2002-271451 A | 9/2002 |
| JP | 2002-342356 A | 11/2002 |
| JP | 2002-351768 A | 12/2002 |
| JP | 2003-30245 A | 1/2003 |
| JP | 2004-177148 A | 6/2004 |
| JP | 2004-519033 A | 6/2004 |
| JP | 2004-184396 A | 7/2004 |
| JP | 2005-532607 A | 10/2005 |
| JP | 2006-101505 A | 4/2006 |
| JP | 3830956 B1 | 10/2006 |
| JP | 2007-243275 A | 9/2007 |
| JP | 2008-97202 A | 4/2008 |
| JP | 2009-502048 A | 1/2009 |
| JP | 2009-50471 A | 3/2009 |
| JP | 2009-95030 A | 4/2009 |
| JP | 2009-239867 A | 10/2009 |
| JP | 2010-60355 A | 3/2010 |
| JP | 2010-124181 A | 6/2010 |
| JP | 3162246 U | 8/2010 |
| JP | 2010-245940 A | 10/2010 |
| JP | 2010-257051 A | 11/2010 |
| JP | 3168099 U | 6/2011 |
| JP | 2011-525648 A | 9/2011 |
| JP | 2011-209786 A | 10/2011 |
| JP | 2011-217000 A | 10/2011 |
| JP | 2011-530101 A | 12/2011 |
| JP | 2012-505478 A | 3/2012 |
| JP | 2012-123475 A | 6/2012 |
| JP | 2012-147432 A | 8/2012 |
| JP | 2012-517630 A | 8/2012 |
| JP | 2012-203832 A | 10/2012 |
| JP | 2012-247283 A | 12/2012 |
| JP | 2012-531607 A | 12/2012 |
| JP | 2013-506225 A | 2/2013 |
| JP | 2013-530458 A | 7/2013 |
| JP | 2013-146557 A | 8/2013 |
| JP | 2013-175188 A | 9/2013 |
| JP | 2014-503861 A | 2/2014 |
| JP | 2014-53692 A | 3/2014 |
| JP | 2014-123169 A | 7/2014 |
| JP | 2014-123197 A | 7/2014 |
| JP | 2014-128032 A | 7/2014 |
| JP | 2014-143575 A | 8/2014 |
| JP | 2015-61318 A | 3/2015 |
| JP | 2015-210587 A | 11/2015 |
| JP | 2016-13151 A | 1/2016 |
| JP | 2017-34563 A | 2/2017 |
| JP | 2017-143357 A | 8/2017 |
| JP | 2018-113544 A | 7/2018 |
| JP | 2018-147265 A | 9/2018 |
| KR | 20-0425314 Y1 | 9/2006 |
| KR | 10-0810379 B1 | 3/2008 |
| KR | 20-2008-0004775 U | 10/2008 |
| KR | 10-2011-0013653 A | 2/2011 |
| KR | 10-2012-0003537 A | 1/2012 |
| KR | 10-1352713 B1 | 1/2014 |
| KR | 10-2014-0064687 A | 5/2014 |
| KR | 10-2014-0073232 A | 6/2014 |
| KR | 10-2014-0074824 A | 6/2014 |
| KR | 10-2015-0001287 A | 1/2015 |
| KR | 10-2016-0000330 A | 1/2016 |
| KR | 10-2016-0092363 A | 8/2016 |
| KR | 10-2017-0027435 A | 3/2017 |
| KR | 10-2017-0032471 A | 3/2017 |
| KR | 10-2017-0082022 A | 7/2017 |
| KR | 10-2017-0124954 A | 11/2017 |
| KR | 10-2019-0020850 A | 3/2019 |
| KR | 10-2019-0022883 A | 3/2019 |
| SG | 130285 A1 | 4/2007 |
| TW | 201012152 A1 | 3/2010 |
| TW | D144158 S1 | 12/2011 |
| TW | 201215086 A | 4/2012 |
| TW | M435665 U1 | 8/2012 |
| TW | M474482 U | 3/2014 |
| TW | 201419115 A | 5/2014 |
| TW | 201509168 A | 3/2015 |
| WO | 99/66394 A1 | 12/1999 |
| WO | 99/66395 A2 | 12/1999 |
| WO | 01/71433 A1 | 9/2001 |
| WO | 02/054157 A1 | 7/2002 |
| WO | 03/058589 A2 | 7/2003 |
| WO | 2004/047440 A2 | 6/2004 |
| WO | 2004/056107 A1 | 7/2004 |
| WO | 2004/095414 A1 | 11/2004 |
| WO | 2005/103863 A2 | 11/2005 |
| WO | 2005/109829 A1 | 11/2005 |
| WO | 2006/012343 A2 | 2/2006 |
| WO | 2006/094308 A2 | 9/2006 |
| WO | 2006/112641 A1 | 10/2006 |
| WO | 2006/094308 A3 | 12/2006 |
| WO | 2007/008321 A2 | 1/2007 |
| WO | 2007/018881 A2 | 2/2007 |
| WO | 2007/102110 A2 | 9/2007 |
| WO | 2007/105937 A1 | 9/2007 |
| WO | 2007/142703 A1 | 12/2007 |
| WO | 2007/149731 A1 | 12/2007 |
| WO | 2008/086302 A1 | 7/2008 |
| WO | 2009/085378 A1 | 7/2009 |
| WO | 2009/123428 A2 | 10/2009 |
| WO | 2009/137419 A2 | 11/2009 |
| WO | 2009/140095 A2 | 11/2009 |
| WO | 2010/017627 A1 | 2/2010 |
| WO | 2010/129221 A1 | 11/2010 |
| WO | 2011/000893 A1 | 1/2011 |
| WO | 2011/041427 A2 | 4/2011 |
| WO | 2011/062871 A2 | 5/2011 |
| WO | 2011/063516 A1 | 6/2011 |
| WO | 2011/084857 A1 | 7/2011 |
| WO | 2011/084859 A1 | 7/2011 |
| WO | 2011/128416 A2 | 10/2011 |
| WO | 2011/149231 A2 | 12/2011 |
| WO | 2011/130849 A8 | 5/2012 |
| WO | 2012/127484 A1 | 9/2012 |
| WO | 2012/128361 A1 | 9/2012 |
| WO | 2012/161434 A2 | 11/2012 |
| WO | 2012/166976 A2 | 12/2012 |
| WO | 2012/172970 A1 | 12/2012 |
| WO | 2013/048880 A1 | 4/2013 |
| WO | 2013/051048 A1 | 4/2013 |
| WO | 2013/097895 A1 | 7/2013 |
| WO | 2013/111239 A1 | 8/2013 |
| WO | 2013/135270 A1 | 9/2013 |
| WO | 2013/169842 A2 | 11/2013 |
| WO | 2013/169849 A2 | 11/2013 |
| WO | 2013/169851 A2 | 11/2013 |
| WO | 2013/169854 A2 | 11/2013 |
| WO | 2013/169870 A1 | 11/2013 |
| WO | 2013/169875 A2 | 11/2013 |
| WO | 2013/169877 A2 | 11/2013 |
| WO | 2013/169882 A2 | 11/2013 |
| WO | 2014/024000 A1 | 2/2014 |
| WO | 2014/078114 A1 | 5/2014 |
| WO | 2014/081181 A1 | 5/2014 |
| WO | 2014/088475 A1 | 6/2014 |
| WO | 2014/105276 A1 | 7/2014 |

(56) References Cited

FOREIGN PATENT DOCUMENTS

| WO | 2014/105278 A1 | 7/2014 |
|---|---|---|
| WO | 2014/105279 A1 | 7/2014 |
| WO | 2014/113987 A1 | 7/2014 |
| WO | 2014/143776 A2 | 9/2014 |
| WO | 2014/171734 A2 | 10/2014 |
| WO | 2015/061831 A1 | 5/2015 |
| WO | 2015/065402 A1 | 5/2015 |
| WO | 2015/183828 A1 | 12/2015 |
| WO | 2015/185123 A1 | 12/2015 |
| WO | 2016/022203 A1 | 2/2016 |
| WO | 2016/022205 A1 | 2/2016 |
| WO | 2016/036472 A1 | 3/2016 |
| WO | 2016/036522 A2 | 3/2016 |
| WO | 2016/036541 A2 | 3/2016 |
| WO | 2016/200603 A1 | 12/2016 |
| WO | 2016/204186 A1 | 12/2016 |
| WO | 2017/062621 A1 | 4/2017 |
| WO | 2017/112003 A1 | 6/2017 |
| WO | 2018/032085 A1 | 2/2018 |
| WO | 2018/048510 A1 | 3/2018 |
| WO | 2018/084802 A1 | 5/2018 |
| WO | 2018/098136 A1 | 5/2018 |
| WO | 2019/173136 A1 | 9/2019 |
| WO | 2019/200350 A1 | 10/2019 |
| WO | 2019/217086 A2 | 11/2019 |
| WO | 2020/063762 A1 | 4/2020 |

OTHER PUBLICATIONS

Non-Final Office Action received for U.S. Appl. No. 18/441,971, mailed on Apr. 10, 2025, 39 pages.
Office Action received for Australian Patent Application No. 2024200958, mailed on Apr. 1, 2025, 5 pages.
Record of Oral Hearing received for U.S. Appl. No. 17/181,089, mailed on Mar. 27, 2025, 15 pages.
MINORITY_14, "The Ultimate Beautiful Holo Stopwatch: Ultimate Stopwatch & Timer", Available online at: https://sspai.com/post/21699, Mar. 1, 2013, 4 pages.
Applicant-Initiated Interview Summary received for U.S. Appl. No. 18/102,036, mailed on Jun. 27, 2025, 3 pages.
Applicant-Initiated Interview Summary received for U.S. Appl. No. 18/228,597, mailed on Jun. 23, 2025, 4 pages.
Corrected Notice of Allowance received for U.S. Appl. No. 16/943,737, mailed on Jun. 20, 2025, 3 pages.
Intention to Grant received for European Patent Application No. 24211972.5, mailed on Jun. 16, 2025, 9 pages.
Applicant-Initiated Interview Summary received for U.S. Appl. No. 18/088,309. mailed on Aug. 27, 2024, 2 pages.
International Preliminary Report on Patentability received for PCT Patent Application No. PCT/US2023/012260, mailed on Aug. 22, 2024, 15 pages.
MINORITY_14, "The Ultimate Beautiful Holo Stopwatch: Ultimate Stopwatch & Timer", Available online at: https://sspai.com/post/21699, Mar. 1, 2013, 4 pages (Official Copy only) {See Communication Under Rule 37 CFR § 1.98(a) (3)}.
Office Action received for Chinese Patent Application No. 202010697187.0, mailed on Jul. 25, 2024, 16 pages (5 pages of English Translation and 11 pages of Official Copy).
Office Action received for Chinese Patent Application No. 202110369265.9, mailed on Jul. 31, 2024, 18 pages (6 pages of English Translation and 12 pages of Official Copy).
Applicant-Initiated Interview Summary received for U.S. Appl. No. 18/197,681, mailed on Apr. 21, 2025, 4 pages.
Decision on Appeal received for U.S. Appl. No. 17/181,089, mailed on Apr. 17, 2025, 19 pages.
Final Office Action received for U.S. Appl. No. 18/102,036, mailed on Apr. 21, 2025, 19 pages.
Intention to Grant received for European Patent Application No. 24211972.5, mailed on Apr. 10, 2025, 9 pages.
Office Action received for Chinese Patent Application No. 202110369265.9, mailed on Mar. 27, 2025, 16 pages (4 pages of English Translation and 12 pages of Official Copy).
Notice of Allowance received for U.S. Appl. No. 16/943,737, mailed on Jun. 3, 2025, 6 pages,.
Office Action received for Chinese Patent Application No. 202110481400.9, mailed on Apr. 23, 2025, 24 pages (14 pages of English Translation and 10 pages of Official Copy).
Applicant-Initiated Interview Summary received for U.S. Appl. No. 18/211,150, mailed on Jul. 24, 2024, 3 pages.
Final Office Action received for U.S. Appl. No. 18/197,681, mailed on Jun. 27, 2024, 30 pages.
Final Office Action received for U.S. Appl. No. 18/200,480, mailed on Jun. 17, 2024, 19 pages.
Final Office Action received for U.S. Appl. No. 18/211,150, mailed on Jul. 2, 2024, 11 pages.
Intention to Grant received for European Patent Application No. 20720310.0, mailed on Jun. 13, 2024, 13 pages.
Intention to Grant received for European Patent Application No. 23173355.1, mailed on Jun. 28, 2024, 9 pages.
Non-Final Office Action received for U.S. Appl. No. 18/228,597, mailed on Jul. 8, 2024, 17 pages.
Notice of Allowance received for Chinese Patent Application No. 202110369386.3, mailed on Jul. 9, 2024, 5 pages (1 page of English Translation and 4 pages of Official Copy).
Notice of Allowance received for Chinese Patent Application No. 202210326960.1, mailed on Jun. 21, 2024, 5 pages (1 page of English Translation and 4 pages of Official Copy).
Notice of Allowance received for Japanese Patent Application No. 2022-205934, mailed on Jun. 10, 2024, 4 pages (1 page of English Translation and 3 pages of Official Copy).
Notice of Allowance received for U.S. Appl. No. 17/746,807, mailed on Jul. 3, 2024, 23 pages.
Notice of Allowance received for U.S. Appl. No. 18/122,625, mailed on Jun. 21, 2024, 7 pages.
Office Action received for Australian Patent Application No. 2023204647, mailed on Jul. 5, 2024, 3 pages.
Office Action received for Chinese Patent Application No. 202010295272.4, mailed on Jun. 11, 2024, 12 pages (5 pages of English Translation and 7 pages of Official Copy).
Office Action received for European Patent Application No. 22197186.4, mailed on Jun. 25, 2024, 5 pages.
Office Action received for Indian Patent Application No. 202218027229, mailed on Jun. 13, 2024, 8 pages.
Notice of Allowance received for Chinese Patent Application No. 202110367834.6, mailed on Jan. 2, 2025, 4 pages (1 page of English Translation and 3 pages of Official Copy).
Notice of Allowance received for U.S. Appl. No. 18/211,150, mailed on Jan. 15, 2025, 11 pages.
Office Action received for Australian Patent Application No. 2023214377, mailed on Jan. 17, 2025, 3 pages.
Office Action received for Chinese Patent Application No. 202110367769.7, mailed on Dec. 27, 2024, 22 pages (7 pages of English Translation and 15 pages of Official Copy).
Office Action received for Chinese Patent Application No. 202110369265.9, mailed on Dec. 27. 2024, 16 pages (5 pages of English Translation and 11 pages of Official Copy).
Xuetao, Yang. "WP7 version of the desktop clock literary style MetroTime trial". Online available at: https://tech.sina.com.cn/s/s/2012-02-24/09216764878.shtml, Feb. 24, 2012, 10 pages (6 pages of English Translation and 4 pages of Official Copy).
Corrected Notice of Allowance received for U.S. Appl. No. 19/030,831, mailed on May 19, 2025, 2 pages.
Final Office Action received for U.S. Appl. No. 18/228,597, mailed on May 9, 2025, 22 pages.
Notice of Allowance received for U.S. Appl. No. 18/197,681, mailed on May 20, 2025, 18 pages.
Notice of Allowance received for U.S. Appl. No. 19/030,831, mailed on May 8, 2025, 12 pages.
Office Action received for Chinese Patent Application No. 202310794146.7, mailed on Apr. 10, 2025, 11 pages (6 pages of English Translation and 5 pages of Official Copy).

(56) References Cited

OTHER PUBLICATIONS

Applicant-Initiated Interview Summary received for U.S. Appl. No. 18/228,597, mailed on Jan. 29, 2025, 4 pages.
Notice of Allowance received for U.S. Appl. No. 18/211,150, mailed on Jan. 29, 2025, 2 pages.
Non-Final Office Action received for U.S. Appl. No. 18/102,036, mailed on Dec. 20, 2024, 16 pages.
Hayakawa Atsushi, "An On-Line Wear Club", Mac People, ASCII Corp, Japan, vol. 8, No. 20., Oct. 15, 2002, 4 pages.
Decision to Grant received for European Patent Application No. 15753796.0, mailed on Sep. 26, 2024, 3 pages.
Non-Final Office Action received for U.S. Appl. No. 18/102,036, mailed on Sep. 29, 2024, 16 pages.
Notice of Allowance received for U.S. Appl. No. 18/122,625, mailed on Sep. 20, 2024, 5 pages.
Office Action received for Australian Patent Application No. 2023204647, mailed on Sep. 19, 2024, 2 pages.
Office Action received for Chinese Patent Application No. 202110368426.2, mailed on Aug. 23, 2024, 17 pages (8 pages of English Translation and 9 pages of Official Copy).
Office Action received for Chinese Patent Application No. 202310794146.7, mailed on Aug. 30, 2024, 18 pages (11 pages of English Translation and 7 pages of Official Copy).
Decision to Grant received for European Patent Application No. 20720310.0, mailed on Dec. 5, 2024, 2 pages.
Final Office Action received for U.S. Patent Application No. 17/410,169, mailed on Dec. 3, 2024, 56 pages.
Notice of Allowance received for Chinese Patent Application No. 202010697187.0, mailed on Nov. 18, 2024, 6 pages (1 page of English Translation and 5 pages of Official Copy).
Notice of Allowance received for Chinese Patent Application No. 202110369363.2, mailed on Nov. 22, 2024, 4 pages (1 page of English Translation and 3 pages of Official Copy).
Notice of Allowance received for Korean Patent Application No. 10-2022-7032414, mailed on Nov. 27, 2024, 7 pages (2 pages of English Translation and 5 pages of Official Copy).
Notice of Allowance received for U.S. Appl. No. 18/589,265, mailed on Dec. 6, 2024, 9 pages.
Office Action received for Chinese Patent Application No. 202310794146.7, mailed on Nov. 13, 2024, 17 pages (11 pages of English Translation and 6 pages of Official Copy).
Summons to Attend Oral Proceedings received for German Patent Application No. 112015003083.2, mailed on Oct. 28, 2024, 7 pages (3 pages of English Translation and 4 pages of Official Copy).
Corrected Notice of Allowance received for U.S. Appl. No. 17/746,807, mailed on Feb. 26, 2025, 3 pages.
Corrected Notice of Allowance received for U.S. Appl. No. 18/211,150, mailed on Feb. 20, 2025, 2 pages.
Corrected Notice of Allowance received for U.S. Appl. No. 18/589,265, mailed on Feb. 26, 2025, 2 pages.
Decision on Appeal received for U.S. Appl. No. 18/119,789, mailed on Feb. 20, 2025, 16 pages.
Notice of Allowance received for U.S. Appl. No. 18/589,265, mailed on Feb. 18, 2025, 10 pages.
Record of Oral Hearing received for U.S. Appl. No. 16/943,737, mailed on Feb. 24, 2025, 22 pages.
Record of Oral Hearing received for U.S. Appl. No. 18/119,789, mailed on Feb. 23, 2025, 14 pages.
Applicant-Initiated Interview Summary received for U.S. Appl. No. 18/102,036, mailed on Mar. 10, 2025, 3 pages.
Decision on Appeal received for U.S. Appl. No. 16/943,737, mailed on Mar. 4, 2025, 10 pages.
Non-Final Office Action received for U.S. Appl. No. 18/228,597, mailed on Mar. 6, 2025, 20 pages.
Non-Final Office Action received for U.S. Appl. No. 17/410,169, mailed on Sep. 10, 2024, 53 pages.
Non-Final Office Action received for U.S. Appl. No. 18/211,150, mailed on Sep. 16, 2024, 11 pages.
Notice of Allowance received for Chinese Patent Application No. 202110369387.8, mailed on Aug. 30, 2024, 2 pages (1 page of English Translation and 1 page of Official Copy).
Office Action received for Australian Patent Application No. 2023285697. mailed on Dec. 16, 2024, 2 pages.
Office Action received for Australian Patent Application No. 2024200958, mailed on Dec. 20, 2024, 5 pages. .
Applicant-Initiated Interview Summary received for U.S. Appl. No. 17/410,169, mailed on Nov. 6, 2024, 5 pages.
Applicant-Initiated Interview Summary received for U.S. Appl. No. 18/102,036, mailed on Nov. 8, 2024, 4 pages.
Extended European Search Report received for European Patent Application No. 24194531.0, mailed on Nov. 12, 2024, 8 pages.
Notice of Allowance received for Chinese Patent Application No. 202110369341.6, mailed on Nov. 4, 2024, 4 pages (1 page of English Translation and 3 pages of Official Copy).
Notice of Allowance received for Chinese Patent Application No. 202210312598.2, mailed on Nov. 6, 2024, 4 pages (1 page of English Translation and 3 pages of Official Copy).
Notice of Allowance received for U.S. Appl. No. 17/746,807, mailed on Nov. 14, 2024, 6 pages.
Office Action received for Chinese Patent Application No. 202010295272.4, mailed on Oct. 10, 2024, 9 pages (4 pages of English Translation and 5 pages of Official Copy).
Office Action received for Chinese Patent Application No. 202110367834.6, mailed on Nov. 4, 2024, 10 pages (5 pages of English Translation and 5 pages of Official Copy).
International Search Report and Written Opinion received for PCT Patent Application No. PCT/US2025/010440, mailed on Jul. 4, 2025, 20 pages.
Invitation to Pay Additional Fees and Partial International Search Report received for PCT Patent Application No. PCT/US2025/010440, mailed on May 13, 2025, 15 pages.
Non-Final Office Action received for U.S. Appl. No. 18/892,251, mailed on Jul. 11, 2025, 28 pages.
Notice of Allowance received for U.S. Appl. No. 17/410,169, mailed on Jul. 17, 2025, 8 pages.
Office Action received for European Patent Application No. 22188724.3, mailed on Jul. 24, 2025, 10 pages.
Office Action received for Japanese Patent Application No. 2024-110376, mailed on Jul. 18, 2025, 6 pages (3 pages of English Translation and 3 pages of Official Copy).
Applicant-Initiated Interview Summary received for U.S. Appl. No. 18/228,597, mailed on Aug. 8, 2024, 4 pages.
Final Office Action received for U.S. Appl. No. 18/088,309, mailed on Aug. 1, 2024, 16 pages.
Notice of Allowance received for Chinese Patent Application No. 202211110081.1, mailed on Jul. 24, 2024, 2 pages (1 page of English Translation and 1 page of Official Copy).
Notice of Allowance received for Korean Patent Application No. 10-2023-7008854, mailed on Jul. 26, 2024, 8 pages (2 pages of English Translation and 6 pages of Official Copy). .
Office Action received for Chinese Patent Application No. 202110369387.8, mailed on Jul. 2, 2024, 10 pages (4 pages of English Translation and 6 pages of Official Copy).
Office Action received for Chinese Patent Application No. 202210312775.7, mailed on Jun. 19, 2024, 13 pages (6 pages of English Translation and 7 pages of Official Copy).
Extended European Search Report received for European Patent Application No. 24211972.5, mailed on Jan. 2, 2025, 7 pages.
Final Office Action received for U.S. Appl. No. 18/228,597, mailed on Jan. 8, 2025, 19 pages.
Applicant-Initiated Interview Summary received for U.S. Appl. No. 18/228,597, mailed on Apr. 1, 2025, 5 pages.
Corrected Notice of Allowance received for U.S. Appl. No. 18/211,150, mailed on Mar. 26, 2025, 2 pages.
Intention to Grant received for European Patent Application No. 23158566.2, mailed on Mar. 19, 2025, 9 pages.
Notice of Allowance received for Chinese Patent Application No. 202110368164.X, mailed on Mar. 13, 2025, 4 pages (1 page of English Translation and 3 pages of Official Copy).

(56) References Cited

OTHER PUBLICATIONS

Notice of Allowance received for Chinese Patent Application No. 202110368460.X, mailed on Mar. 13, 2025, 4 pages (1 page of English Translation and 3 pages of Official Copy).
Office Action received for Chinese Patent Application No. 202110368426.2, mailed on Feb. 24, 2025, 9 pages (5 pages of English Translation and 4 pages of Official Copy).
Advisory Action received for U.S. Appl. No. 18/197,681, mailed on Aug. 21, 2024, 5 pages.
Extended European Search Report received for European Patent Application No. 24179066.6, mailed on Aug. 8, 2024, 10 pages.
Notice of Allowance received for Chinese Patent Application No. 202211081603.X. mailed on Jul. 29, 2024, 2 pages (1 page of English Translation and 1 page of Official Copy).
Notice of Allowance received for Japanese Patent Application No. 2022-149476, mailed on Aug. 2, 2024, 4 pages (1 page of English Translation and 3 pages of Official Copy).
Office Action received for Chinese Patent Application No. 202110369341.6, mailed on Jul. 24, 2024, 11 pages (5 pages of English Translation and 6 pages of Official Copy).
Office Action received for Chinese Patent Application No. 202110369363.2, mailed on Jul. 9, 2024, 14 pages (6 pages of English Translation and 8 pages of Official Copy).
Supplemental Notice of Allowance received for U.S. Appl. No. 17/975,141, mailed on Aug. 12, 2024, 2 pages.
3C Blogger Kisplay Share, "Samsung Galaxy Tab S Hands-on SideSync 3.0 Is Amazing", http://www.samsung.com/tw/article/galaxy-tab-s-blogger-kisplay., Jul. 4, 2014, 4 pages.
"Accepted Outlook Meetings Move to Deleted Folder", Available online at:—https://social.technet.microsoft.com/Forums/office/en-US/f3301c9a-a93f-49f7-be13-c642e285f150/accepted-outlook-meetings-move-to-deleted-folder?forum=outlook, Jan. 12, 2011, 4 pages.
Advisory Action received for U.S. Appl. No. 14/752,776, mailed on Aug. 31, 2018, 3 pages.
Advisory Action received for U.S. Appl. No. 14/815,898, mailed on Aug. 30, 2016, 3 pages.
Advisory Action received for U.S. Appl. No. 14/822,769, mailed on Apr. 30, 2018, 4 pages.
Advisory Action received for U.S. Appl. No. 14/833,014, mailed on Jan. 27, 2017, 3 pages.
Advisory Action received for U.S. Appl. No. 14/863,099, mailed on Sep. 8, 2016, 3 pages.
Advisory Action received for U.S. Appl. No. 15/405,122, mailed on Apr. 18, 2022, 5 pages.
Advisory Action received for U.S. Appl. No. 16/377,892, mailed on Apr. 9, 2021, 4 pages.
Advisory Action received for U.S. Appl. No. 16/378,136, mailed on Apr. 12, 2021, 4 pages.
Advisory Action received for U.S. Appl. No. 16/806,981, mailed on Jun. 14, 2021, 6 pages.
Advisory Action received for U.S. Appl. No. 16/935,002, mailed on May 6, 2022, 3 pages.
Advisory Action received for U.S. Appl. No. 16/943,737, mailed on Jun. 1, 2022, 6 pages.
Advisory Action received for U.S. Appl. No. 17/181,089, mailed on Dec. 8, 2023, 3 pages.
Advisory Action received for U.S. Appl. No. 17/181,089, mailed on Dec. 20, 2022, 4 pages.
Airshow,"Airshow App for Mobile Devices", 2012, 4 pages.
Android 2.3.4 User's Guide, Online available at:https://static.googleusercontent.com/media/www.google.com/en//help/hc/pdfs/mobile/A ndroidUsersGuide-2.3.4.pdf, May 20, 2011, 384 pages.
Android Central, "BeWeather weather app for Android", Available online at: <https://www.youtube.com/watch?v=G2EY2K-XkSI>, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Androidika, "Butterfly 3D Live Wallpaper 1.0 APK", Available at: <http://net-suckga-ilauncher2.apk-dl.com/butterfly-3d-live-wallpaper>, Feb. 26, 2013, 7 pages.
Applicant-Initiated Interview Summary received for U.S. Appl. No. 16/265,938, mailed on Mar. 11, 2020, 5 pages.
Applicant-Initiated Interview Summary received for U.S. Appl. No. 16/583,994, mailed on Apr. 3, 2020, 5 pages.
Applicant-Initiated Interview Summary received for U.S. Appl. No. 16/806,981, mailed on Jan. 28, 2022, 4 pages.
Applicant-Initiated Interview Summary received for U.S. Appl. No. 17/188,228, mailed on Jun. 14, 2022, 9 pages.
Applicant-Initiated Interview Summary received for U.S. Appl. No. 17/746,807, mailed on Jun. 9, 2023, 2 pages.
Applicant-Initiated Interview Summary received for U.S. Appl. No. 17/746,807, mailed on Mar. 31, 2023, 2 pages.
Applicant-Initiated Interview Summary received for U.S. Appl. No. 15/405,122, mailed on Dec. 22, 2020, 5 pages.
Applicant-Initiated Interview Summary received for U.S. Appl. No. 15/405,122, mailed on Jul. 7, 2021, 4 pages.
Applicant-Initiated Interview Summary received for U.S. Appl. No. 15/405,122, mailed on Mar. 1, 2022, 4 pages.
Applicant-Initiated Interview Summary received for U.S. Appl. No. 15/405,122, mailed on May 21, 2020, 5 pages.
Applicant-Initiated Interview Summary received for U.S. Appl. No. 16/144,264, mailed on Jul. 22, 2020, 5 pages.
Applicant-Initiated Interview Summary received for U.S. Appl. No. 16/147,523, mailed on Apr. 27, 2020, 3 pages.
Applicant-Initiated Interview Summary received for U.S. Appl. No. 16/147,523, mailed on Dec. 10, 2021, 4 pages.
Applicant-Initiated Interview Summary received for U.S. Appl. No. 16/147,523, mailed on Jun. 13, 2022, 4 pages.
Applicant-Initiated Interview Summary received for U.S. Appl. No. 16/147,523, mailed on Oct. 26, 2020, 3 pages.
Applicant-Initiated Interview Summary received for U.S. Appl. No. 16/147,523, mailed on Sep. 14, 2021, 3 pages.
Applicant-Initiated Interview Summary received for U.S. Appl. No. 16/259,954, mailed on Mar. 23, 2020, 3 pages.
Applicant-Initiated Interview Summary received for U.S. Appl. No. 16/265,938, mailed on May 28, 2020, 5 pages.
Applicant-Initiated Interview Summary received for U.S. Appl. No. 16/281,838, mailed on Jun. 2, 2020, 5 pages.
Applicant-Initiated Interview Summary received for U.S. Appl. No. 16/377,892, mailed on Mar. 26, 2021, 2 pages.
Applicant-Initiated Interview Summary received for U.S. Appl. No. 16/377,892, mailed on Oct. 13, 2020, 5 pages.
Applicant-Initiated Interview Summary received for U.S. Appl. No. 16/378,136, mailed on Mar. 26, 2021, 2 pages.
Applicant-Initiated Interview Summary received for U.S. Appl. No. 16/378,136, mailed on Oct. 13, 2020, 4 pages.
Applicant-Initiated Interview Summary received for U.S. Appl. No. 16/583,981, mailed on Mar. 9, 2020, 5 pages.
Applicant-Initiated Interview Summary received for U.S. Appl. No. 16/583,981, mailed on Sep. 14, 2020, 6 pages.
Applicant-Initiated Interview Summary received for U.S. Appl. No. 16/583,994, mailed on May 28, 2021, 5 pages.
Applicant-Initiated Interview Summary received for U.S. Appl. No. 16/583,994, mailed on Nov. 24, 2020, 4 pages.
Applicant-Initiated Interview Summary received for U.S. Appl. No. 16/653,857, mailed on Dec. 14, 2020, 3 pages.
Applicant-Initiated Interview Summary received for U.S. Appl. No. 16/653,857, mailed on May 3, 2021, 4 pages.
Applicant-Initiated Interview Summary received for U.S. Appl. No. 16/679,967, mailed on Feb. 10, 2022, 2 pages.
Applicant-Initiated Interview Summary received for U.S. Appl. No. 16/679,967, mailed on Jun. 1, 2022, 2 pages.
Applicant-Initiated Interview Summary received for U.S. Appl. No. 16/679,967, mailed on Oct. 25, 2021, 2 pages.
Applicant-Initiated Interview Summary received for U.S. Appl. No. 16/723,583, mailed on Dec. 28, 2020, 6 pages.
Applicant-Initiated Interview Summary received for U.S. Appl. No. 16/749,929, mailed on Oct. 13, 2020, 4 pages.
Applicant-Initiated Interview Summary received for U.S. Appl. No. 16/935,002, mailed on Sep. 21, 2021, 4 pages.

(56) References Cited

OTHER PUBLICATIONS

Applicant-Initiated Interview Summary received for U.S. Appl. No. 16/943,737, mailed on Apr. 29, 2022, 6 pages.
Applicant-Initiated Interview Summary received for U.S. Appl. No. 16/943,737, mailed on Sep. 7, 2021, 4 pages.
Applicant-Initiated Interview Summary received for U.S. Appl. No. 17/013,778, mailed on Feb. 28, 2022, 2 pages.
Applicant-Initiated Interview Summary received for U.S. Appl. No. 17/041,350, mailed on Aug. 18, 2021, 2 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/103,436, mailed on Sep. 22, 2021, 2 pages.
Applicant-Initiated Interview Summary received for U.S. Appl. No. 17/181,089, mailed on Apr. 7, 2023, 5 pages.
Applicant-Initiated Interview Summary received for U.S. Appl. No. 17/181,089, mailed on May 16, 2023, 4 pages.
Applicant-Initiated Interview Summary received for U.S. Appl. No. 17/181,089, mailed on Nov. 22, 2022, 3 pages.
Applicant-Initiated Interview Summary received for U.S. Appl. No. 17/181,089, mailed on Nov. 28, 2023, 3 pages.
Applicant-Initiated Interview Summary received for U.S. Appl. No. 17/181,089, mailed on Oct. 7, 2022, 4 pages.
Applicant-Initiated Interview Summary received for U.S. Appl. No. 17/181,089, mailed on Sep. 18, 2023, 3 pages.
Applicant-Initiated Interview Summary received for U.S. Appl. No. 17/188,228, mailed on Sep. 23, 2022, 2 pages.
Applicant-Initiated Interview Summary received for U.S. Appl. No. 17/314,948, mailed on Oct. 21, 2022, 6 pages.
Applicant-Initiated Interview Summary received for U.S. Appl. No. 17/410,169, mailed on Apr. 25, 2023, 6 pages.
Applicant-Initiated Interview Summary received for U.S. Appl. No. 17/410,169, mailed on Jan. 26, 2024, 5 pages.
Applicant-Initiated Interview Summary received for U.S. Appl. No. 17/410,169, mailed on Nov. 7, 2022, 5 pages.
Applicant-Initiated Interview Summary received for U.S. Appl. No. 17/509,356, mailed on Feb. 3, 2023, 3 pages.
Applicant-Initiated Interview Summary received for U.S. Appl. No. 17/516,537, mailed on Jul. 5, 2022, 4 pages.
Applicant-Initiated Interview Summary received for U.S. Appl. No. 17/516,537, mailed on Nov. 22, 2022, 2 pages.
Applicant-Initiated Interview Summary received for U.S. Appl. No. 17/572,117, mailed on Feb. 1, 2023, 4 pages.
Applicant-Initiated Interview Summary received for U.S. Appl. No. 17/572,117, mailed on Nov. 17, 2022, 4 pages.
Applicant-Initiated Interview Summary received for U.S. Appl. No. 17/746,807, mailed on Nov. 3, 2023, 2 pages.
Applicant-Initiated Interview Summary received for U.S. Appl. No. 17/951,875, mailed on Feb. 28, 2023, 2 pages.
Applicant-Initiated Interview Summary received for U.S. Appl. No. 17/951,875, mailed on Jun. 27, 2023, 2 pages.
Applicant-Initiated Interview Summary received for U.S. Appl. No. 17/975,141, mailed on Aug. 30, 2023, 4 pages.
Applicant-Initiated Interview Summary received for U.S. Appl. No. 18/088,309, mailed on Feb. 28, 2024, 2 pages.
Applicant-Initiated Interview Summary received for U.S. Appl. No. 18/088,309, mailed on Oct. 27, 2023, 2 pages.
Applicant-Initiated Interview Summary received for U.S. Appl. No. 18/119,789, mailed on Jul. 31, 2023, 4 pages.
Applicant-Initiated Interview Summary received for U.S. Appl. No. 18/119,789, mailed on Sep. 27, 2023, 3 pages.
Applicant-Initiated Interview Summary received for U.S. Appl. No. 18/122,625, mailed on Jan. 19, 2024, 2 pages.
Applicant-Initiated Interview Summary received for U.S. Appl. No. 18/197,681, mailed on Mar. 18, 2024, 4 pages.
Applicant-Initiated Interview Summary received for U.S. Appl. No. 18/211,150, mailed on Apr. 3, 2024, 3 pages.
Avdonin, Nikita, "Astroviewer 3D", Available at <:https:jjwww.youtube.comjwatch?v=zY0tslx3JHY/>, Nov. 5, 2013, 2 pages.

Axiang's Network Notebook, Deep Analysis on Samsung's 2013 New Flagship: tell you what kind of mobile phone Galaxy S4 is!, available at: https://axiang.cc/archives/6115, Apr. 22, 2013, 4 pages.
Baar, Marius, "Fitbit Ace—Unboxing, Setup and 24 Hour Test", YouTube [online] [video], Retrieved from: <https://youtu.be/ekvkfqOyrls>.See especially 4:44., Oct. 24, 2018, 3 pages.
Board Decision received for Chinese Patent Application No. 201580046788.2, mailed on Jun. 6, 2022, 17 pages.
Board Decision received for Chinese Patent Application No. 201680012936.3, mailed on Jun. 16, 2021, 2 pages.
Board Decision received for Chinese Patent Application No. 202010295272.4, mailed on Dec. 14, 2023, 2 pages.
Board Opinion received for Chinese Patent Application No. 201580046788.2, mailed on Dec. 29, 2021, 10 pages.
Bogdanov, Alexei, "SKMEI 1016", XP054977588, Available online at <URL:https://www.youtube.com/watch?v=E4q4Fug05Fw>, Jun. 21, 2014, 2 pages.
Brief Communication Regarding Oral Proceedings received for European Patent Application No. 15730925.3, mailed on Feb. 18, 2020, 7 pages.
Brief Communication Regarding Oral Proceedings received for European Patent Application No. 15760008.1, mailed on Sep. 13, 2021, 8 pages.
Brief Communication Regarding Oral Proceedings received for European Patent Application No. 16708003.5, mailed on May 8, 2023, 1 page.
Brief Communication Regarding Oral Proceedings received for European Patent Application No. 17184710.6, mailed on Feb. 19, 2020, 2 pages.
Brief Communication Regarding Oral Proceedings received for European Patent Application No. 17184710.6, mailed on Mar. 9, 2020, 2 pages.
Brief Communication Regarding Oral Proceedings received for European Patent Application No. 20176616.9, mailed on Jun. 9, 2022, 1 page.
Brief Communication Regarding Oral Proceedings received for European Patent Application No. 20176616.9, mailed on May 27, 2022, 1 page.
Brief Communication Regarding Oral Proceedings received for European Patent Application No. 20192404.0, mailed on May 4, 2022, 3 pages.
Brief Communication Regarding Oral Proceedings received for European Patent Application No. 20192404.0, mailed on May 18, 2022, 1 page.
Brief Communication Regarding Oral Proceedings received for European Patent Application No. 21165295.3, mailed on Feb. 27, 2024, 1 page.
Castellini, Rick, "Google Earth", Retrieved from <https://www.youtube.com/watch?v=bgjMSBXsFZQ>, How to Use Google Earth for Beginners, Feb. 12, 2013, 3 pages.
Certificate of Examination received for Australian Patent Application No. 2018101855, mailed on Aug. 6, 2019, 2 pages.
Certification of Examination received for Australian Patent Application No. 2018100158, mailed on Oct. 23, 2018, 2 pages.
Chan, Christine, "Handoff Your Browser to Your iPhone or iPad! Plus a Chance to Win a Copy!", Apr. 12, 2011, 2 pages.
Chenzai, "Apple, please don't screw up notifications on the Apple Watch", Available online at:—https://digi.tech.qq.com/a/20140918/060747.htm. also published on the English webpage https://www.theverge.com/2014/9/9/6127913/apple-please-dont-screw-up-notifications-on-the-apple-watch, Sep. 18, 2014, 8 pages.
Clark Josh, "Designing Great iPhone Apps", O'Reilly Japan Co., O'Reilly Tim, vol. 1, May 24, 2012, 5 pages.
Clock & Calendar for SmartWatch 2, https://www.youtube.com/watch?v=Uj-K2vMnrj8, Nov. 20, 2013, 2 pages.
Codrington, Simon, "Intuitive Scrolling Interfaces with CSS Scroll Snap Points", Online Available at: https://www.sitepoint.com/intuitive-scrolling-interfaces-with-css-scroll-snap-points/, Dec. 8, 2015, 14 pages.
Communication for Board of Appeal received for European Patent Application No. 17184710.6, mailed on Feb. 29, 2024, 13 pages.
Corrected Notice of Allowance received for U.S. Appl. No. 14/641,251, mailed on Jun. 17, 2016, 2 pages.

(56) References Cited

OTHER PUBLICATIONS

Corrected Notice of Allowance received for U.S. Appl. No. 14/815,879, mailed on Jul. 13, 2017, 3 pages.
Corrected Notice of Allowance received for U.S. Appl. No. 14/815,879, mailed on Jul. 28, 2017, 3 pages.
Corrected Notice of Allowance received for U.S. Appl. No. 14/815,879, mailed on Sep. 21, 2017, 2 pages.
Corrected Notice of Allowance received for U.S. Appl. No. 14/822,769, mailed on Jan. 17, 2019, 8 pages.
Corrected Notice of Allowance received for U.S. Appl. No. 14/839,897, mailed on Jan. 23, 2019, 6 pages.
Corrected Notice of Allowance received for U.S. Appl. No. 14/839,903, mailed on Feb. 13, 2019, 2 pages.
Corrected Notice of Allowance received for U.S. Appl. No. 14/839,903, mailed on Mar. 1, 2019, 2 pages.
Corrected Notice of Allowance received for U.S. Appl. No. 14/841,402, mailed on May 4, 2018, 2 pages.
Corrected Notice of Allowance received for U.S. Appl. No. 14/841,614, mailed on Jan. 8, 2019, 3 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 15/355,956, mailed on Jan. 3, 2020, 2 pages.
Corrected Notice of Allowance received for U.S. Appl. No. 15/798,257, mailed on Aug. 26, 2019, 2 pages.
Corrected Notice of Allowance received for U.S. Appl. No. 15/798,257, mailed on Jul. 9, 2019, 2 pages.
Corrected Notice of Allowance received for U.S. Appl. No. 15/798,257, mailed on Jun. 12, 2019, 2 pages.
Corrected Notice of Allowance received for U.S. Appl. No. 16/103,699, mailed on May 29, 2019, 2 pages.
Corrected Notice of Allowance received for U.S. Appl. No. 16/281,838, mailed on Oct. 30, 2020, 2 pages.
Corrected Notice of Allowance received for U.S. Appl. No. 16/377,892, mailed on Aug. 11, 2021, 3 pages.
Corrected Notice of Allowance received for U.S. Appl. No. 16/378,136, mailed on Aug. 11, 2021, 2 pages.
Corrected Notice of Allowance received for U.S. Appl. No. 16/378,136, mailed on Jun. 11, 2021, 2 pages.
Corrected Notice of Allowance received for U.S. Appl. No. 16/583,981, mailed on Apr. 6, 2021, 3 pages.
Corrected Notice of Allowance received for U.S. Appl. No. 16/583,981, mailed on May 17, 2021, 3 pages.
Corrected Notice of Allowance received for U.S. Appl. No. 16/583,994, mailed on Jul. 6, 2021, 3 pages.
Corrected Notice of Allowance received for U.S. Appl. No. 16/935,002, mailed on Jul. 17, 2023, 5 pages.
Corrected Notice of Allowance received for U.S. Appl. No. 16/935,002, mailed on Mar. 2, 2023, 2 pages.
Corrected Notice of Allowance received for U.S. Appl. No. 16/935,002, mailed on Mar. 28, 2023, 2 pages.
Corrected Notice of Allowance received for U.S. Appl. No. 17/013,778, mailed on Mar. 7, 2023, 5 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/103,436, mailed on Dec. 22, 2021, 2 pages.
Corrected Notice of Allowance received for U.S. Appl. No. 17/509,356, mailed on Jun. 13, 2023, 2 pages.
Corrected Notice of Allowance received for U.S. Appl. No. 17/509,356, mailed on May 24, 2023, 2 pages.
Decision on Acceptance received for Australian Patent Application No. 2015298710, mailed on Jul. 19, 2019, 18 pages.
Decision on Acceptance received for Australian Patent Application No. 2018201089, mailed on Apr. 20, 2021, 28 pages.
Decision on Appeal received for U.S. Appl. No. 14/833,014, mailed on Oct. 30, 2019, 10 pages.
Decision on Appeal received for U.S. Appl. No. 14/774,664, mailed on Sep. 12, 2019, 8 pages.
Decision on Appeal received for U.S. Appl. No. 14/815,890, mailed on Nov. 24, 2020, 13 pages.
Decision on Appeal received for U.S. Appl. No. 14/863,099, mailed on Aug. 22, 2019, 9 pages.
Decision on Appeal received for U.S. Appl. No. 15/128,952, mailed on Dec. 28, 2020, 23 pages.
Decision on Appeal received for U.S. Appl. No. 15/405,122, mailed on Dec. 12, 2023, 18 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant received for Danish Patent Application No. PA201570664, mailed on Feb. 20, 2017, 2 pages.
Decision to Grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA201670320, mailed on Oct. 18, 2018, 2 pages.
Decision to Grant received for Danish Patent Application No. PA202070609, mailed on May 3, 2021, 2 pages.
Decision to Grant received for European Patent Application No. 15711969.4, mailed on Sep. 26, 2019, 2 pages.
Decision to Grant received for European Patent Application No. 15712218.5, mailed on Jun. 7, 2018, 2 pages.
Decision to Grant received for European Patent Application No. 15730925.3, mailed on Dec. 9, 2021, 2 pages.
Decision to Grant received for European Patent Application No. 15739110.3, mailed on Sep. 19, 2019, 2 pages.
Decision to Grant received for European Patent Application No. 15747595.5, mailed on Jul. 16, 2020, 2 pages.
Decision to Grant received for European Patent Application No. 15759998.6, mailed on Jun. 18, 2020, 2 pages.
Decision to Grant received for European Patent Application No. 15760008.1, mailed on Aug. 11, 2022, 2 pages.
Decision to Grant received for European Patent Application No. 15787091.6, mailed on Dec. 3, 2020, 2 pages.
Decision to Grant received for European Patent Application No. 16708003.5, mailed on Oct. 19, 2023, 2 pages.
Decision to Grant received for European Patent Application No. 19185318.3, mailed on Mar. 31, 2022, 3 pages.
Decision to Grant received for European Patent Application No. 19203942.8, mailed on Nov. 16, 2023, 2 pages.
Decision to Grant received for European Patent Application No. 19722280.5, mailed on Feb. 1, 2024, 2 pages.
Decision to Grant received for European Patent Application No. 20185974.1, mailed on Aug. 19, 2022, 3 pages.
Decision to Grant received for European Patent Application No. 20729346.5, mailed on Nov. 16, 2023, 2 pages.
Decision to Refuse received for European Patent Application No. 15730924.6, mailed on Mar. 15, 2019, 12 pages.
Decision to Refuse received for European Patent Application No. 17184710.6, mailed on Jun. 16, 2020, 9 pages.
Decision to Refuse received for European Patent Application No. 17810749.6, mailed on Jan. 29, 2021, 24 pages.
Decision to Refuse received for European Patent Application No. 20192404.0, mailed on Jun. 14, 2022, 15 pages.
Deluxe Moon -Guide, available online at:- https://web.archive.org/web/20130520161057/http://www.lifewaresolutions.com/deluxe_moon_guide_ip.html, May 20, 2013, 5 pages.
Dharmasena, Anusha, "iMessage-send as text message Option", YouTube, Available online at: <https://www.youtube.com/watch?v=hXG-MdIW6FA>, Feb. 18, 2013, 1 page.
Ebpman Tech Reviews,"LG G3 Tips: How to customize the clock face", Available online at: https://www.youtube.com/watch?v=evraMWFb1fY, Jul. 25, 2014, 1 page.
Ellis Benus, "Use a Phone Number in the Google Calendar Where Line for One Click Calling", Available online at: https://ellisbenus.

(56) References Cited

OTHER PUBLICATIONS com/ellis-benus/use-a-phone-number-in-the-google-calender-where-line-for-one-click-calling, Ellis Benus-Small Business Web Guru, Oct. 3, 2012, 2 pages.
Ergonomic requirements for office work with visual display terminals VDTs), Part 13: User guidance, International Standard ISO, Zuerich, CH, vol. 9241-13, Jul. 15, 1998, 40 pages.
European Search Report received for European Patent Application No. 20192404.0, mailed on Nov. 20, 2020, 4 pages.
European Search Report received for European Patent Application No. 21165295.3, mailed on Jun. 18, 2021, 4 pages.
Evgenyevich Sergey, "Earth & Moon in HD Gyro 3D", Available at <https://www.youtube.com/watch?v=IRwNcaSYrls/>, Dec. 1, 2013, 2 pages.
Examiner-Initiated Interview Summary received for U.S. Appl. No. 16/806,981, mailed on Mar. 26, 2021, 2 pages.
Examiner-Initiated Interview Summary received for U.S. Appl. No. 16/806,981, mailed on Jan. 13, 2022, 4 pages.
Examiner-Initiated Interview Summary received for U.S. Appl. No. 16/806,981, mailed on May 24, 2021, 4 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/815,890, mailed on Mar. 20, 2020, 16 pages.
Examiner's Answer to Appeal Brief received for U.S. Appl. No. 14/833,014, mailed on Nov. 2, 2017, 48 pages.
Examiner's Answer to Appeal Brief received for U.S. Appl. No. 14/863,099, mailed on Jul. 28, 2017, 31 pages.
Examiner's Answer to Appeal Brief received for U.S. Appl. No. 15/128,952, mailed on Jan. 8, 2020, 9 pages.
Examiner's Answer to Appeal Brief received for U.S. Appl. No. 15/405,122, mailed on Jan. 11, 2023, 16 pages.
Examiner's Answer to Appeal Brief received for U.S. Appl. No. 16/943,737, mailed on Feb. 2, 2024, 15 pages.
Examiner's Answer to Appeal Brief received for U.S. Appl. No. 17/013,778, mailed on Dec. 20, 2022, 9 pages.
Examiner's Answer to Appeal Brief received for U.S. Appl. No. 17/181,089, mailed on Apr. 15, 2024, 11 pages.
Examiner's Answer to Appeal Brief received for U.S. Appl. No. 18/119,789, mailed on Jan. 22, 2024, 45 pages.
Examiner's Pre-Review Report received for Japanese Patent Application No. 2018-080122, mailed on Feb. 25, 2020, 6 pages.
Extended European Search Report for European Application No. 19185318.3, mailed on Nov. 20, 2019, 8 pages.
Extended European Search Report includes Partial European Search Report and European Search Opinion) received for European Patent Application No. 16190252.3, mailed on Mar. 1, 2017, 10 pages.
Extended European Search Report includes Supplementary European Search Report and Search Opinion) received for European Patent Application No. 17184710.6, mailed on Nov. 28, 2017, 10 pages.
Extended European Search Report received for European Patent Application No. 19203942.8, mailed on Apr. 1, 2020, 10 pages.
Extended European Search Report received for European Patent Application No. 20176616.9, mailed on Sep. 8, 2020, 7 pages.
Extended European Search Report received for European Patent Application No. 20185974.1, mailed on Oct. 28, 2020, 7 pages.
Extended European Search Report received for European Patent Application No. 22157106.0, mailed on Jun. 27, 2022, 8 pages.
Extended European Search Report received for European Patent Application No. 22169639.6, mailed on Jul. 19, 2022, 14 pages.
Extended European Search Report received for European Patent Application No. 22179347.4, mailed on Oct. 13, 2022, 7 pages.
Extended European Search Report received for European Patent Application No. 22188724.3, mailed on Mar. 2, 2023, 14 pages.
Extended European Search Report received for European Patent Application No. 22197186.4, mailed on Jan. 19, 2023, 9 pages.
Extended European Search Report received for European Patent Application No. 23158566.2, mailed on Jun. 14, 2023, 10 pages.
Extended European Search Report received for European Patent Application No. 23173355.1, mailed on Aug. 4, 2023, 8 pages.
Farmboyreef,"Apple watch controlling your tv", Available online at: https://www.youtube.com/watch?v=xaJPG0Wm3Tg, Jun. 23, 2015, 3 pages.
Feldman, Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/752,776, mailed on May 29, 2018, 36 pages.
Final Office Action received for U.S. Appl. No. 14/774,664, mailed on Aug. 25, 2017, 23 pages.
Final Office Action received for U.S. Appl. No. 14/815,890, mailed on Feb. 26, 2018, 20 pages.
Final Office Action received for U.S. Appl. No. 14/815,890, mailed on May 14, 2019, 22 pages.
Final Office Action received for U.S. Appl. No. 14/815,890, mailed on Nov. 21, 2016, 18 pages.
Final Office Action received for U.S. Appl. No. 14/815,898, mailed on Jun. 9, 2016, 19 pages.
Final Office Action received for U.S. Appl. No. 14/822,769, mailed on Jan. 4, 2018, 25 pages.
Final Office Action received for U.S. Appl. No. 14/833,014, mailed on Oct. 26, 2016, 32 pages.
Final Office Action received for U.S. Appl. No. 14/839,897, mailed on Jan. 10, 2018, 16 pages.
Final Office Action received for U.S. Appl. No. 14/841,402, mailed on Aug. 25, 2017, 17 pages.
Final Office Action received for U.S. Appl. No. 14/841,614, mailed on May 10, 2018, 13 pages.
Final Office Action received for U.S. Appl. No. 14/841,623, mailed on Sep. 5, 2017, 16 pages.
Final Office Action received for U.S. Appl. No. 14/863,099, mailed on Apr. 21, 2016, 20 pages.
Final Office Action received for U.S. Appl. No. 15/128,952, mailed on Jul. 18, 2018, 19 pages.
Final Office Action received for U.S. Appl. No. 15/268,115, mailed on Oct. 11, 2017, 48 pages.
Final Office Action received for U.S. Appl. No. 15/352,215, mailed on Mar. 7, 2019, 22 pages.
Final Office Action received for U.S. Appl. No. 15/405,122, mailed on Jan. 21, 2020, 36 pages.
Final Office Action received for U.S. Appl. No. 15/405,122, mailed on Nov. 5, 2021, 45 pages.
Final Office Action received for U.S. Appl. No. 16/147,523, mailed on Aug. 4, 2020, 15 pages.
Final Office Action received for U.S. Appl. No. 16/147,523, mailed on Oct. 14, 2021, 22 pages.
Final Office Action received for U.S. Appl. No. 16/265,938, mailed on Apr. 7, 2020, 45 pages.
Final Office Action received for U.S. Appl. No. 16/377,892, mailed on Jan. 28, 2021, 11 pages.
Final Office Action received for U.S. Appl. No. 16/378,136, mailed on Jan. 28, 2021, 9 pages.
Final Office Action received for U.S. Appl. No. 16/583,981, mailed on Apr. 16, 2020, 19 pages.
Final Office Action received for U.S. Appl. No. 16/583,994, mailed on Jul. 23, 2020, 16 pages.
Final Office Action received for U.S. Appl. No. 16/653,857, mailed on Feb. 10, 2021, 43 pages.
Final Office Action received for U.S. Appl. No. 16/679,967, mailed on Nov. 10, 2021, 14 pages.
Final Office Action received for U.S. Appl. No. 16/723,583, mailed on Feb. 5, 2021, 15 pages.
Final Office Action received for U.S. Appl. No. 16/806,981, mailed on Apr. 14, 2021, 24 pages.
Final Office Action received for U.S. Appl. No. 16/806,981, mailed on Mar. 1, 2022, 33 pages.
Final Office Action received for U.S. Appl. No. 16/935,002, mailed on Jan. 5, 2022, 25 pages.
Final Office Action received for U.S. Appl. No. 16/943,737, mailed on Feb. 4, 2022, 24 pages.

(56) References Cited

OTHER PUBLICATIONS

Final Office Action received for U.S. Appl. No. 17/013,778, mailed on Apr. 1, 2022, 11 pages.
Final Office Action received for U.S. Appl. No. 17/041,350, mailed on Sep. 17, 2021, 25 pages.
Final Office Action received for U.S. Appl. No. 17/181,089, mailed on Apr. 19, 2023, 13 pages.
Final Office Action received for U.S. Appl. No. 17/181,089, mailed on Oct. 13, 2023, 15 pages.
Final Office Action received for U.S. Appl. No. 17/181,089, mailed on Oct. 21, 2022, 15 pages.
Final Office Action received for U.S. Appl. No. 17/188,228, mailed on Jul. 6, 2022, 13 pages.
Final Office Action received for U.S. Appl. No. 17/314,948, mailed on Mar. 7, 2023, 31 pages.
Final Office Action received for U.S. Appl. No. 17/410,169, mailed on Feb. 6, 2023, 47 pages.
Final Office Action received for U.S. Appl. No. 17/410,169, mailed on Feb. 23, 2024, 49 pages.
Final Office Action received for U.S. Appl. No. 17/516,537, mailed on Oct. 11, 2022, 9 pages.
Final Office Action received for U.S. Appl. No. 17/572,117, mailed on Dec. 22, 2022, 16 pages.
Final Office Action received for U.S. Appl. No. 17/746,807, mailed on Apr. 26, 2023, 16 pages.
Final Office Action received for U.S. Appl. No. 17/746,807, mailed on Feb. 20, 2024, 24 pages.
Final Office Action received for U.S. Appl. No. 17/951,875, mailed on May 30, 2023, 12 pages.
Final Office Action received for U.S. Appl. No. 18/088,309, mailed on Jan. 9, 2024, 13 pages.
Final Office Action received for U.S. Appl. No. 18/119,789, mailed on Aug. 30, 2023, 29 pages.
Final Office Action received for U.S. Appl. No. 18/122,625, mailed on Apr. 5, 2024, 12 pages.
Final Office Action received for U.S. Appl. No. 14/815,879, mailed on Mar. 24, 2016, 46 pages.
Final Office Action received for U.S. Appl. No. 14/839,903, mailed on Sep. 18, 2018, 11 pages.
Final Office Action received for U.S. Appl. No. 14/822,769, mailed on Nov. 9, 2016, 18 pages.
Final Office Action received for U.S. Appl. No. 15/135,328 mailed on Nov. 9, 2018, 55 pages.
First Action Interview received for U.S. Appl. No. 14/815,890, mailed on Aug. 12, 2016, 3 pages.
Frakes, Dan, "How to Get Started with Airplay", availble at: https://www.macworld.com/article/2039770/how-to-get-started-with-airplay.html, Macworld, May 27, 2013, 8 pages.
Franks Tech Help,"DSLR Camera Remote Control on Android Tablet, DSLR Dashboard, Nexus 10, Canon Camera, OTG Host Cable", Available online at : https://www.youtube.com/watch?v=DD4dCVinreU, Dec. 10, 2013, 1 page.
Fuchphone Extras,"LG G Watch—Designs | Watch Faces", Available online at: https://www.youtube.com/watch?v=yqxzqdi_MSE, Jul. 27, 2014, 1 page.
Fuchphone Extras,"Samsung Gear Live—Designs | Watch Faces", Available online at: https://www.youtube.com/watch?v=fFjtVAxyimE, Jul. 26, 2014, 1 page.
Fuji Film,"Taking Pictures Remotely : Free iPhone/Android App Fuji Film Camera Remote", Available at <http://app.fujifilm-dsc.com/en/camera_remote/guide05.html>, Apr. 22, 2014, 3 pages.
Fukuda Kazuhiro, "Xperia Z1 Perfect Manual", Sotec Co., Ltd., No. 1, Nov. 15, 2013, pp. 217-218.
Gazer,"iPhone 4S Super Manual", Shuwa System Co., Saito Kazukuni, vol. 1, Jun. 6, 2013, 7 pages.
Geary, David, "Programming HTML5 Canvas", O'Reilly Japan, Inc., No. 1, Jul. 23, 2014, pp. 327-330.
Gil Lory, "How to control Apple TV with your Apple Watch", Available online at: https://www.imore.com/how-control-your-apple-tv-remote-app%ADapple-watch], Jun. 6, 2016, 24 pages.
Google Earth 7.0.1.8244, retrieved from the Internet: http://dl.google.com/dl/earth/client/ge7/release_7_0_1/googleearth-win-bundle-7.0.1.8244.exe, Oct. 29, 2012, 1 page.
Google Earth on Android—AndroidCentral.com, Available online at:—https://www.youtube.com/watch?v=1WxN1RunrE4, Feb. 22, 2010, 1 page.
Gottabemobile,"How to Change Watch Faces on Android Wear", available online at URL:https://www.youtube.com/watch?v=B8iRGkGq6a8, Jul. 9, 2014, 4 pages.
GT-19500 (Galaxy S4) User Manual, Samsung, Rev.1.1, http://org.downloadcenter.samsung.com/downloadfile/ContentsFile.aspx?CDSite=UNI_TW&CttFileID=5406113&CDCttType=UM&ModelType=N&ModelName=GTI9500&UM_Open_Taiwan_Jellybean_Chi_Rev.1.1_130520.pdf., May 2013, 14 pages.
Han, Sangwoo, "AR Glasses interaction prototype", Available Online at: https://sangwoohan.cargo.site/AR-Glasses-interaction-prototype, Oct. 2020, 4 pages.
Hobbyistsoftwareltd,"VLC Remote", Online available at: https://watchaware.com/watch-apps/297244048, 2016, 7 pages.
Horowitz ,Paul, "Always Show Scroll Bars in Mac OS X", OS X Daily, available online at:URL:http:jjosxdaily.com/2011/08/03/show-scroll-bars-mac-os-x-lion/, Aug. 3, 2011, 7 pages.
Instruction Manual, Detailed version, KDDI Corporation, No. 1, vol. 1, Jun. 2014, 4 pages.
Intention to Grant received for Danish Patent Application No. PA201570496 , mailed on Feb. 17, 2016, 6 pages.
Intention to Grant received for Danish Patent Application No. PA201570563, mailed on Mar. 17, 2016, 7 pages.
Intention to Grant received for Danish Patent Application No. PA201570773, mailed on Mar. 9, 2018, 2 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA201670320, mailed on May 17, 2018, 2 pages.
Intention to Grant received for Danish Patent Application No. PA202070609, mailed on Jan. 14, 2021, 2 pages.
Intention to Grant received for European Patent Application No. 15711969.4, mailed on May 29, 2019, 11 pages.
Intention to Grant received for European Patent Application No. 15712218.5, mailed on Jan. 24, 2018, 7 pages.
Intention to Grant received for European Patent Application No. 15730925.3, mailed on Aug. 16, 2021, 10 pages.
Intention to Grant received for European Patent Application No. 15730925.3, mailed on May 28, 2020, 10 pages.
Intention to Grant received for European Patent Application No. 15739110.3, mailed on Mar. 7, 2019, 8 pages.
Intention to Grant received for European Patent Application No. 15739110.3, mailed on Sep. 11, 2019, 6 pages.
Intention to Grant received for European Patent Application No. 15747595.5, mailed on Feb. 17, 2020, 8 pages.
Intention to Grant received for European Patent Application No. 15753796.0, mailed on Jan. 12, 2024, 9 pages.
Intention to Grant received for European Patent Application No. 15759998.6, mailed on Apr. 17, 2020, 10 pages.
Intention to Grant received for European Patent Application No. 15759998.6, mailed on Nov. 21, 2019, 12 pages.
Intention to Grant received for European Patent Application No. 15760008.1, mailed on Apr. 6, 2022, 11 pages.
Intention to Grant received for European Patent Application No. 15760008.1, mailed on Oct. 5, 2021, 11 pages.
Intention to Grant received for European Patent Application No. 15787091.6, mailed on Apr. 23, 2020, 7 pages.
Intention to Grant received for European Patent Application No. 15787091.6, mailed on Sep. 30, 2020, 7 pages.
Intention to Grant received for European Patent Application No. 16708003.5, mailed on Jun. 14, 2023, 9 pages.
Intention to Grant received for European Patent Application No. 16708014.2, mailed on May 10, 2022, 8 pages.
Intention to Grant received for European Patent Application No. 19185318.3, mailed on Dec. 10, 2021, 12 pages.

(56) References Cited

OTHER PUBLICATIONS

Intention to Grant received for European Patent Application No. 19203942.8, mailed on Aug. 1, 2023, 8 pages.
Intention to Grant received for European Patent Application No. 19722280.5, mailed on Sep. 26, 2023, 9 pages.
Intention to Grant received for European Patent Application No. 20185974.1, mailed on Apr. 28, 2022, 8 pages.
Intention to Grant received for European Patent Application No. 20729346.5, mailed on Jul. 10, 2023, 9 pages.
International Preliminary Report on Patentability received for PCT Patent Application No. PCT/US2014/027882, mailed on Sep. 24, 2015, 8 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2015/019317, mailed on Dec. 15, 2016, 18 pages.
International Preliminary Report on Patentability received for PCT Patent Application No. PCT/US2015/034604, mailed on Feb. 16, 2017, 21 pages.
International Preliminary Report on Patentability received for PCT Patent Application No. PCT/US2015/034606, mailed on Feb. 16, 2017, 11 pages.
International Preliminary Report on Patentability received for PCT Patent Application No. PCT/US2015/034607, mailed on Feb. 16, 2017, 18 pages.
International Preliminary Report on Patentability received for PCT Patent Application No. PCT/US2015/038173, mailed on Jan. 5, 2017, 10 pages.
International Preliminary Report on Patentability received for PCT Patent Application No. PCT/US2015/038174, mailed on Jan. 5, 2017, 27 pages.
International Preliminary Report on Patentability received for PCT Patent Application No. PCT/US2015/041424, mailed on Feb. 2, 2017, 13 Pages.
International Preliminary Report on Patentability received for PCT Patent Application No. PCT/US2015/044517, mailed on Mar. 16, 2017, 10 pages.
International Preliminary Report on Patentability received for PCT Patent Application No. PCT/US2015/046262, mailed on Mar. 16, 2017, 26 pages.
International Preliminary Report on Patentability received for PCT Patent Application No. PCT/US2015/047507, mailed on Mar. 16, 2017, 16 pages.
International Preliminary Report on Patentability received for PCT Patent Application No. PCT/US2015/055165, mailed on Sep. 21, 2017, 15 pages.
International Preliminary Report on Patentability received for PCT Patent Application No. PCT/US2016/016621, mailed on Aug. 24, 2017, 8 pages.
International Preliminary Report on Patentability received for PCT Patent Application No. PCT/US2016/017271, mailed on Sep. 21, 2017, 13 pages.
International Preliminary Report on Patentability received for PCT Patent Application No. PCT/US2017/035554, mailed on Dec. 20, 2018, 39 pages.
International Preliminary Report on Patentability received for PCT Patent Application No. PCT/US2019/024792, mailed on Dec. 17, 2020, 9 pages.
International Preliminary Report on Patentability received for PCT Patent Application No. PCT/US2020/026044, mailed on Dec. 9, 2021, 18 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/035446, mailed on Dec. 9, 2021, 14 pages.
International Preliminary Report on Patentability received for PCT Patent Application No. PCT/US2022/044236, mailed on Apr. 4, 2024, 12 pages.
International Preliminary Report on Patentability received for PCT Patent Application No. PCT/US2015/046787, mailed on Mar. 16, 2017., 19 pages.
International Search Report and Written Opinion received for PCT Patent Application No. PCT/US2015/034604, mailed on Nov. 9, 2015, 30 pages.
International Search Report and Written Opinion received for PCT Patent Application No. PCT/US2015/047507, mailed on Feb. 22, 2016, 22 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2015/019298, mailed on Jul. 13, 2015, 17 pages.
International Search Report and Written Opinion received for PCT Patent Application No. PCT/US2015/019317, mailed on Aug. 25, 2015, 24 pages.
International Search Report and Written Opinion received for PCT Patent Application No. PCT/US2015/034606, mailed on Dec. 2, 2015, 17 pages.
International Search Report and Written Opinion received for PCT Patent Application No. PCT/US2015/038173 mailed on Sep. 25, 2015, 13 pages.
International Search Report and Written Opinion received for PCT Patent Application No. PCT/US2015/038174, mailed on Jan. 18, 2016, 38 pages.
International Search Report and Written Opinion received for PCT Patent Application No. PCT/US2015/041424, mailed on Mar. 31, 2016, 18 pages.
International Search Report and Written Opinion received for PCT Patent Application No. PCT/US2015/044517, mailed on Oct. 28, 2015, 13 pages.
International Search Report and Written Opinion received for PCT Patent Application No. PCT/US2015/046262, mailed on Mar. 15, 2016, 34 pages.
International Search Report and Written Opinion received for PCT Patent Application No. PCT/US2015/046787, mailed on Apr. 1, 2016, 26 pages.
International Search Report and Written Opinion received for PCT Patent Application No. PCT/US2015/055165, mailed on Apr. 20, 2016, 22 pages.
International Search Report and Written Opinion received for PCT Patent Application No. PCT/US2016/016621, mailed on May 9, 2016, 12 pages.
International Search Report and Written Opinion received for PCT Patent Application No. PCT/US2016/017271, mailed on Sep. 1, 2016, 18 pages.
International Search Report and Written Opinion received for PCT Patent Application No. PCT/US2017/035554, mailed on Sep. 22, 2017, 42 pages.
International Search Report and Written Opinion received for PCT Patent Application No. PCT/US2019/024792, mailed on Jul. 18, 2019, 13 pages.
International Search Report and Written Opinion received for PCT Patent Application No. PCT/US2020/026044, mailed on Sep. 9, 2020, 26 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/035446, mailed on Nov. 10, 2020, 20 pages.
International Search Report and Written Opinion received for PCT Patent Application No. PCT/US2022/044236, mailed on Mar. 27, 2023, 17 pages.

(56) References Cited

OTHER PUBLICATIONS

International Search Report and Written Opinion received for PCT Patent Application No. PCT/US2023/012260, mailed on Aug. 2, 2023, 22 pages.
International Search Report and Written Opinion received for PCT Patent Application No. PCT/US2023/022410, mailed on Aug. 31, 2023, 21 pages.
International Search Report and Written Opinion received for PCT Patent Application No. PCT/US2015/034607, mailed on Dec. 1, 2015, 23 pages.
Inventerium,"Tropical Fish 14", Available online at: https://www.turbosquid.com/3d-models/tropical-fish-3d-model/388510, Feb. 4, 2008, 2 pages.
Invitation to Pay Additional Fees and Partial International Search Report received for PCT Patent Application No. PCT/US2015/034604 mailed on Sep. 4, 2015, 6 pages.
Invitation to Pay Additional Fees and Partial International Search Report received for PCT Patent Application No. PCT/US2015/034606 mailed on Sep. 9, 2015, 6 pages.
Invitation to Pay Additional Fees received for European Patent Application No. 15747595.5, mailed on Feb. 9, 2018, 6 pages.
Invitation to Pay Additional Fees and Partial International Search Report received for PCT Patent Application No. PCT/US2023/012260, mailed on Jun. 7, 2023, 11 pages.
Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2015/019317, mailed on May 22, 2015, 7 pages.
Invitation to Pay Additional Fees received for PCT Patent Application No. PCT/US2015/034607, mailed on Sep. 30, 2015, 4 pages.
Invitation to Pay Additional Fees received for PCT Patent Application No. PCT/US2015/038174, mailed on Oct. 5, 2015, 5 pages.
Invitation to Pay Additional Fees received for PCT Patent Application No. PCT/US2015/041424, mailed on Nov. 12, 2015, 6 pages.
Invitation to Pay Additional Fees received for PCT Patent Application No. PCT/US2015/046262, mailed on Nov. 23, 2015, 7 pages.
Invitation to Pay Additional Fees received for PCT Patent Application No. PCT/US2015/046787, mailed on Dec. 15, 2015, 8 pages.
Invitation to Pay Additional Fees received for PCT Patent Application No. PCT/US2015/047507, mailed on Jan. 4, 2016, 8 pages.
Invitation to Pay Additional Fees received for PCT Patent Application No. PCT/US2015/055165, mailed on Jan. 18, 2016, 6 pages.
Invitation to Pay Additional Fees received for PCT Patent Application No. PCT/US2016/017271, mailed on May 25, 2016, 7 pages.
Invitation to Pay Additional Fees received for PCT Patent Application No. PCT/US2017/035554, mailed on Jul. 20, 2017, 2 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/035446, mailed on Sep. 11, 2020, 12 pages.
Invitation to Pay Search Fees received for European Patent Application No. 15753796.0, mailed on Mar. 24, 2020, 3 pages.
Iphone,"User Guide for iOS 7.1 Software", Mar. 2014, 162 pages.
Itjungles,"iPhone 6: How to Pair with Another Bluetooth Device", Available Online at: https://www.youtube.com/watch?v=9setanYtHAk, Aug. 5, 2015, 3 pages.
Jean, "Our Pact Parental Control Review", Available online at : https://www.bewebsmart.com/parental-controls/our-pact-parental-control-review/, Jun. 25, 2016, 25 pages.
Jepson, Tom, "How to auto-forward specific emails in gmail?", Available online at <http://www.tomjepson.co.uk/how-to-auto-forward-specific-emails-in-gmail/>, May 19, 2013, 7 pages.
Kenney, Briley, "How to Customize a Smartwatch and other Personalization Questions", Available online at: <https://smartwatches.org/learn/customize-smartwatch/>, Jan. 23, 2014, 3 pages.

Kidizoom Smartwatch, Available online at <URL:https://www.vtechnl.com/media/downloads/Kidizoom-Smart-Watch.pdf>, Jun. 24, 2014, 23 pages.
Kinect Gesture Commands—Kinect Voice Commands, Xbox Wire, Available Online at: <https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.
Klein ,Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Link to Wayback Machine with link to Google Play showing different layouts of complications associated with a clock face, available online at < https://play.google.com/store/apps/details?id=com.levelup.beautifulwidgets.free&hl=da >, Sep. 9, 2013, 6 pages.
Living Earth, available at : http://www.livingearthapp.com/, 2014, 6 pages.
Lyons et al., "Facet: A Multi-Segment Wrist Worn System", Online available at: <http://fetlab.io/publications/2012-Facet-a%20multi-segment%20wrist%20worn%20system.pdf>, Oct. 7-10, 2012, pp. 123-129.
Microsoft Outlook 2010 TM) A Beginners Guide, Available online at:—http://www.reading.ac.uk/web/files/its/outlook2010.pdf, Apr. 1, 2012, 24 pages.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
Minutes of the Oral Proceedings received for European Application No. 15711969.4, mailed on May 16, 2019, 7 pages.
Minutes of the Oral Proceedings received for European Patent Application No. 15760008.1, mailed on Sep. 21, 2021, 6 pages.
Minutes of the Oral Proceedings received for European Patent Application No. 17810749.6, mailed on Jan. 26, 2021, 8 pages.
Minutes of the Oral Proceedings received for European Patent Application No. 20729346.5, mailed on Jul. 4, 2023, 6 pages.
Mugs, Online Available at: https://web.archive.org/web/20151029034349/http://le-mugs.com/, Oct. 29, 2015, 14 pages.
My Mate Vince,"Setting up the Fitbit Alta HR Activity Tracker on Apple iOS", Online available at:—<https://youtu.be/FdwRF4IfvFc>, Jun. 18, 2017, 3 pages.
Nerdtalk,"The Best Android Clock Widgets", available at: https://www.youtube.com/watch?v=E1bAprWByfU, Apr. 25, 2011, 1 page.
Netsapiens, "Click to Call in MS Outlook", Available online at <https://netsapiens.com/click-to-call-in-ms-outlook-windows-apps/>, May 4, 2012, 8 pages.
New, but unsigned—Easy StopWatch for Symbian, XP55393563, Available online at <http://www.allaboutsymbian.com/flow/item/19490_New_but_unsigned-Easy_StopWatc.php>, Mar. 15, 2014, 15 pages.
Nikolov, Anton, "Design principle: Consistency", Available online at: https://uxdesign.cc/design-principle-consistency-6b0cf7e7339f, Apr. 8, 2017, 9 pages.
Non-Final Office Action received for U.S. Appl. No. 14/815,890, mailed on Jun. 6, 2017, 19 pages.
Non-Final Office Action received for U.S. Appl. No. 14/815,890, mailed on Oct. 19, 2015, 5 pages.
Non-Final Office Action received for U.S. Appl. No. 14/822,769, mailed on Feb. 5, 2016, 14 pages.
Non-Final Office Action received for U.S. Appl. No. 14/833,014, mailed on Mar. 21, 2016, 26 pages.
Non-Final Office Action received for U.S. Appl. No. 14/839,913, mailed on Mar. 2, 2016, 11 pages.
Non-Final Office Action received for U.S. Appl. No. 14/864,011, mailed on Jan. 21, 2016, 10 pages.
Non-Final Office Action received for U.S. Appl. No. 17/013,778, mailed on Aug. 20, 2021, 9 pages.
Non-Final Office Action received for U.S. Appl. No. 16/679,967, mailed on Sep. 2, 2021, 12 pages.
Non-Final Office Action received for U.S. Appl. No. 14/805,403, mailed on Nov. 16, 2017, 21 pages.

(56) References Cited

OTHER PUBLICATIONS

Non-Final Office Action received for U.S. Appl. No. 14/752,776, mailed on Jan. 2, 2018, 30 pages.
Non-Final Office Action received for U.S. Appl. No. 14/752,776, mailed on Nov. 5, 2018, 48 pages.
Non-Final Office Action received for U.S. Appl. No. 14/774,664, mailed on Mar. 7, 2017, 23 pages.
Non-Final Office Action received for U.S. Appl. No. 14/815,879, mailed on Dec. 15, 2016, 33 pages.
Non-Final Office Action received for U.S. Appl. No. 14/815,890, mailed on Dec. 18, 2018, 21 pages.
Non-Final Office Action received for U.S. Appl. No. 14/822,769, mailed on Jun. 29, 2016, 14 pages.
Non-Final Office Action received for U.S. Appl. No. 14/822,769, mailed on May 4, 2017, 21 pages.
Non-Final Office Action received for U.S. Appl. No. 14/822,769, mailed on May 24, 2018, 30 pages.
Non-Final Office Action received for U.S. Appl. No. 14/839,897, mailed on May 18, 2017, 11 pages.
Non-Final Office Action received for U.S. Appl. No. 14/839,903, mailed on Feb. 26, 2018, 10 pages.
Non-Final Office Action received for U.S. Appl. No. 14/839,913, mailed on Jul. 28, 2016, 12 pages.
Non-Final Office Action received for U.S. Appl. No. 14/841,402, mailed on Jan. 25, 2017, 18 pages.
Non-Final Office Action received for U.S. Appl. No. 14/841,608, mailed on Apr. 12, 2017, 9 Pages.
Non-Final Office Action received for U.S. Appl. No. 14/841,614, mailed on Jul. 27, 2017, 13 pages.
Non-Final Office Action received for U.S. Appl. No. 14/841,623, mailed on Feb. 2, 2017, 17 pages.
Non-Final Office Action received for U.S. Appl. No. 14/863,099, mailed on Dec. 2, 2015, 12 pages.
Non-final Office Action received for U.S. Appl. No. 14/864,011, mailed on Jun. 10, 2016, 10 pages.
Non-Final Office Action received for U.S. Appl. No. 15/128,952, mailed on Apr. 1, 2019, 20 pages.
Non-Final Office Action received for U.S. Appl. No. 15/128,952, mailed on Dec. 29, 2017, 13 pages.
Non-Final Office Action received for U.S. Appl. No. 15/135,328 mailed on Apr. 11, 2018, 64 pages.
Non-Final Office Action received for U.S. Appl. No. 15/268,115, mailed on Apr. 13, 2017, 44 pages.
Non-Final Office Action received for U.S. Appl. No. 15/352,215, mailed on Sep. 20, 2018, 31 pages.
Non-Final Office Action received for U.S. Appl. No. 15/355,956, mailed on May 31, 2019, 32 pages.
Non-Final Office Action received for U.S. Appl. No. 15/405,122, mailed on Apr. 2, 2021, 35 pages.
Non-Final Office Action received for U.S. Appl. No. 15/405,122, mailed on May 31, 2019, 43 pages.
Non-Final Office Action received for U.S. Appl. No. 15/405,122, mailed on Sep. 24, 2020, 30 pages.
Non-Final Office Action received for U.S. Appl. No. 15/433,238, mailed on Nov. 3, 2017, 6 pages.
Non-Final Office Action received for U.S. Appl. No. 16/103,699, mailed on Nov. 30, 2018, 14 pages.
Non-Final Office Action received for U.S. Appl. No. 16/144,264, mailed on May 1, 2020, 30 pages.
Non-Final Office Action received for U.S. Appl. No. 16/147,523, mailed on Apr. 26, 2022, 22 pages.
Non-Final Office Action received for U.S. Appl. No. 16/147,523, mailed on Dec. 27, 2019, 11 pages.
Non-Final Office Action received for U.S. Appl. No. 16/147,523, mailed on Jul. 21, 2021, 20 pages.
Non-Final Office Action received for U.S. Appl. No. 16/259,954, mailed on Feb. 5, 2020, 10 pages.
Non-Final Office Action received for U.S. Appl. No. 16/265,938, mailed on Nov. 4, 2019, 28 pages.
Non-Final Office Action received for U.S. Appl. No. 16/281,838, mailed on Mar. 26, 2020, 18 pages.
Non-Final Office Action received for U.S. Appl. No. 16/377,892, mailed on May 21, 2020, 9 pages.
Non-Final Office Action received for U.S. Appl. No. 16/378,136, mailed on Jun. 2, 2020, 8 pages.
Non-Final Office Action received for U.S. Appl. No. 16/407,584, mailed on Jul. 10, 2019, 8 pages.
Non-Final Office Action received for U.S. Appl. No. 16/583,981, mailed on Dec. 6, 2019, 14 pages.
Non-Final Office Action received for U.S. Appl. No. 16/583,994, mailed on Dec. 23, 2020, 17 pages.
Non-Final Office Action received for U.S. Appl. No. 16/583,994, mailed on Dec. 30, 2019, 14 pages.
Non-Final Office Action received for U.S. Appl. No. 16/653,857, mailed on Jul. 9, 2020, 35 pages.
Non-Final Office Action received for U.S. Appl. No. 16/653,857, mailed on Jul. 22, 2021, 45 pages.
Non-Final Office Action received for U.S. Appl. No. 16/679,967, mailed on Apr. 19, 2022, 13 pages.
Non-Final Office Action received for U.S. Appl. No. 16/723,583, mailed on Aug. 13, 2020, 13 pages.
Non-Final Office Action received for U.S. Appl. No. 16/749,929, mailed on May 13, 2020, 11 pages.
Non-Final Office Action received for U.S. Appl. No. 16/806,981, mailed on Nov. 13, 2020, 22 pages.
Non-Final Office Action received for U.S. Appl. No. 16/806,981, mailed on Sep. 1, 2021, 27 pages.
Non-Final Office Action received for U.S. Appl. No. 16/935,002, mailed on Jun. 25, 2021, 20 pages.
Non-Final Office Action received for U.S. Appl. No. 16/943,737, mailed on Jun. 25, 2021, 18 pages.
Non-Final Office Action received for U.S. Appl. No. 16/943,737, mailed on Mar. 28, 2023, 28 pages.
Non-Final Office Action received for U.S. Appl. No. 17/013,778, mailed on Dec. 9, 2021, 11 pages.
Non-Final Office Action received for U.S. Appl. No. 17/041,350, mailed on Jun. 10, 2021, 24 pages.
Non-Final Office Action received for U.S. Appl. No. 17/103,436, mailed on Aug. 18, 2021, 16 pages.
Non-Final Office Action received for U.S. Appl. No. 17/181,089, mailed on Aug. 4, 2023, 15 pages.
Non-Final Office Action received for U.S. Appl. No. 17/181,089, mailed on Feb. 17, 2023, 14 pages.
Non-Final Office Action received for U.S. Appl. No. 17/181,089, mailed on May 13, 2022, 12 pages.
Non-Final Office Action received for U.S. Appl. No. 17/188,228, mailed on Dec. 21, 2021, 14 pages.
Non-Final Office Action received for U.S. Appl. No. 17/314,948, mailed on Aug. 1, 2022, 33 pages.
Non-Final Office Action received for U.S. Appl. No. 17/410,169, mailed on Dec. 5, 2023, 48 pages.
Non-Final Office Action received for U.S. Appl. No. 17/410,169, mailed on Sep. 16, 2022, 42 pages.
Non-Final Office Action received for U.S. Appl. No. 17/509,356, mailed on Dec. 22, 2022, 16 pages.
Non-Final Office Action received for U.S. Appl. No. 17/516,537, mailed on May 5, 2022, 8 pages.
Non-Final Office Action received for U.S. Appl. No. 17/572,117, mailed on Oct. 6, 2022, 15 pages.
Non-Final Office Action received for U.S. Appl. No. 17/746,807, mailed on Feb. 2, 2023, 14 pages.
Non-Final Office Action received for U.S. Appl. No. 17/746,807, mailed on Jul. 20, 2023, 14 pages.
Non-Final Office Action received for U.S. Appl. No. 17/827,004, mailed on Nov. 9, 2022, 27 pages.
Non-Final Office Action received for U.S. Appl. No. 17/951,875, mailed on Jan. 23, 2023, 12 pages.
Non-Final Office Action received for U.S. Appl. No. 17/975,141, mailed on Jul. 6, 2023, 22 pages.
Non-Final Office Action received for U.S. Appl. No. 18/088,309, mailed on Apr. 9, 2024, 14 pages.

(56) References Cited

OTHER PUBLICATIONS

Non-Final Office Action received for U.S. Appl. No. 18/088,309, mailed on Sep. 21, 2023, 11 pages.
Non-Final Office Action received for U.S. Appl. No. 18/119,789, mailed on Jun. 28, 2023, 31 pages.
Non-Final Office Action received for U.S. Appl. No. 18/122,625, mailed on Nov. 15, 2023, 14 pages.
Non-Final Office Action received for U.S. Appl. No. 18/197,681, mailed on Jan. 30, 2024, 32 pages.
Non-Final Office Action received for U.S. Appl. No. 18/200,480, mailed on Feb. 29, 2024, 16 pages.
Non-Final Office Action received for U.S. Appl. No. 18/200,480, mailed on Mar. 6, 2024, 17 pages.
Non-Final Office Action received for U.S. Appl. No. 18/211,150, mailed on Feb. 14, 2024, 11 pages.
Non-Final Office Action received for U.S. Appl. No. 14/815,879, mailed on Nov. 6, 2015, 35 pages.
Non-Final Office Action received for U.S. Appl. No. 14/815,898, mailed on Dec. 1, 2015, 22 pages.
Non-Final Office Action received for U.S. Appl. No. 14/815,907, mailed on Jan. 12, 2016, 22 pages.
Non-Final Office Action received for U.S. Appl. No. 14/815,909, mailed on Nov. 27, 2015, 12 pages.
Notice of Acceptance received for Australian Patent Application No. 2015267671, mailed on Apr. 4, 2018, 3 pages.
Notice of Acceptance received for Australian Patent Application No. 2015279544, mailed on Mar. 1, 2018, 3 pages.
Notice of Acceptance received for Australian Patent Application No. 2015298710, mailed on Oct. 8, 2019, 3 pages.
Notice of Acceptance received for Australian Patent Application No. 2015385757, mailed on Jul. 16, 2018, 3 pages.
Notice of Acceptance received for Australian Patent Application No. 2016218318, mailed on Jul. 3, 2019, 3 pages.
Notice of Acceptance received for Australian Patent Application No. 2016231598, mailed on Mar. 1, 2018, 3 pages.
Notice of Acceptance received for Australian Patent Application No. 2017277971, mailed on Feb. 17, 2021, 3 pages.
Notice of Acceptance received for Australian Patent Application No. 2018201089, mailed on May 28, 2021, 3 pages.
Notice of Acceptance received for Australian Patent Application No. 2018202751, mailed on Sep. 4, 2019, 3 pages.
Notice of Acceptance received for Australian Patent Application No. 2018204286, mailed on Feb. 27, 2020, 3 pages.
Notice of Acceptance received for Australian Patent Application No. 2018247345, mailed on May 15, 2019, 3 pages.
Notice of Acceptance received for Australian Patent Application No. 2020203919, mailed on Sep. 3, 2021, 3 pages.
Notice of Acceptance received for Australian Patent Application No. 2020239670, mailed on Jul. 2, 2021, 3 pages.
Notice of Acceptance received for Australian Patent Application No. 2020250323, mailed on Feb. 28, 2022, 3 pages.
Notice of Acceptance received for Australian Patent Application No. 2020285524, mailed on Dec. 17, 2021, 3 pages.
Notice of Acceptance received for Australian Patent Application No. 2021203636, mailed on Apr. 14, 2022, 3 pages.
Notice of Acceptance received for Australian Patent Application No. 2021250863, mailed on Jan. 13, 2023, 3 pages.
Notice of Acceptance received for Australian Patent Application No. 2021277718, mailed on Mar. 3, 2023, 3 pages.
Notice of Acceptance received for Australian Patent Application No. 2022201369, mailed on Mar. 17, 2022, 3 pages.
Notice of Acceptance received for Australian Patent Application No. 2022203957, mailed on Sep. 27, 2023, 3 pages.
Notice of Acceptance received for Australian Patent Application No. 2022204555, mailed on May 11, 2023, 3 pages.
Notice of Acceptance received for Australian Patent Application No. 2022209277, mailed on Apr. 28, 2023, 3 pages.
Notice of Acceptance received for Australian Patent Application No. 2023201920, mailed on Feb. 9, 2024, 3 pages.
Notice of Acceptance received for Australian Patent Application No. 2023202432, mailed on Nov. 6, 2023, 3 pages.
Notice of Acceptance received for Australian Patent Application No. 2015279545, mailed on Feb. 9, 2018, 3 pages.
Notice of Allowance received for Chinese Patent Application No. 201510479088.4, mailed on Jan. 21, 2021, 2 pages.
Notice of Allowance received for Chinese Patent Application No. 201510481525.6, mailed on May 27, 2019, 2 pages.
Notice of Allowance received for Chinese Patent Application No. 201510483268.X, mailed on Nov. 6, 2019, 2 pages.
Notice of Allowance received for Chinese Patent Application No. 201510483305.7, mailed on Jan. 8, 2019, 3 pages.
Notice of Allowance received for Chinese Patent Application No. 201510484514.3, mailed on Jun. 6, 2019, 2 pages.
Notice of Allowance received for Chinese Patent Application No. 201510557356.X, mailed on Mar. 5, 2020, 2 pages.
Notice of Allowance received for Chinese Patent Application No. 201520594249.X, mailed on Jul. 12, 2016, 4 pages.
Notice of Allowance received for Chinese Patent Application No. 201580028505.1, mailed on Sep. 19, 2019, 2 pages.
Notice of Allowance received for Chinese Patent Application No. 201580029054.3, mailed on Jul. 19, 2019, 2 pages.
Notice of Allowance received for Chinese Patent Application No. 201580046237.6, mailed on Aug. 29, 2018, 4 pages.
Notice of Allowance received for Chinese Patent Application No. 201580077218.X, mailed on Nov. 13, 2020, 2 pages.
Notice of Allowance received for Chinese Patent Application No. 201610084974.1, mailed on Aug. 5, 2019, 2 pages.
Notice of Allowance received for Chinese Patent Application No. 201680012936.3, mailed on Jul. 13, 2021, 4 pages.
Notice of Allowance received for Chinese Patent Application No. 201710439448.7, mailed on Jan. 26, 2021, 2 pages.
Notice of Allowance received for Chinese Patent Application No. 201710657424.9, mailed on May 8, 2020, 2 pages.
Notice of Allowance received for Chinese Patent Application No. 201780034203.4, mailed on Jan. 17, 2022, 2 pages.
Notice of Allowance received for Chinese Patent Application No. 201810321928.8, mailed on Sep. 11, 2019, 2 pages.
Notice of Allowance received for Chinese Patent Application No. 201910875660.7, mailed on Jan. 4, 2024, 2 pages.
Notice of Allowance received for Chinese Patent Application No. 201910990432.4, mailed on Apr. 27, 2021, 2 pages.
Notice of Allowance received for Chinese Patent Application No. 201911099970.0, mailed on Jun. 25, 2023, 4 pages.
Notice of Allowance received for Chinese Patent Application No. 201980036737.X, mailed on Apr. 20, 2021, 10 pages.
Notice of Allowance received for Chinese Patent Application No. 202080039642.6, mailed on Apr. 17, 2023, 6 pages.
Notice of Allowance received for Chinese Patent Application No. 202110011509.6, mailed on Mar. 2, 2022, 2 pages.
Notice of Allowance received for Chinese Patent Application No. 202111612841.4, mailed on Jan. 5, 2023, 3 pages.
Notice of Allowance received for Chinese Patent Application No. 202211558100.7, mailed on Mar. 29, 2024, 3 pages.
Notice of Allowance received for Danish Patent Application No. PA201570495, mailed on Feb. 22, 2017, 1 page.
Notice of Allowance received for Danish Patent Application No. PA201570496, mailed on Apr. 18, 2016, 2 pages.
Notice of Allowance received for Danish Patent Application No. PA201570563, mailed on May 24, 2016, 2 pages.
Notice of Allowance received for Danish Patent Application No. PA201570667, mailed on Nov. 11, 2016, 2 pages.
Notice of Allowance received for Danish Patent Application No. PA201570771, mailed on Sep. 2, 2016, 2 pages.
Notice of Allowance received for Danish Patent Application No. PA201570773 , mailed on Apr. 26, 2018, 2 pages.
Notice of Allowance received for Japanese Patent Application No. 2016-569669, mailed on Mar. 19, 2018, 4 pages.
Notice of Allowance received for Japanese Patent Application No. 2017-505450, mailed on Mar. 9, 2018, 10 pages.
Notice of Allowance received for Japanese Patent Application No. 2017-505842, mailed on Mar. 16, 2020, 4 pages.

(56) References Cited

OTHER PUBLICATIONS

Notice of Allowance received for Japanese Patent Application No. 2017-505847, mailed on May 20, 2019, 4 pages.
Notice of Allowance received for Japanese Patent Application No. 2017-545733, mailed on Jun. 1, 2018, 4 pages.
Notice of Allowance received for Japanese Patent Application No. 2018-074971, mailed on Apr. 23, 2019, 4 pages.
Notice of Allowance received for Japanese Patent Application No. 2018-080122, mailed on May 7, 2021, 28 pages.
Notice of Allowance received for Japanese Patent Application No. 2018-107114, mailed on Mar. 22, 2019, 4 pages.
Notice of Allowance received for Japanese Patent Application No. 2018-126311, mailed on Feb. 1, 2019, 4 pages.
Notice of Allowance received for Japanese Patent Application No. 2019-096219, mailed on Jun. 26, 2020, 4 pages.
Notice of Allowance received for Japanese Patent Application No. 2020-124605, mailed on Dec. 5, 2022, 4 pages.
Notice of Allowance received for Japanese Patent Application No. 2020-551465, mailed on Jun. 28, 2021, 4 pages.
Notice of Allowance received for Japanese Patent Application No. 2021-122610, mailed on Aug. 5, 2022, 4 pages.
Notice of Allowance received for Japanese Patent Application No. 2021-571464, mailed on May 30, 2022, 4 pages.
Notice of Allowance received for Japanese Patent Application No. 2022-102840, mailed on Aug. 19, 2022, 4 pages.
Notice of Allowance received for Japanese Patent Application No. 2022-139320, mailed on Jan. 6, 2023, 4 pages.
Notice of Allowance received for Korean Patent Application No. 10-2016-7032902, mailed on Sep. 7, 2018, 3 pages.
Notice of Allowance received for Korean Patent Application No. 10-2017-7005939, mailed on Mar. 30, 2018, 5 pages.
Notice of Allowance received for Korean Patent Application No. 10-2018-7018904, mailed on Jun. 26, 2020, 4 pages.
Notice of Allowance received for Korean Patent Application No. 10-2018-7035747, mailed on Dec. 9, 2020, 5 pages.
Notice of Allowance received for Korean Patent Application No. 10-2020-7026036, mailed on Jul. 26, 2021, 4 pages.
Notice of Allowance received for Korean Patent Application No. 10-2020-7028759, mailed on Oct. 19, 2021, 4 pages.
Notice of Allowance received for Korean Patent Application No. 10-2021-7034748, mailed on Jan. 27, 2022, 6 pages.
Notice of Allowance received for Korean Patent Application No. 10-2021-7039234, mailed on Dec. 20, 2021, 4 pages.
Notice of Allowance received for Korean Patent Application No. 10-2022-7001721, mailed on Feb. 28, 2022, 5 pages.
Notice of Allowance received for Korean Patent Application No. 10-2022-7008567, mailed on Jul. 4, 2022, 9 pages.
Notice of Allowance received for Korean Patent Application No. 10-2022-7014529, mailed on Dec. 13, 2022, 8 pages.
Notice of Allowance received for Netherland Patent Application No. 2019753, mailed on Jul. 6, 2018, 6 pages.
Notice of Allowance received for Taiwanese Patent Application No. 104107328, mailed on Jun. 12, 2017, 3 pages.
Notice of Allowance received for Taiwanese Patent Application No. 104108223, mailed on Jan. 10, 2017, 3 pages.
Notice of Allowance received for Taiwanese Patent Application No. 104123593, mailed on Oct. 1, 2018, 4 pages.
Notice of Allowance received for Taiwanese Patent Application No. 104124962, mailed on Jul. 27, 2017, 3 pages.
Notice of Allowance received for Taiwanese Patent Application No. 104124963, mailed on Sep. 28, 2017, 5 pages.
Notice of Allowance received for Taiwanese Patent Application No. 104124995, mailed on Jul. 27, 2017, 3 pages.
Notice of Allowance received for Taiwanese Patent Application No. 104124997, mailed on Jun. 16, 2017, 5 pages.
Notice of Allowance received for Taiwanese Patent Application No. 104124998, mailed on Mar. 31, 2017, 3 pages.
Notice of Allowance received for Taiwanese Patent Application No. 104128519, mailed on Nov. 20, 2017, 5 pages.
Notice of Allowance received for Taiwanese Patent Application No. 104128684, mailed on Feb. 23, 2017, 3 pages.
Notice of Allowance received for Taiwanese Patent Application No. 104128700, mailed on Mar. 27, 2017, 3 pages.
Notice of Allowance received for Taiwanese Patent Application No. 104133756, mailed on Nov. 30, 2017, 5 pages.
Notice of Allowance received for Taiwanese Patent Application No. 104133757, mailed on Jan. 18, 2017, 3 pages.
Notice of Allowance received for U.S. Appl. No. 14/841,608, mailed on Nov. 14, 2017, 5 pages.
Notice of Allowance received for U.S. Appl. No. 14/641,251, mailed on May 18, 2016, 13 pages.
Notice of Allowance received for U.S. Appl. No. 14/805,403, mailed on Jul. 11, 2018, 15 pages.
Notice of Allowance received for U.S. Appl. No. 14/815,879, mailed on Jun. 26, 2017, 8 pages.
Notice of Allowance received for U.S. Appl. No. 14/815,890, mailed on Feb. 12, 2021, 8 pages.
Notice of Allowance received for U.S. Appl. No. 14/815,898, mailed on Dec. 5, 2016, 3 pages.
Notice of Allowance received for U.S. Appl. No. 14/815,898, mailed on Oct. 24, 2016, 14 pages.
Notice of Allowance received for U.S. Appl. No. 14/815,907, mailed on Jul. 28, 2016, 9 pages.
Notice of Allowance received for U.S. Appl. No. 14/815,907, mailed on Nov. 30, 2016, 2 pages.
Notice of Allowance received for U.S. Appl. No. 14/815,909, mailed on Jun. 9, 2016, 3 pages.
Notice of Allowance received for U.S. Appl. No. 14/815,909, mailed on May 3, 2016, 12 pages.
Notice of Allowance received for U.S. Appl. No. 14/815,909, mailed on May 20, 2016, 2 pages.
Notice of Allowance received for U.S. Appl. No. 14/815,909, mailed on Sep. 6, 2016, 2 pages.
Notice of Allowance received for U.S. Appl. No. 14/822,769, mailed on Nov. 29, 2018, 12 pages.
Notice of Allowance received for U.S. Appl. No. 14/833,014, mailed on Nov. 20, 2019, 5 pages.
Notice of Allowance received for U.S. Appl. No. 14/839,897, mailed on Jun. 8, 2018, 11 pages.
Notice of Allowance received for U.S. Appl. No. 14/839,903, mailed on Jan. 3, 2019, 7 pages.
Notice of Allowance received for U.S. Appl. No. 14/839,913, mailed on Aug. 11, 2016, 5 pages.
Notice of Allowance received for U.S. Appl. No. 14/841,402, mailed on Apr. 26, 2018, 16 pages.
Notice of Allowance received for U.S. Appl. No. 14/841,614, mailed on Oct. 24, 2018, 10 pages.
Notice of Allowance received for U.S. Appl. No. 14/841,623, mailed on Feb. 23, 2018, 8 pages.
Notice of Allowance received for U.S. Appl. No. 14/864,011, mailed on Apr. 28, 2016, 5 pages.
Notice of Allowance received for U.S. Appl. No. 14/864,011, mailed on Oct. 5, 2016, 5 pages.
Notice of Allowance received for U.S. Appl. No. 15/135,328, mailed on Jul. 1, 2019, 25 pages.
Notice of Allowance received for U.S. Appl. No. 15/268,115, mailed on Mar. 7, 2018, 15 pages.
Notice of Allowance received for U.S. Appl. No. 15/352,215, mailed on Nov. 27, 2019, 20 pages.
Notice of Allowance received for U.S. Appl. No. 15/355,956, mailed on Nov. 22, 2019, 29 pages.
Notice of Allowance received for U.S. Appl. No. 15/366,607, mailed on Apr. 2, 2019, 2 pages.
Notice of Allowance received for U.S. Appl. No. 15/366,607, mailed on Feb. 21, 2019, 9 pages.
Notice of Allowance received for U.S. Appl. No. 15/433,238, mailed on May 17, 2018, 7 pages.
Notice of Allowance received for U.S. Appl. No. 15/616,480, mailed on Jan. 3, 2019, 8 pages.
Notice of Allowance received for U.S. Appl. No. 15/798,257, mailed on May 22, 2019, 14 pages.

(56) References Cited

OTHER PUBLICATIONS

Notice of Allowance received for U.S. Appl. No. 15/975,581, mailed on Oct. 3, 2018, 25 pages.
Notice of Allowance received for U.S. Appl. No. 16/103,699, mailed on Apr. 11, 2019, 8 pages.
Notice of Allowance received for U.S. Appl. No. 16/144,264, mailed on Nov. 16, 2020, 10 pages.
Notice of Allowance received for U.S. Appl. No. 16/147,523, mailed on Aug. 4, 2022, 9 pages.
Notice of Allowance received for U.S. Appl. No. 16/147,523, mailed on Nov. 28, 2022, 8 pages.
Notice of Allowance received for U.S. Appl. No. 16/147,523, mailed on Oct. 4, 2022, 8 pages.
Notice of Allowance received for U.S. Appl. No. 16/259,954, mailed on May 7, 2020, 9 pages.
Notice of Allowance received for U.S. Appl. No. 16/265,938, mailed on Oct. 15, 2020, 8 pages.
Notice of Allowance received for U.S. Appl. No. 16/281,838, mailed on Aug. 26, 2020, 9 pages.
Notice of Allowance received for U.S. Appl. No. 16/281,838, mailed on May 20, 2021, 9 pages.
Notice of Allowance received for U.S. Appl. No. 16/377,892, mailed on May 24, 2021, 9 pages.
Notice of Allowance received for U.S. Appl. No. 16/377,892, mailed on Sep. 9, 2021, 9 pages.
Notice of Allowance received for U.S. Appl. No. 16/378,136, mailed on Jun. 3, 2021, 7 pages.
Notice of Allowance received for U.S. Appl. No. 16/378,136, mailed on Sep. 22, 2021, 7 pages.
Notice of Allowance received for U.S. Appl. No. 16/407,584, mailed on Oct. 28, 2019, 5 pages.
Notice of Allowance received for U.S. Appl. No. 16/583,981, mailed on Mar. 26, 2021, 10 pages.
Notice of Allowance received for U.S. Appl. No. 16/583,994, mailed on Jun. 24, 2021, 10 pages.
Notice of Allowance received for U.S. Appl. No. 16/653,857, mailed on Feb. 16, 2022, 34 pages.
Notice of Allowance received for U.S. Appl. No. 16/679,967, mailed on Jun. 15, 2022, 7 pages.
Notice of Allowance received for U.S. Appl. No. 16/679,967, mailed on Nov. 2, 2022, 7 pages.
Notice of Allowance received for U.S. Appl. No. 16/749,929, mailed on Dec. 16, 2020, 2 pages.
Notice of Allowance received for U.S. Appl. No. 16/749,929, mailed on Nov. 4, 2020, 5 pages.
Notice of Allowance received for U.S. Appl. No. 16/867,002, mailed on Aug. 20, 2021, 12 pages.
Notice of Allowance received for U.S. Appl. No. 16/867,002, mailed on Mar. 1, 2022, 7 pages.
Notice of Allowance received for U.S. Appl. No. 16/935,002, mailed on Feb. 15, 2023, 15 pages.
Notice of Allowance received for U.S. Appl. No. 16/935,002, mailed on Jun. 28, 2023, 8 pages.
Notice of Allowance received for U.S. Appl. No. 17/013,778, mailed on Feb. 23, 2023, 8 pages.
Notice of Allowance received for U.S. Appl. No. 17/041,350, mailed on Feb. 24, 2022, 6 pages.
Notice of Allowance received for U.S. Appl. No. 17/103,436, mailed on Dec. 8, 2021, 12 pages.
Notice of Allowance received for U.S. Appl. No. 17/188,228, mailed on Feb. 1, 2023, 5 pages.
Notice of Allowance received for U.S. Appl. No. 17/188,228, mailed on Oct. 19, 2022, 6 pages.
Notice of Allowance received for U.S. Appl. No. 17/509,356, mailed on Apr. 7, 2023, 11 pages.
Notice of Allowance received for U.S. Appl. No. 17/516,537, mailed on Apr. 17, 2023, 8 pages.
Notice of Allowance received for U.S. Appl. No. 17/516,537, mailed on Dec. 27, 2022, 7 pages.
Notice of Allowance received for U.S. Appl. No. 17/572,117, mailed on Apr. 4, 2023, 9 pages.
Notice of Allowance received for U.S. Appl. No. 17/951,875, mailed on Dec. 26, 2023, 7 pages.
Notice of Allowance received for U.S. Appl. No. 17/951,875, mailed on Jul. 26, 2023, 7 pages.
Notice of Allowance received for U.S. Appl. No. 17/951,875, mailed on Oct. 20, 2023, 8 pages.
Notice of Allowance received for U.S. Appl. No. 17/975,141, mailed on Apr. 29, 2024, 9 pages.
Notice of Allowance received for U.S. Appl. No. 17/975,141, mailed on Dec. 7, 2023, 10 pages.
Nova,"Tour of the Solar System", Retrieved fro <http://www.pbs.org/wgbh/nova/space/tour-solar-system.html>, May 24, 2013, 14 pages.
Nozawa, Naoki et al., "iPad Perfect Manual for IOS 4", JPN, SOTEC Ltd., Yanagisawa Junichi, Dec. 31, 2010, pp. 189-190.
Obara, Yuuta, "iPhone Application Selection for Univesity Students", Shuwa System Co., Saito Kazukuni, vol. 1, May 16, 2013, 4 pages.
Octoba,"Just Install It—Utilizing Method for Android Application Business", ASCII Media Works Co. Takano Kiyoshi, vol. 1, Apr. 25, 2013, 6 pages.
Office Action received for Australian Patent Application No. 2015101020, mailed on Oct. 26, 2015, 8 pages.
Office Action received for Danish Patent Application No. PA201570499, mailed on Nov. 1, 2017, 6 pages.
Office Action received for European Patent Application No. 15711969.4, mailed on Nov. 17, 2017, 9 pages.
Office Action received for European Patent Application No. 15730924.6, mailed on Dec. 12, 2017, 8 pages.
Office Action received for Australian Patent Application No. 2015101019, issued on Oct. 14, 2015, 3 pages.
Office Action received for Australian Patent Application No. 2015101019, issued on Apr. 7, 2016, 4 pages.
Office Action received for Australian Patent Application No. 2015101021, issued on Apr. 26, 2016, 4 pages.
Office Action received for Australian Patent Application No. 2015101021, issued on Oct. 28, 2015, 10 pages.
Office Action received for Australian Patent Application No. 2015267671, mailed on Apr. 5, 2017, 2 pages.
Office Action received for Australian Patent Application No. 2015279544, mailed on Apr. 18, 2017, 4 pages.
Office Action received for Australian Patent Application No. 2015279544, mailed on Feb. 13, 2018, 5 pages.
Office Action received for Australian Patent Application No. 2015298710, mailed on Apr. 13, 2017, 3 pages.
Office Action received for Australian Patent Application No. 2015298710, mailed on Feb. 15, 2017, 2 pages.
Office Action received for Australian Patent Application No. 2015298710, mailed on Nov. 6, 2018, 4 pages.
Office Action received for Australian Patent Application No. 2015298710, mailed on Sep. 24, 2018, 4 pages.
Office Action received for Australian Patent Application No. 2015385757, mailed on Sep. 11, 2017, 3 pages.
Office Action received for Australian Patent Application No. 2016100155, mailed on May 4, 2016, 7 pages.
Office Action received for Australian Patent Application No. 2016100411, mailed on Jun. 10, 2016, 3 pages.
Office Action received for Australian Patent Application No. 2016100476, mailed on Jun. 9, 2016, 4 pages.
Office Action received for Australian Patent Application No. 2016100765, issued on Aug. 5, 2016, 2 pages.
Office Action received for Australian Patent Application No. 2016100765, mailed on Dec. 16, 2016, 3 pages.
Office Action received for Australian Patent Application No. 2016218318, mailed on Aug. 24, 2018, 5 pages.
Office Action received for Australian Patent Application No. 2016218318, mailed on Sep. 26, 2018, 3 pages.
Office Action received for Australian Patent Application No. 2016231598, mailed on Apr. 7, 2017, 5 pages.
Office Action received for Australian Patent Application No. 2017100667, mailed on Aug. 3, 2017, 9 pages.

(56) References Cited

OTHER PUBLICATIONS

Office Action received for Australian Patent Application No. 2017277971, mailed on Aug. 12, 2020, 3 pages.
Office Action received for Australian Patent Application No. 2017277971, mailed on Jun. 3, 2020, 3 pages.
Office Action received for Australian Patent Application No. 2018100158, mailed on Apr. 23, 2018, 5 pages.
Office Action received for Australian Patent Application No. 2018101855, mailed on Feb. 22, 2019, 4 pages.
Office Action received for Australian Patent Application No. 2018201089, mailed on Jul. 23, 2020, 4 pages.
Office Action received for Australian Patent Application No. 2018201089, mailed on Oct. 11, 2019, 4 pages.
Office Action received for Australian Patent Application No. 2018202751, mailed on Apr. 2, 2019, 4 pages.
Office Action received for Australian Patent Application No. 2018204286, mailed on Apr. 17, 2019, 5 pages.
Office Action received for Australian Patent Application No. 2018204286, mailed on Nov. 12, 2019, 5 pages.
Office Action received for Australian Patent Application No. 2018204286, mailed on Sep. 5, 2019, 5 pages.
Office Action received for Australian Patent Application No. 2018247345, mailed on May 6, 2019, 2 pages.
Office Action received for Australian Patent Application No. 2020203919, mailed on Dec. 23, 2020, 5 pages.
Office Action received for Australian Patent Application No. 2020203919, mailed on Jul. 19, 2021, 7 pages.
Office Action received for Australian Patent Application No. 2020203919, mailed on Mar. 30, 2021, 5 pages.
Office Action received for Australian Patent Application No. 2020203919, mailed on Oct. 19, 2020, 5 pages.
Office Action received for Australian Patent Application No. 2020239670, mailed on Mar. 3, 2021, 4 pages.
Office Action received for Australian Patent Application No. 2020250323, mailed on Dec. 14, 2021, 2 pages.
Office Action received for Australian Patent Application No. 2021203636, mailed on Mar. 23, 2022, 3 pages.
Office Action received for Australian Patent Application No. 2021250863, mailed on Oct. 6, 2022, 6 pages.
Office Action received for Australian Patent Application No. 2021277718, mailed on Dec. 5, 2022, 3 pages.
Office Action received for Australian Patent Application No. 2021277718, mailed on Jan. 23, 2023, 4 pages.
Office Action received for Australian Patent Application No. 2021277718, mailed on Oct. 17, 2022, 4 pages.
Office Action received for Australian Patent Application No. 2022203957, mailed on May 12, 2023, 5 pages.
Office Action received for Australian Patent Application No. 2022204555, mailed on Feb. 17, 2023, 5 pages.
Office Action received for Australian Patent Application No. 2022209277, mailed on Mar. 10, 2023, 6 pages.
Office Action received for Australian Patent Application No. 2023201920, mailed on Nov. 10, 2023, 2 pages.
Office Action received for Australian Patent Application No. 2023202432, mailed on Sep. 18, 2023, 4 pages.
Office Action received for Australian Patent Application No. 2023214377, mailed on Mar. 27, 2024, 3 pages.
Office Action received for Australian Patent Application No. 2015101019, mailed on Feb. 12, 2016, 4 pages.
Office Action received for Australian Patent Application No. 2015279545, mailed on Apr. 13, 2017, 3 pages.
Office Action received for Chinese Patent Application No. 201520595384.6, mailed on Mar. 25, 2016, 3 pages.
Office Action received for Chinese Patent Application No. 201510479088.4, mailed on Apr. 22, 2020, 7 pages.
Office Action received for Chinese Patent Application No. 201510479088.4, mailed on Mar. 12, 2018, 20 pages.
Office Action received for Chinese Patent Application No. 201510479088.4, mailed on May 7, 2019, 6 pages.
Office Action received for Chinese Patent Application No. 201510481525.6, mailed on Aug. 29, 2018, 10 pages.
Office Action received for Chinese Patent Application No. 201510481525.6, mailed on Nov. 29, 2017, 9 pages.
Office Action received for Chinese Patent Application No. 201510483268.X, mailed on Apr. 16, 2019, 6 pages.
Office Action received for Chinese Patent Application No. 201510483268.X, mailed on Dec. 1, 2017, 11 pages.
Office Action received for Chinese Patent Application No. 201510483268.X, mailed on Oct. 19, 2018, 10 pages.
Office action received for Chinese Patent Application No. 201510483305.7, mailed on Aug. 31, 2018, 10 pages.
Office action received for Chinese Patent Application No. 201510483305.7, mailed on Dec. 1, 2017, 13 pages.
Office Action received for Chinese Patent Application No. 201510484514.3, mailed on Apr. 4, 2018, 12 pages.
Office Action received for Chinese Patent Application No. 201510484514.3, mailed on Dec. 24, 2018, 13 pages.
Office Action received for Chinese Patent Application No. 201510557356.X, mailed on Aug. 15, 2019, 12 pages.
Office Action received for Chinese Patent Application No. 201510557356.X, mailed on Dec. 29, 2017, 11 pages.
Office Action received for Chinese Patent Application No. 201510557356.X, mailed on Nov. 23, 2018, 12 pages.
Office Action received for Chinese Patent Application No. 201520594249.X, mailed on Mar. 25, 2016, 3 pages.
Office Action received for Chinese Patent Application No. 201520595384.6, mailed on Dec. 30, 2016, 2 pages.
Office Action received for Chinese Patent Application No. 201520595384.6, mailed on Jul. 22, 2016, 3 pages.
Office Action received for Chinese Patent Application No. 201520595385.0, mailed on Dec. 30, 2016, 2 pages.
Office Action received for Chinese Patent Application No. 201520595385.0, mailed on Jul. 22, 2016, 3 pages.
Office Action received for Chinese Patent Application No. 201520595385.0, mailed on Mar. 25, 2016, 3 pages.
Office Action Received for Chinese Patent Application No. 201520595408.8, mailed on Dec. 9, 2015, 4 pages.
Office Action Received for Chinese Patent Application No. 201520595408.8, mailed on Dec. 30, 2016, 2 pages.
Office Action received for Chinese Patent Application No. 201520595408.8, mailed on Jul. 25, 2016, 3 pages.
Office Action received for Chinese Patent Application No. 201520595408.8, mailed on Mar. 25, 2016, 3 pages.
Office Action received for Chinese Patent Application No. 201520595538.1, mailed on Dec. 30, 2016, 2 pages.
Office Action received for Chinese Patent Application No. 201520595538.1, mailed on Jul. 22, 2016, 3 pages.
Office Action received for Chinese Patent Application No. 201520595538.1, mailed on Mar. 25, 2016, 3 pages.
Office Action received for Chinese Patent Application No. 201520679198.0, mailed on Jun. 24, 2016, 5 pages.
Office Action received for Chinese Patent Application No. 2015206791980, mailed on Mar. 7, 2016, 6 pages.
Office Action Received for Chinese Patent Application No. 2015206791980, mailed on Nov. 18, 2015, 4 pages.
Office Action received for Chinese Patent Application No. 201580028505.1, mailed on Jan. 16, 2019, 15 pages.
Office Action received for Chinese Patent Application No. 201580028505.1, mailed on Jun. 20, 2019, 7 pages.
Office Action received for Chinese Patent Application No. 201580029054.3, mailed on Dec. 5, 2018, 12 pages.
Office Action received for Chinese Patent Application No. 201580046237.6, mailed on Feb. 6, 2018, 10 pages.
Office Action received for Chinese Patent Application No. 201580046788.2, mailed on Apr. 15, 2019, 13 pages.
Office Action received for Chinese Patent Application No. 201580046788.2, mailed on Feb. 25, 2020, 14 pages.
Office Action received for Chinese Patent Application No. 201580046788.2, mailed on Mar. 25, 2021, 9 pages.
Office Action received for Chinese Patent Application No. 201580046788.2, mailed on Sep. 22, 2020, 10 pages.

(56) References Cited

OTHER PUBLICATIONS

Office Action received for Chinese Patent Application No. 201580077218.X, mailed on Feb. 3, 2020, 23 pages.
Office Action received for Chinese Patent Application No. 201610084974.1, mailed on Dec. 5, 2018, 6 pages.
Office Action received for Chinese Patent Application No. 201610084974.1, mailed on May 3, 2018, 12 pages.
Office Action received for Chinese Patent Application No. 201620119869.2, mailed on Jun. 3, 2016, 2 pages.
Office Action received for Chinese Patent Application No. 201620119869.2, mailed on Nov. 22, 2016, 2 pages.
Office Action received for Chinese Patent Application No. 201621208900.6, mailed on Apr. 26, 2017, 2 pages.
Office Action received for Chinese Patent Application No. 201680012936.3, mailed on Aug. 18, 2020, 15 pages.
Office Action received for Chinese Patent Application No. 201680012936.3, mailed on Dec. 1, 2020, 21 pages.
Office Action received for Chinese Patent Application No. 201680012936.3, mailed on Mar. 3, 2021, 12 pages.
Office Action received for Chinese Patent Application No. 201680012936.3, mailed on Mar. 20, 2020, 23 pages.
Office Action received for Chinese Patent Application No. 201710439448.7, mailed on Mar. 27, 2020, 13 pages.
Office Action received for Chinese Patent Application No. 201710439448.7, mailed on Oct. 10, 2020, 19 pages.
Office Action received for Chinese Patent Application No. 201710657424.9, mailed on Sep. 17, 2019, 23 pages.
Office Action received for Chinese Patent Application No. 201780034203.4, mailed on Jul. 14, 2021, 12 pages.
Office Action received for Chinese Patent Application No. 201780034203.4, mailed on Sep. 24, 2021, 7 pages.
Office Action received for Chinese Patent Application No. 201810321928.8, mailed on Jul. 2, 2019, 10 pages.
Office Action received for Chinese Patent Application No. 201810411708.4, mailed on Feb. 24, 2022, 10 pages.
Office Action received for Chinese Patent Application No. 201810411708.4, mailed on Feb. 26, 2021, 16 pages.
Office Action received for Chinese Patent Application No. 201810411708.4, mailed on Nov. 12, 2021, 12 pages.
Office Action received for Chinese Patent Application No. 201910875660.7, mailed on Aug. 12, 2023, 15 pages.
Office Action received for Chinese Patent Application No. 201910875660.7, mailed on Dec. 26, 2022, 7 pages.
Office Action received for Chinese Patent Application No. 201910875660.7, mailed on Oct. 18, 2023, 6 pages.
Office Action received for Chinese Patent Application No. 201910990432.4, mailed on Dec. 28, 2020, 6 pages.
Office Action received for Chinese Patent Application No. 201910990432.4, mailed on May 18, 2020, 15 pages.
Office Action received for Chinese Patent Application No. 201911099970.0, mailed on Feb. 23, 2023, 15 pages.
Office Action received for Chinese Patent Application No. 202010295272.4, mailed on Aug. 28, 2023, 8 pages.
Office Action received for Chinese Patent Application No. 202010295272.4, mailed on Feb. 5, 2024, 14 pages.
Office Action received for Chinese Patent Application No. 202010295272.4, mailed on Feb. 27, 2023, 15 pages.
Office Action received for Chinese Patent Application No. 202080039642.6, mailed on Sep. 5, 2022, 12 pages.
Office Action received for Chinese Patent Application No. 202110011509.6, mailed on Oct. 11, 2021, 10 pages.
Office Action received for Chinese Patent Application No. 202111612841.4, mailed on Jul. 22, 2022, 13 pages.
Office Action received for Chinese Patent Application No. 202211081603.X, mailed on Jan. 10, 2024, 10 pages.
Office Action received for Chinese Patent Application No. 202211081603.X, mailed on Oct. 20, 2023, 15 pages.
Office Action received for Chinese Patent Application No. 202211096369.8, mailed on Sep. 29, 2023, 13 pages.
Office Action received for Chinese Patent Application No. 202211110081.1, mailed on Jan. 8, 2024, 14 pages.
Office Action received for Chinese Patent Application No. 202211110081.1, mailed on Oct. 13, 2023, 16 pages.
Office Action received for Chinese Patent Application No. 202211558100.7, mailed on Jan. 8, 2024, 12 pages.
Office Action Received for Chinese Patent Application No. 201520594249.X, mailed on Dec. 9, 2015, 4 pages.
Office Action Received for Chinese Patent Application No. 201520595384.6, mailed on Dec. 9, 2015, 4 pages.
Office Action Received for Chinese Patent Application No. 201520595385.0, mailed on Dec. 9, 2015, 4 pages.
Office Action Received for Chinese Patent Application No. 201520595538.1, mailed on Dec. 9, 2015, 4 pages.
Office Action received for Danish Patent Application No. PA201570495, mailed on Dec. 9, 2016, 2 pages.
Office action received for Danish Patent Application No. PA201570495, mailed on May 4, 2016, 8 pages.
Office Action received for Danish Patent Application No. PA201570495, mailed on Oct. 29, 2015, 7 pages.
Office Action received for Danish Patent Application No. PA201570497, mailed on Feb. 21, 2017, 3 pages.
Office Action received for Danish Patent Application No. PA201570497, mailed on May 17, 2016, 6 pages.
Office Action received for Danish Patent Application No. PA201570497, mailed on Nov. 15, 2016, 2 pages.
Office Action received for Danish Patent Application No. PA201570497, mailed on Oct. 24, 2017, 2 pages.
Office Action received for Danish Patent Application No. PA201570498, mailed on Feb. 6, 2017, 2 pages.
Office Action received for Danish Patent Application No. PA201570498, mailed on Jun. 2, 2016, 8 pages.
Office Action received for Danish Patent Application No. PA201570498, mailed on Oct. 26, 2017, 5 pages.
Office Action received for Danish Patent Application No. PA201570498, mailed on Oct. 30, 2015, 7 pages.
Office Action received for Danish Patent Application No. PA201570499, mailed on Feb. 14, 2017, 2 pages.
Office Action received for Danish Patent Application No. PA201570499, mailed on Jun. 16, 2016, 8 pages.
Office Action received for Danish Patent Application No. PA201570499, mailed on Jun. 19, 2018, 4 pages.
Office Action received for Danish Patent Application No. PA201570499, mailed on Nov. 3, 2015, 7 pages.
Office Action received for Danish Patent Application No. PA201570664, mailed on Dec. 14, 2016, 2 pages.
Office Action received for Danish Patent Application No. PA201570664, mailed on Jun. 3, 2016, 3 pages.
Office Action received for Danish Patent Application No. PA201570664, mailed on Mar. 15, 2016, 10 pages.
Office Action received for Danish Patent Application No. PA201570667, mailed on Apr. 1, 2016, 7 pages.
Office Action received for Danish Patent Application No. PA201570667, mailed on Sep. 2, 2016, 2 pages.
Office Action received for Danish Patent Application No. PA201570771, mailed on Jun. 13, 2016, 3 pages.
Office Action received for Danish Patent Application No. PA201570771, mailed on Mar. 17, 2016, 8 pages.
Office Action received for Danish Patent Application No. PA201570773, mailed on Aug. 28, 2017, 3 pages.
Office Action received for Danish Patent Application No. PA201570773, mailed on Feb. 15, 2017, 3 pages.
Office Action Received for Danish Patent Application No. PA201570773, mailed on Mar. 18, 2016, 9 pages.
Office Action received for Danish Patent Application No. PA201570773, mailed on Sep. 12, 2016, 3 pages.
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Apr. 6, 2016, 12 pages.

(56) References Cited

OTHER PUBLICATIONS

Office action received for Danish Patent Application No. PA201570791, mailed on Sep. 6, 2016, 4 pages.
Office Action received for Danish Patent Application No. PA201670074, mailed on Apr. 7, 2016, 8 pages.
Office Action received for Danish Patent Application No. PA201670074, mailed on Jun. 28, 2016, 5 pages.
Office Action received for Danish Patent Application No. PA201670074, mailed on Mar. 16, 2017, 2 pages.
Office Action received for Danish Patent Application No. PA201670319, mailed on Aug. 2, 2016, 6 pages.
Office Action received for Danish Patent Application No. PA201670319, mailed on Jun. 21, 2017, 6 pages.
Office Action received for Danish Patent Application No. PA201670319, mailed on Nov. 24, 2016, 7 pages.
Office Action received for Danish Patent Application No. PA201670320, mailed on Aug. 4, 2016, 9 pages.
Office Action received for Danish Patent Application No. PA201670320, mailed on Dec. 5, 2016, 4 pages.
Office Action received for Danish Patent Application No. PA201670320, mailed on Jan. 18, 2018, 2 pages.
Office Action received for Danish Patent Application No. PA201670320, mailed on Jul. 3, 2017, 4 pages.
Office Action received for Danish Patent Application No. PA201770423, mailed on Jun. 12, 2018, 7 pages.
Office Action received for Danish Patent Application No. PA201770423, mailed on Mar. 29, 2019, 6 pages.
Office Action received for Danish Patent Application No. PA201970533, mailed on Apr. 20, 2021, 2 pages.
Office Action received for Danish Patent Application No. PA201970533, mailed on Jul. 17, 2020, 6 pages.
Office Action received for Danish Patent Application No. PA202070609, mailed on Dec. 10, 2020, 8 pages.
Office Action received for Danish Patent Application No. PA202070610, mailed on Jun. 18, 2021, 8 pages.
Office Action received for Danish Patent Application No. PA202070610, mailed on Mar. 14, 2022, 7 pages.
Office Action received for Danish Patent Application No. PA201570496, mailed on Oct. 29, 2015, 6 pages.
Office Action received for Danish Patent Application No. PA201570497, mailed on Oct. 30, 2015, 6 pages.
Office Action received for European Patent Application No. 15712218.5, mailed on Aug. 3, 2017, 4 pages.
Office Action received for European Patent Application No. 15730925.3, mailed on Apr. 12, 2018, 8 pages.
Office Action received for European Patent Application No. 15739109.5, mailed on Jan. 31, 2018, 7 pages.
Office Action received for European Patent Application No. 15739110.3, mailed on Jan. 31, 2018, 8 pages.
Office Action received for European Patent Application No. 15747595.5, mailed on Apr. 15, 2019, 4 pages.
Office Action received for European Patent Application No. 15747595.5, mailed on Jun. 27, 2018, 8 pages.
Office Action received for European Patent Application No. 15753796.0, mailed on Aug. 4, 2020, 9 pages.
Office Action received for European Patent Application No. 15753796.0, mailed on Jun. 2, 2022, 2 pages.
Office Action received for European Patent Application No. 15759998.6, mailed on Dec. 19, 2018, 6 pages.
Office Action received for European Patent Application No. 15759998.6, mailed on Jul. 16, 2018, 6 pages.
Office Action received for European Patent Application No. 15759998.6, mailed on May 29, 2019, 6 pages.
Office Action received for European Patent Application No. 15760008.1, mailed on Jul. 16, 2019, 9 pages.
Office Action received for European Patent Application No. 15787091.6, mailed on Aug. 2, 2019, 8 pages.
Office Action received for European Patent Application No. 15787091.6, mailed on Oct. 8, 2018, 7 pages.
Office Action received for European Patent Application No. 16190252.3, mailed on Feb. 19, 2018, 7 pages.
Office Action received for European Patent Application No. 16708003.5, mailed on Feb. 22, 2021, 10 pages.
Office Action received for European Patent Application No. 16708014.2, mailed on Apr. 3, 2019, 7 pages.
Office Action received for European Patent Application No. 16708014.2, mailed on Mar. 4, 2021, 7 pages.
Office Action received for European Patent Application No. 17184710.6, mailed on Dec. 21, 2018, 7 pages.
Office Action received for European Patent Application No. 17810749.6, mailed on Aug. 20, 2019, 9 pages.
Office Action received for European Patent Application No. 19203942.8, mailed on Oct. 29, 2021, 6 pages.
Office Action received for European Patent Application No. 19722280.5, mailed on Oct. 4, 2021, 7 pages.
Office Action received for European Patent Application No. 20176616.9, mailed on Jun. 10, 2021, 4 pages.
Office Action received for European Patent Application No. 20192404.0, mailed on Dec. 2, 2020, 8 pages.
Office Action received for European Patent Application No. 20192404.0, mailed on Jun. 8, 2021, 7 pages.
Office Action received for European Patent Application No. 20720310.0, mailed on Apr. 11, 2023, 8 pages.
Office Action received for European Patent Application No. 20720310.0, mailed on Jul. 25, 2023, 11 pages.
Office Action received for European Patent Application No. 20720310.0, mailed on Oct. 4, 2022, 9 pages.
Office Action received for European Patent Application No. 20729346.5, mailed on Jan. 17, 2022, 8 pages.
Office Action received for European Patent Application No. 20729346.5, mailed on Jul. 28, 2022, 9 pages.
Office Action received for European Patent Application No. 20746429.8, mailed on Sep. 20, 2023, 10 pages.
Office Action received for European Patent Application No. 21165295.3, mailed on Jul. 1, 2021, 10 pages.
Office Action received for European Patent Application No. 22157106.0, mailed on Dec. 21, 2023, 6 pages.
Office Action received for European Patent Application No. 23158566.2, mailed on Apr. 9, 2024, 7 pages.
Office Action received for European Patent Application No. 15730925.3, mailed on Feb. 27, 2019, 5 pages.
Office Action received for German Patent Application No. 112015003083.2, mailed on Mar. 9, 2018, 12 pages.
Office Action received for Indian Patent Application No. 202017041557, mailed on Dec. 8, 2021, 8 pages.
Office Action received for Japanese Patent Application No. 2018-126311, mailed on Nov. 2, 2018, 4 pages.
Office Action received for Japanese Patent Application No. 2017-505450, mailed on Jun. 20, 2017, 8 pages.
Office Action received for Japanese Patent Application No. 2017-505842, mailed on Feb. 22, 2019, 11 pages.
Office Action received for Japanese Patent Application No. 2017-505842, mailed on Sep. 9, 2019, 7 pages.
Office Action received for Japanese Patent Application No. 2017-505847, mailed on Feb. 12, 2019, 13 pages.
Office Action received for Japanese Patent Application No. 2017-510631, mailed on Mar. 2, 2018, 12 pages.
Office Action received for Japanese Patent Application No. 2017-545733, mailed on Feb. 13, 2018, 7 pages.
Office Action received for Japanese Patent Application No. 2018-074971, mailed on Jan. 28, 2019, 6 pages.
Office Action received for Japanese Patent Application No. 2018-080122, mailed on Aug. 9, 2019, 5 pages.
Office Action received for Japanese Patent Application No. 2018-080122, mailed on Jan. 28, 2019, 11 pages.
Office Action received for Japanese Patent Application No. 2018-080122, mailed on Nov. 27, 2020, 16 pages.
Office Action received for Japanese Patent Application No. 2018-107114, mailed on Oct. 9, 2018, 4 pages.
Office Action received for Japanese Patent Application No. 2020-124605, mailed on Dec. 17, 2021, 2 pages.

(56) References Cited

OTHER PUBLICATIONS

Office Action received for Japanese Patent Application No. 2020-124605, mailed on May 13, 2022, 6 pages.
Office Action received for Japanese Patent Application No. 2020-124605, mailed on Sep. 3, 2021, 5 pages.
Office Action received for Japanese Patent Application No. 2022-149476, mailed on Nov. 2, 2023, 9 pages.
Office Action received for Japanese Patent Application No. 2022-205934, mailed on Mar. 11, 2024, 4 pages.
Office Action received for Korean Patent Application No. 10-2017-7005939, mailed on Jun. 30, 2017, 6 pages.
Office Action received for Korean Patent Application No. 10-2018-7018904, mailed on Aug. 20, 2019, 8 pages.
Office Action received for Korean Patent Application No. 10-2018-7035747, mailed on Apr. 9, 2020, 11 pages.
Office Action received for Korean Patent Application No. 10-2018-7035747, mailed on Oct. 14, 2020, 6 pages.
Office Action received for Korean Patent Application No. 10-2020-7026036, mailed on Dec. 7, 2020, 8 pages.
Office Action received for Korean Patent Application No. 10-2020-7028759, mailed on Jun. 29, 2021, 12 pages.
Office Action received for Korean Patent Application No. 10-2022-7008567, mailed on Mar. 28, 2022, 5 pages.
Office Action received for Korean Patent Application No. 10-2022-7032414, mailed on Mar. 26, 2024, 11 pages.
Office Action received for Korean Patent Application No. 10-2023-7008854, mailed on Nov. 15, 2023, 6 pages.
Office Action received for Netherland Patent Application No. 2015245, mailed on Jan. 24, 2017, 11 pages.
Office Action received for Netherland Patent Application No. 2019753, mailed on Apr. 12, 2018, 8 pages.
Office Action received for Netherlands Patent Application No. 2015239, mailed on Oct. 28, 2016, 13 pages.
Office Action received for Taiwanese Patent Application No. 104124962, issued on Nov. 29, 2016, 6 pages.
Office Action received for Taiwanese Patent Application No. 104124998, mailed on Nov. 29, 2016, 6 pages.
Office Action received for Taiwanese Patent Application No. 104108223, mailed on Apr. 25, 2016, 10 pages.
Office Action received for Taiwanese Patent Application No. 104123593, mailed on May 24, 2016, 57 pages.
Office Action received for Taiwanese Patent Application No. 104123593, mailed on Sep. 13, 2016, 8 pages.
Office Action received for Taiwanese Patent Application No. 104124963, mailed on Jan. 5, 2017, 11 pages.
Office Action received for Taiwanese Patent Application No. 104124995, issued on Dec. 1, 2016, 6 pages.
Office Action received for Taiwanese Patent Application No. 104124997, issued on Dec. 8, 2016, 12 pages.
Office Action received for Taiwanese Patent Application No. 104128519, mailed on Mar. 29, 2017, 16 pages.
Office Action received for Taiwanese Patent Application No. 104128684, mailed on Nov. 8, 2016, 24 pages.
Office Action received for Taiwanese Patent Application No. 104128700, mailed on Aug. 31, 2016, 13 pages.
Office Action received for Taiwanese Patent Application No. 104128705, mailed on Aug. 29, 2016, 18 pages.
Office Action received for Taiwanese Patent Application No. 104128705, mailed on Mar. 16, 2017, 3 pages.
Office Action received for Taiwanese Patent Application No. 104133756, issued on May 17, 2017, 13 pages.
Office Action received for Taiwanese Patent Application No. 104133757, issued on Jul. 6, 2016, 22 pages.
Office Action received for Taiwanese Patent Application No. 104107328, mailed on Dec. 28, 2016, 4 pages.
Office Action received for Taiwanese Patent Application No. 104120843, mailed on Jan. 30, 2016, 5 pages.
Office Action Recieved for Australian Patent Application No. 2015101183, issued on Nov. 6, 2015, 4 pages.
Ojeda-Zapata, Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Omar, Romero, "Sony Smartwatch 2 Custom Watchfaces Tutorial", Retrieved From: <https://www.youtube.com/watch?v=8odbxqwSQR8>, May 1, 2014, 2 pages.
Pairing Your Apple Watch With Your AppleTV, Available online at: https://www.youtube.com/watch?v=C418YFSJ-UY, Apr. 27, 2015, 3 pages.
Partial Supplementary European Search Report received for European Patent Application No. 17810749.6, mailed on Apr. 25, 2019, 8 pages.
Pentax K20D Operating Manual, http://www.ricoh-imaging.eu/en/operating-manuals-download.html, Pentax Corporation, 2008, pp. 173-174.
Phonebuff, "Hybrid Stopwatch & Timer Android App Review", Available Online at: https://www.youtube.com/watch?v=B43oCFPiWvY, Apr. 4, 2012, 7 pages.
Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Pre-Interview First Office Action received for U.S. Appl. No. 14/815,890, mailed on May 26, 2016, 4 pages.
Razykdreviews, "In Depth Review of Apple Watch Activity and Workout App", available at <URL: https://www.youtube.com/watch?v=GkKI3qIK0ow>,, Category: X Claims: 1-5 Category: L Reason: Internet citation/video, May 11, 2015, 1 page.
Record of Oral Hearing received for U.S. Appl. No. 14/815,890, mailed on Nov. 20, 2020, 18 pages.
Record of Oral Hearing received for U.S. Appl. No. 15/405,122, mailed on Sep. 12, 2023, 20 pages.
Rehman A, "Install Android 4.2 Gesture-Based Keyboard & Clock App on Jelly Bean 4.1 or Higher", Excerpts From, Available online at <http://www.addictivetips.com/android/install-android-4-2-keyboard-clock-app-apk-on-jelly-bean-4-1-x/>, Nov. 3, 2012, 4 pages.
Remote Phone Call, Available online at <https://web.archive.org/web/20140625104844/https://www.justremotephone.com/>, Jun. 25, 2014, 22 pages.
Remote Shot for SmartWatch 2, Available online at:—https://play.google.com/store/apps/details?id=net.watea.sw2.rshot&hl=en, Nov. 21, 2017, 3 pages.
Responding to a meeting invitation, Available online at:—https://web.archive.org/web/20121128174157/https://www.zimbra.com/desktop7/help/en_US/Calendar/Responding_to_an_invitation.htm, Nov. 28, 2012, 1 page.
Restriction Requirement received for U.S. Appl. No. 14/815,890, mailed on Feb. 22, 2016, 5 pages.
Result of Consultation received for European Patent Application No. 15760008.1, mailed on Sep. 9, 2021, 7 pages.
Result of Consultation received for European Patent Application No. 16708003.5, mailed on Apr. 18, 2023, 9 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Result of Consultation received for European Patent Application No. 17810749.6, mailed on Dec. 15, 2020, 3 pages.
Result of Consultation received for European Patent Application No. 17810749.6, mailed on Jan. 18, 2021, 3 pages.
Result of Consultation received for European Patent Application No. 17810749.6, mailed on Jan. 21, 2021, 18 pages.
Result of Consultation received for European Patent Application No. 20185974.1, mailed on Apr. 4, 2022, 4 pages.
Result of Consultation received for European Patent Application No. 20729346.5, mailed on Jun. 21, 2023, 3 pages.
Result of Consultation received for European Patent Application No. 15730925.3, mailed on Nov. 24, 2020, 4 pages.
Rizknows, "Garmin Connect Mobile App—Review #2", https://www.youtube.com/watch?v=7my3wMpeRbE, Category: X Claims: 1-5 Category: L Reason: Internet citation/video, Oct. 22, 2015, 1 page.

(56) References Cited

OTHER PUBLICATIONS

Rowinski, Dan, "Why The All-In-One Smartwatch Isn't Happening any Time Soon", Online available at:—https://web.archive.org/web/20140123074218if_/https://readwrite.com/2014/01/20/smartwatch-wearable-fitness-remote-control/, Jan. 20, 2014, 6 pages.
Samsung,"SM-G900F User Manual", English EU). Rev.1.0, Mar. 2014, 249 pages.
Search Report and Opinion received for Danish Patent Application No. PA201770423, mailed on Oct. 4, 2017, 10 pages.
Search Report and Opinion received for Danish Patent Application No. PA201970533, mailed on Oct. 25, 2019, 9 pages.
Search Report and Opinion received for Danish Patent Application No. PA202070610, mailed on Jan. 8, 2021, 9 pages.
Search Report and Opinion received for Netherland Patent Application No. 2015232, mailed on Jan. 25, 2017, 9 pages.
Search Report and Opinion received for Netherlands Patent Application No. 2015242, issued on Jul. 4, 2017, 20 pages.
Search Report and Opinion received for Netherlands Patent Application No. 2015364, issued on Jul. 4, 2017, 12 pages.
Search Report and Opinion received for Netherlands Patent Application No. 2018531, issued on Jul. 27, 2017, 14 pages.
Search Report received for Netherlands Patent Application No. 2015236, mailed on Apr. 21, 2021, 19 pages.
Shankland, Stephen, "Chrome OS Gets 'OK Google' Voice Search Control", available online at <http://www.cnet.com/news/chrome-os-gets-ok-google-voice-search-control/>, May 21, 2014, 4 pages.
Shiota ,Shinji, "Windows 7 Dojo", Weekly ASCII, Ascii Mediaworks Inc., vol. 798,, Aug. 31, 2010, 3 pages.
Siewiorek et al., "SenSay: A context-aware mobile phone", Retrieved from the Internet: URL:http://www.cs.cmu.edu/aura/docdir/sensay_iswc.pdf sensay_iswc.pdf, 2003, 10 pages.
Singh, Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Smartwatch,"App Earth Space HD Live Wallpaper APK for Smart Watch", Version 1.7, Android version 2.2, Aug. 27, 2013, 1 page.
Solar Walk Free, Vito Technology, Jun. 19, 2014, 9 pages.
Sony Smartwatch 2 update—new feartures and watchface creator!!! NEW !!! , Online available at:—https://www.youtube.com/watch?v=k3jjBv7QZSk, May 8, 2014, 3 pages.
Sony,"Live View_micro display", Extended User Guide, Aug. 2010, 27 pages.
Sony,"Sony Smartwatch 3 SWR50", User Guide, Jul. 2014, 31 pages.
Sony,"Sony SmartWatch", User Guide, Dec. 2011, 18 pages.
Stateoftech,"Samsung Galaxy Gear Tips—Installing and Customizing Clock Faces", Online available at:—https://www.youtube.com/watch?v=p2GzpL3xlUo, Dec. 12, 2013, 3 pages.
Stateoftech,"Samsung Galaxy Gear Tips- Change the Clock Face", Retrieved from: https://www.youtube.com/watch?v=GOom7AZUAjY, Dec. 11, 2013, 2 pages.
Summons to Attend Oral Proceedings received for European Patent Application No. 15711969.4, mailed on Oct. 22, 2018, 12 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 15760008.1, mailed on Feb. 5, 2021, 11 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Summons to Attend Oral Proceedings received for European Patent Application No. 16708003.5, mailed on Dec. 13, 2022, 11 pages.
Summons to Attend Oral Proceedings received for European Patent Application No. 16708014.2, mailed on Oct. 10, 2022, 5 pages.
Summons to Attend Oral Proceedings received for European Patent Application No. 17184710.6, mailed on Sep. 17, 2019, 7 pages.
Summons to Attend Oral Proceedings received for European Patent Application No. 17810749.6, mailed on Aug. 12, 2020, 11 pages.
Summons to Attend Oral Proceedings received for European Patent Application No. 20176616.9, mailed on Dec. 17, 2021, 7 pages.
Summons to Attend Oral Proceedings received for European Patent Application No. 20192404.0, mailed on Feb. 2, 2022, 11 pages.
Summons to Attend Oral Proceedings received for European Patent Application No. 20720310.0, mailed on Jan. 3, 2024, 12 pages.
Summons to Attend Oral Proceedings received for European Patent Application No. 20729346.5, mailed on Jan. 23, 2023, 11 pages.
Summons to Attend Oral Proceedings received for European Patent Application No. 21165295.3, mailed on Jul. 25, 2023, 14 pages.
Summons to Oral Proceedings received for European Patent Application No. 17184710.6, mailed on May 10, 2023, 3 pages.
Sun Set,"Sun Set solar image clock", Available at <https://web.archive.orgjweb/20140719005410/http://www.sunsetclock.com/>, 2013, 5 pages.
Supplemental Notice of Allowance received for U.S. Appl. No. 14/805,403, mailed on Oct. 4, 2018, 3 pages.
Supplemental Notice of Allowance received for U.S. Appl. No. 14/815,890, mailed on Mar. 10, 2021, 2 pages.
Supplemental Notice of Allowance received for U.S. Appl. No. 14/833,014, mailed on Mar. 12, 2020, 2 pages.
Supplemental Notice of Allowance received for U.S. Appl. No. 14/841,608, mailed on Jan. 25, 2018, 2 pages.
Supplemental Notice of Allowance received for U.S. Appl. No. 15/433,238, mailed on Jun. 20, 2018, 2 pages.
Supplemental Notice of Allowance received for U.S. Appl. No. 15/616,480, mailed on Mar. 28, 2019, 2 pages.
Supplemental Notice of Allowance received for U.S. Appl. No. 16/147,523, mailed on Aug. 23, 2022, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Supplemental Notice of Allowance received for U.S. Appl. No. 17/951,875, mailed on Aug. 25, 2023, 2 pages.
Supplemental Notice of Allowance received for U.S. Appl. No. 17/975,141, mailed on Feb. 26, 2024, 2 pages.
Supplementary European Search Report received for European Patent Application No. 17810749.6, mailed on Aug. 6, 2019, 6 pages.
Tablet Talk,"Tablet Talk App: Frequently Asked Questions—Tablet Talk.", available at https://web.archive.org/web/20140625102903/http://1www.tablettal app.com/faq, Jun. 25, 2014, pp. 1-6.
Talkandroid,"Android Wear walkthrough", Available online at: https://www.youtube.com/watch?v=4xntpZac4sw, Jun. 30, 2014, 1 page.
Techcloud,"How to Create Custom Watch Face for Samsung Galaxy Gear Smartwatch just in Few Seconds", Online available at:—https://www.youtube.com/watch?v=6rO-_SREDjQ, Oct. 9, 2013, 3 pages.
Techsmith,"Snagit ® 11 Snagit 11.4 Help", Online available at <http://assets.techsmith.com/Downloads/ua-tutorials-snagit-11/Snagit_11.pdf>, Jan. 2014, 146 pages.
Theunlockr,"How to Change the Watch Face on the Galaxy Gear", Online available at:—https://www.youtube.com/watch?v=Z7EBG5aBiZg, Jan. 3, 2014, 3 pages.
UIKit User Interface Catalog: Page Controls, Available online at https://web.archive.org/web/20140703123442/https://developer.apple.com/library/ios/documentation/userexperience/conceptual/UIKitUICatalog/UIPageControl.html, Dec. 16, 2013, 4 pages.
Vanhemert, Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.

(56) References Cited

OTHER PUBLICATIONS

Viticci, Frederico, "Checking Time Zones with Living Earth—MacStories", Available at <https://www.macstories.net/reviews/checking-time-zones-with-living-earth/>, Dec. 11, 2013, pp. 1-5.
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Watchophilia,"Mickey Mouse Watches", Online Available at: https://web.archive.org/web/20130929065422/https://www.watchophilia.com/photogallery/mickey-mouse/, Sep. 29, 2013, 16 pages.
Watchuseek,"The watch every father needs: M-I-C-K-E-Y, M-O-U-S-E. Mickey Mouse . . . ? ", Online Available at: https://forums.watchuseek.com/f2/watch-every-father-needs-m-i-c-k-e-y-m-o-u-s-e-mickey-mouse-855069.html, 2013, 3 pages.
Wearablezone,"How To Set Up Your Fitbit Profile", Online available at:—<https://youtu.be/jsWPtcDWiJM>, Jun. 6, 2016, 3 pages.
Whitney, Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.
Wikipedia,"Emoji", Online Avaiable at: https://web.archive.org/web/20140829025736/https://en.wikipedia.org/wiki/Emoji, 2014, 13 pages.
Xdream,"TickTalk Video User Manual", YouTube [online] [video], Online available at: <https://youtu.be/jYhq3DwmVzo>, Mar. 17, 2017, 3 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog,"Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Zelgadis,"Reuse Animations—Synfig Animation Studio", Available online at: https://wiki.synfig.org/index.php?title=Doc:Reuse_Animations&oldid=18173, May 20, 2013, 5 pages.
Zukerman, Erez, "6 Beautiful, Interesting & Versatile Timer Apps [Android]", available at:available at: http://www.makeuseof.com/tag/beautiful-interesting-versatile-timer-apps-android/, May 18, 2012, 5 pages.
Decision to Grant received for European Patent Application No. 23173355.1, mailed on Oct. 24, 2024, 3 pages.
Extended European Search Report received for European Patent Application No. 24203946.9, mailed on Oct. 24, 2024, 9 pages.
Notice of Acceptance received for Australian Patent Application No. 2023204647, mailed on Oct. 28, 2024, 3 pages.
Office Action received for Chinese Patent Application No. 202110367769.7, mailed on Sep. 30, 2024, 21 pages (6 pages of English Translation and 15 pages of Official Copy).
Applicant-Initiated Interview Summary received for U.S. Appl. No. 18/211,150, mailed on Oct. 8, 2024, 3 pages.
Intention to Grant received for European Patent Application No. 20720310.0, mailed on Oct. 7, 2024, 14 pages.
Intention to Grant received for European Patent Application No. 23158566.2, mailed on Sep. 30, 2024, 8 pages.
Notice of Allowance received for Chinese Patent Application No. 202210312775.7, mailed on Sep. 23, 2024, 5 pages (1 page of English Translation and 4 pages of Official Copy).
Office Action received for Australian Patent Application No. 2023214377, mailed on Sep. 25, 2024, 4 pages.
Examiner's Answer to Appeal Brief received for U.S. Appl. No. 18/200,480, mailed on Dec. 13, 2024, 9 pages.
Office Action received for Chinese Patent Application No. 202110368164.X, mailed on Nov. 15, 2024, 27 pages (6 pages of English Translation and 21 pages of Official Copy).
Office Action received for Chinese Patent Application No. 202110368460.X, mailed on Nov. 9, 2024, 11 pages (5 pages of English Translation and 6 pages of Official Copy).
Supplemental Notice of Allowance received for U.S. Appl. No. 18/589,265, mailed on Dec. 18, 2024, 2 pages.
International Preliminary Report on Patentability received for PCT Patent Application No. PCT/US2023/022410, mailed on Nov. 28, 2024, 18 pages.
International Search Report and Written Opinion received for PCT Patent Application No. PCT/US2024/023602, mailed on Nov. 26, 2024, 17 pages.
Invitation to Pay Additional Fees and Partial International Search Report received for PCT Patent Application No. PCT/US2024/023602, mailed on Aug. 26, 2024, 11 pages.
Office Action received for Chinese Patent Application No. 202210312598.2, mailed on Jun. 27, 2024, 22 pages (7 pages of English Translation and 15 pages of Official Copy).
Decision to Grant received for European Patent Application No. 24211972.5, mailed on Jul. 31, 2025, 2 pages.
Intention to Grant received for European Patent Application No. 23158566.2, mailed on Jul. 30, 2025, 9 pages.
Notice of Allowance received for U.S. Appl. No. 18/441,971, mailed on Aug. 5, 2025, 11 pages.
Office Action received for Japanese Patent Application No. 2024-147808, mailed on Aug. 1, 2025, 10 pages (5 pages of English Translation and 5 pages of Official Copy).
Summons to Oral Proceedings received for European Patent Application No. 21165295.3, mailed on Jul. 21, 2025, 11 pages.
Advisory Action received for U.S. Appl. No. 18/228,597, mailed on Jul. 7, 2025, 3 pages.
Applicant-Initiated Interview Summary received for U.S. Appl. No. 18/441,971, mailed on Jul. 15, 2025, 4 pages.
Board Decision received for Chinese Patent Application No. 202110368426.2, mailed on Jul. 2, 2025, 2 pages (1 page of English Translation and 1 page of Official Copy).
Corrected Notice of Allowance received for U.S. Appl. No. 17/181,089, mailed on Jul. 15, 2025, 3 pages.
Notice of Allowance received for Chinese Patent Application No. 202110368426.2, mailed on Jul. 7, 2025, 4 pages (1 page of English Translation and 3 pages of Official Copy).
Notice of Allowance received for U.S. Appl. No. 17/181,089, mailed on Jul. 3, 2025, 12 pages.
Applicant-Initiated Interview Summary received for U.S. Appl. No. No. 17/410, 169, mailed on May 8, 2024, 6 pages.
Applicant-Initiated Interview Summary received for U.S. Appl. No. 17/746,807, mailed on May 21, 2024, 2 pages.
Applicant-Initiated Interview Summary received for U.S. Appl. No. 18/088,309, mailed on Jun. 7, 2024, 2 pages.
Applicant-Initiated Interview Summary received for U.S. Appl. No. 18/122,625, mailed on May 22, 2024, 2 pages.
Decision to Refuse received for European Patent Application No. 21165295.3, mailed on Apr. 29, 2024, 14 pages.
Hayakawa Atsushi, "An On-Line Wear Club", Mac People, ASCII Corp, Japan, vol. 8, No. 20., Oct. 15, 2002, 4 pages (Official copy Only). See Communication Under Rule 37 CFR § 1.98(a)(3).
Intention to Grant received for European Patent Application No. 15753796.0, mailed on Jun. 5, 2024, 8 pages.
Minutes of Oral Proceedings received for European Patent Application No. 21165295.3, mailed on Apr. 26, 2024, 6 pages.
Minutes of the Oral Proceedings received for European Patent Application No. 17184710.6, mailed on May 22, 2024, 4 pages.
Minutes of the Oral Proceedings received for European Patent Application No. 20720310.0, mailed on Jun. 7, 2024, 7 pages.
Non-Final Office Action received for U.S. Appl. No. 18/200,480, mailed on May 20, 2024, 19 pages.
Office Action received for Australian Patent Application No. 2023214377, mailed on Jun. 5, 2024, 4 pages.
Office Action received for Chinese Patent Application No. 202080039832.8, mailed on Mar. 23, 2024, 22 pages (12 pages of English Translation and 10 pages of Official Copy).
Office Action received for Chinese Patent Application No. 202211081603.X, mailed on Apr. 29, 2024, 6 pages (3 pages of English Translation and 3 pages of Official Copy).

(56) References Cited

OTHER PUBLICATIONS

Office Action received for Chinese Patent Application No. 202211110081.1, mailed on Apr. 28, 2024, 6 pages (3 pages of English Translation and 3 pages of Official Copy).
Office Action received for Japanese Patent Application No. 2022-149476, mailed on Apr. 22, 2024, 8 pages (4 pages of English Translation and 4 pages of Official Copy).
Result of Consultation received for European Patent Application No. 20720310.0, mailed on Apr. 17, 2024, 9 pages.
Result of Consultation received for European Patent Application No. 20720310.0, mailed on Jun. 4, 2024, 3 pages.
Result of Consultation received for European Patent Application No. 21165295.3, mailed on Apr. 18, 2024, 3 pages.
Notice of Allowance received for Chinese Patent Application No. 202310794146.7, mailed on Sep. 29, 2025, 4 pages (1 page of English Translation and 3 pages of Official Copy).
Notice of Allowance received for U.S. Appl. No. 18/892,251, mailed on Oct. 22, 2025, 8 pages.
Record of Oral Hearing received for U.S. Appl. No. 18/200,480, mailed on Oct. 14, 2025, 15 pages.
Corrected Notice of Allowance received for U.S. Appl. No. 18/441,971, mailed on Aug. 21, 2025, 2 pages.
Non-Final Office Action received for U.S. Appl. No. 18/102,036, mailed on Aug. 25, 2025, 22 pages.
Notice of Allowance received for U.S. Appl. No. 16/943,737, mailed on Aug. 25, 2025, 5 pages.
Applicant-Initiated Interview Summary received for U.S. Appl. No. 18/892,251, mailed on Sep. 17, 2025, 4 pages.
Board Opinion received for Chinese Patent Application No. 201810411708.4, mailed on Sep. 15, 2025, 4 pages (1 page of English Translation and 3 pages of Official Copy).
Corrected Notice of Allowance received for U.S. Appl. No. 18/228,597, mailed on Sep. 17, 2025, 2 pages.
Decision on Appeal received for U.S. Appl. No. 18/200,480, mailed on Sep. 26, 2025, 14 pages.
Intention to Grant received for European Patent Application No. 24203946.9, mailed on Sep. 5, 2025, 9 pages.
Notice of Allowance received for U.S. Appl. No. 18/228,597, mailed on Sep. 10, 2025, 10 pages.
Office Action received for European Patent Application No. 24194531.0, mailed on Nov. 27, 2025, 7 pages.

\* cited by examiner

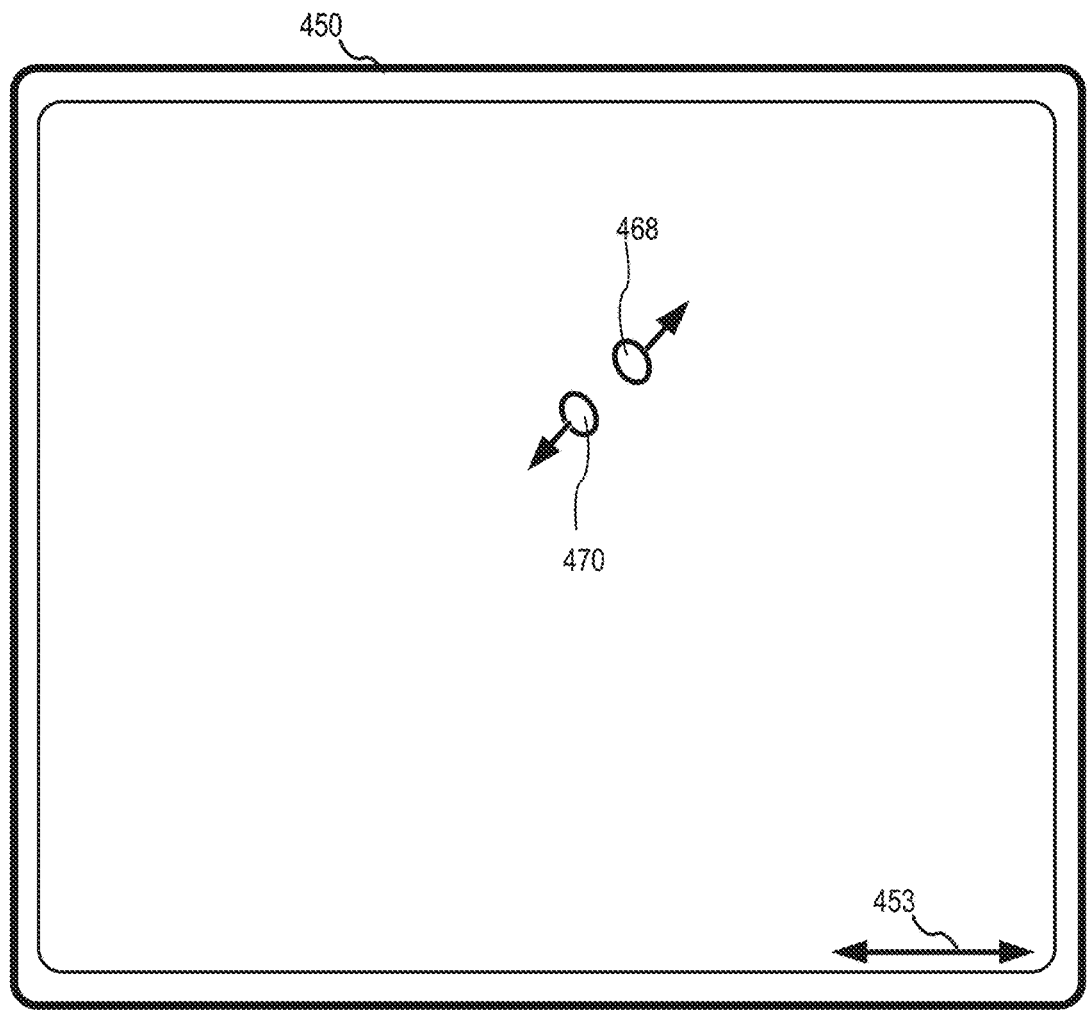
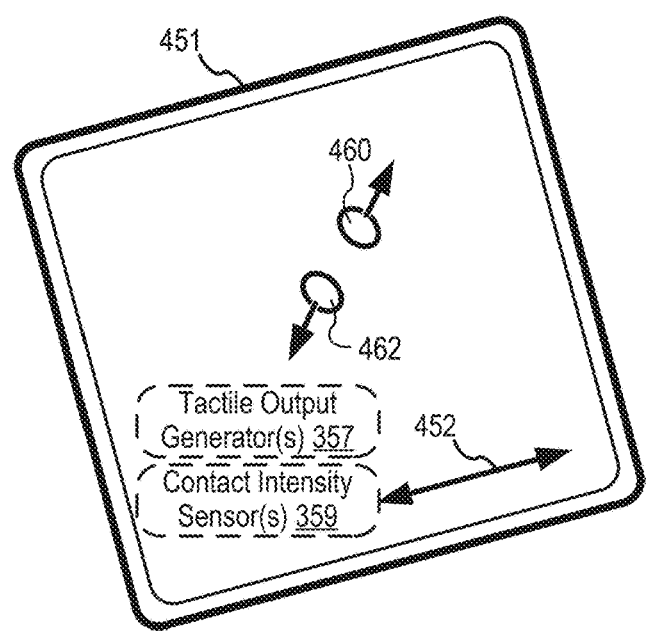
*FIG. 4B*

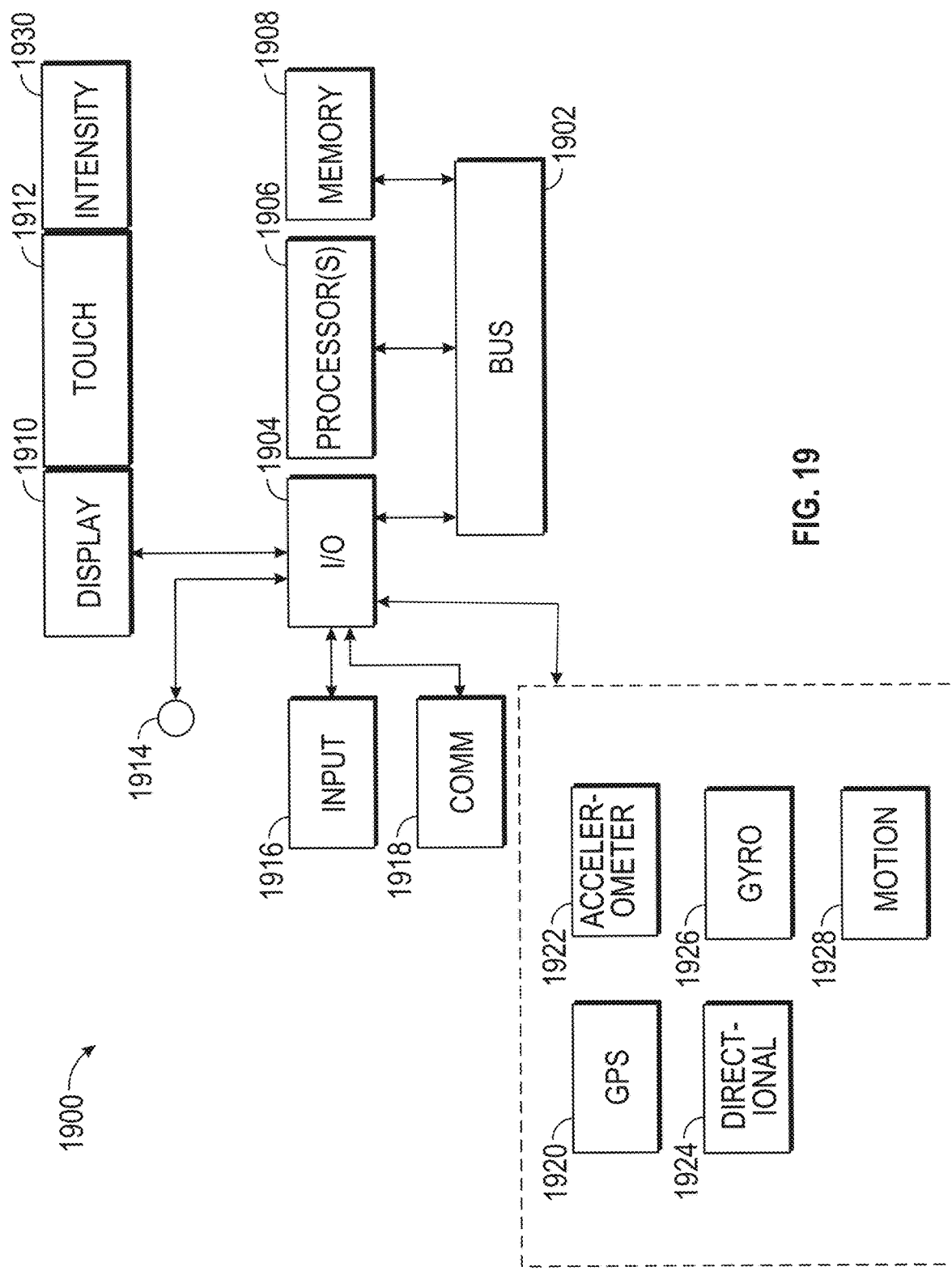

REMOTE USER INTERFACE

CROSS-REFERENCE TO RELATED APPLICATIONS

This application is a continuation of U.S. patent application Ser. No. 17/975,141, entitled "REMOTE USER INTERFACE", filed Oct. 27, 2022, which is a continuation of U.S. patent application Ser. No. 16/147,523, entitled "REMOTE USER INTERFACE", filed Sep. 28, 2018, now U.S. Pat. No. 11,604,571, which is a continuation of U.S. patent application Ser. No. 14/805,403, entitled "REMOTE USER INTERFACE", filed Jul. 21, 2015, now U.S. Pat. No. 10,135,905, which claims the benefit of priority of Provisional Patent Application No. 62/027,145, entitled "REMOTE USER INTERFACE", filed Jul. 21, 2014; U.S. Provisional Patent Application No. 62/027,764, entitled "REMOTE USER INTERFACE", filed Jul. 22, 2014; and U.S. Provisional Patent Application No. 62/129,798, entitled "REMOTE USER INTERFACE", filed Mar. 7, 2015. The content of each of these applications is hereby incorporated by reference in its entirety for all purposes.

This application relates to the following applications: International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/069483, entitled "Device, Method, and Graphical User Interface for Transitioning Between Touch Input to Display Output Relationships," filed Nov. 11, 2013; and U.S. Provisional Patent Application Ser. No. 62/026,532, "Raise Gesture Detection in a Device," filed Jul. 18, 2014. The content of these applications are hereby incorporated by reference in their entirety.

FIELD

The disclosed examples relate generally to user interfaces of electronic devices.

BACKGROUND

Consumers often own multiple electronic devices. Such electronic devices may be portable devices like cellular phones, tablet computers, laptops, digital audio players, and so forth. Such electronic devices may also be home electronics like audio-visual equipment, home security equipment, home automation equipment, appliances, and so forth. Such electronic devices may also be integrated with equipment not traditionally labeled as electronic devices. For example, such electronic devices may include telematics equipment that is integrated with an automobile.

SUMMARY

User interfaces for remotely controlling target electronic devices using a personal electronic device with a touch-sensitive display are disclosed. In some examples, at an electronic device with a touch-sensitive display, where the touch-sensitive display comprises one or more sensors to detect the intensity of contacts with the touch-sensitive display, a plurality of icons representing applications, including an icon representing a remote control application, are displayed. A first contact on the touch-sensitive display at a location of the icon is received. The electronic device determines whether a target device out of a plurality of target devices is responsive to remote control. In response to the first contact and a determination of the target device being responsive to remote control, the electronic device displays a first plurality of remote controls for the target device. Further, while displaying the first plurality of remote controls, the electronic device receives a second contact on the touch-sensitive display, the second contact having a maximum intensity. In response to receiving the second contact and a determination that the maximum intensity is below a threshold intensity, the electronic device instructs the target device to perform an operation; and in response to receiving the second contact and a determination that the maximum intensity is above the threshold intensity, the electronic device displays a second plurality of remote controls for the first target device.

In some examples, the electronic device displays a user interface object on the touch-sensitive display of the electronic device, where the displayed user interface object represents a remote control application. The electronic device receives data representing a contact on the displayed user interface object, and identifies a target electronic device that is responsive to remote control. In response to receiving the data representing the contact, the electronic device displays graphical user interface objects for controlling operations of the identified target electronic device.

In some examples, when none of the target electronic devices of the plurality of target electronic devices is responsive to remote control, the electronic device displays a plurality of graphical user interface objects representing the plurality of target electronic devices. Restated, in response to a determination that no target electronic device is responsive to remote control, the electronic device displays a plurality of graphical user interface objects that represent the plurality of target electronic devices.

In some examples, the electronic device receives first data representing a first contact at a location on the touch-sensitive display, the first contact having a maximum intensity below a predetermined threshold intensity, and the location is associated with an operation of a target electronic device. In response to the first contact (which is a relatively lighter touch), the device sends an instruction to the target electronic device instructing the target electronic device to perform an operation. The electronic device then additionally receives second data representing a second contact on the display, the second contact having a maximum intensity above the threshold intensity. In response to the second contact (which is a relatively harder touch), the electronic device displays a user interface for registering (e.g., pairing) a new target electronic device with the remote control application.

In some examples, an intermediate device relays instructions from the electronic device that is running the remote control application to the target electronic device that is being remotely controlled. That is, the electronic device sends data to an intermediate electronic device, where the data represents an instruction instructing the target electronic device to perform the operation, and an instruction is then communicated by the intermediate electronic device to the target electronic device.

In some examples, the target electronic device is responsive to remote control when the target electronic device is executing an application having an operation that can be requested using the remote control application.

In some examples, the electronic device obtains data representing a plurality of target devices, displays a user interface object representing a remote control application, and receives data representing a selection on the displayed user interface object. The electronic device determines whether the number of target devices exceeds a threshold, and in accordance with a determination that the number exceeds the threshold, the electronic device displays a plurality of graphical user interface objects representing categories of target devices, in response to receiving the data, and in accordance with a determination that the number does not exceed the threshold, the electronic device a plurality of graphical user interface objects representing the plurality of target devices, in response to receiving the data.

In some examples, the electronic device determines the location of a target device relative to the electronic device; and displays, on the touch-sensitive display, a user interface object representing the target device. The target device is nearby and the display position of the user interface object, on the touch-sensitive display, is based on the location of the target device relative to the electronic device in some examples.

In some examples, the electronic device displays a user interface object representing a remote control application on the touch-sensitive display of the electronic device, receives first data representing a zoom function on the displayed user interface object; and in response to receiving the first data representing the zoom function, displays an affordance including indication of nearby target devices capable of being remotely controlled.

In some examples, the electronic device receives data representing a first movement of a rotatable input device; and in response to receiving the data representing the first movement, displays only a subset of the plurality of graphical user interface objects, where the displayed subset of graphical user interface objects includes the icon representing the remote control application, and displays an affordance including indication of nearby target devices capable of being remotely controlled.

In some examples, the electronic device identifies a target device that is responsive to remote control out of a plurality of target devices, detects a raise gesture based on detected motion of the electronic device; and, in response to detecting the raise gesture, instructs the target device to perform an operation.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 19 illustrates an exemplary computing system.

DESCRIPTION OF EMBODIMENTS

Figure 1A:
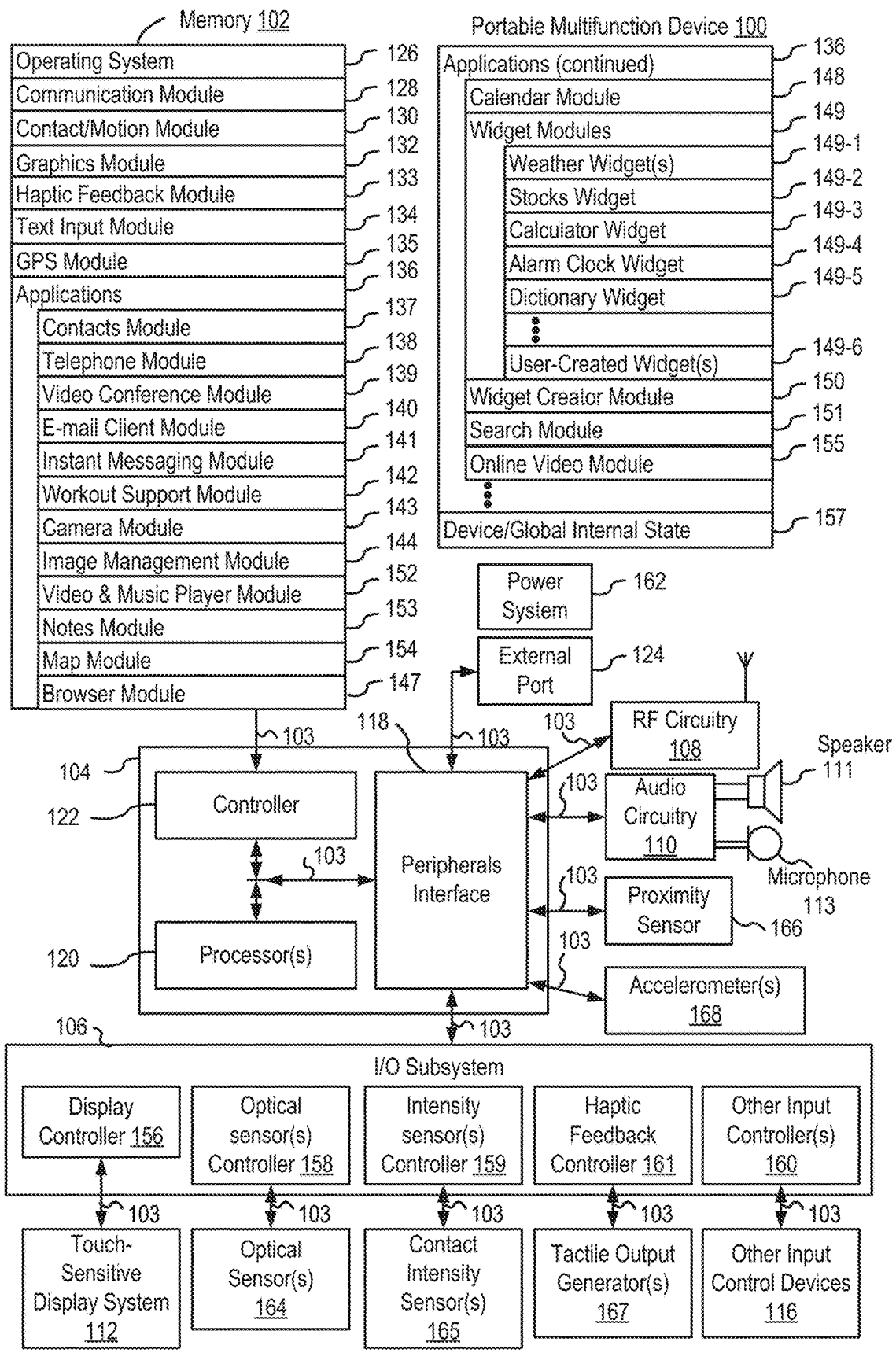
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

As discussed above, consumers often own multiple electronic devices. It is desirable for a user to be able to remotely control these electronic devices. It is also desirable for the device (i.e., the "remote control") that is used to remotely control these electronic devices to be portable and readily accessible. It is also desirable for the remote control to support remote control of various electronic devices while maintaining a physical form factor that promotes usability.

Below, FIGS. 1A-1B, 2, 3, 4A-4B, and 5A-5B provide a description of exemplary devices for performing the techniques for remote control of an electronic device. FIGS. 6-14 and 21A-22B illustrate exemplary user interfaces for performing examples of remote control described herein. The user interfaces in the figures are also used to illustrate the processes described below, including the processes in FIGS. 15A-18B and 24.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
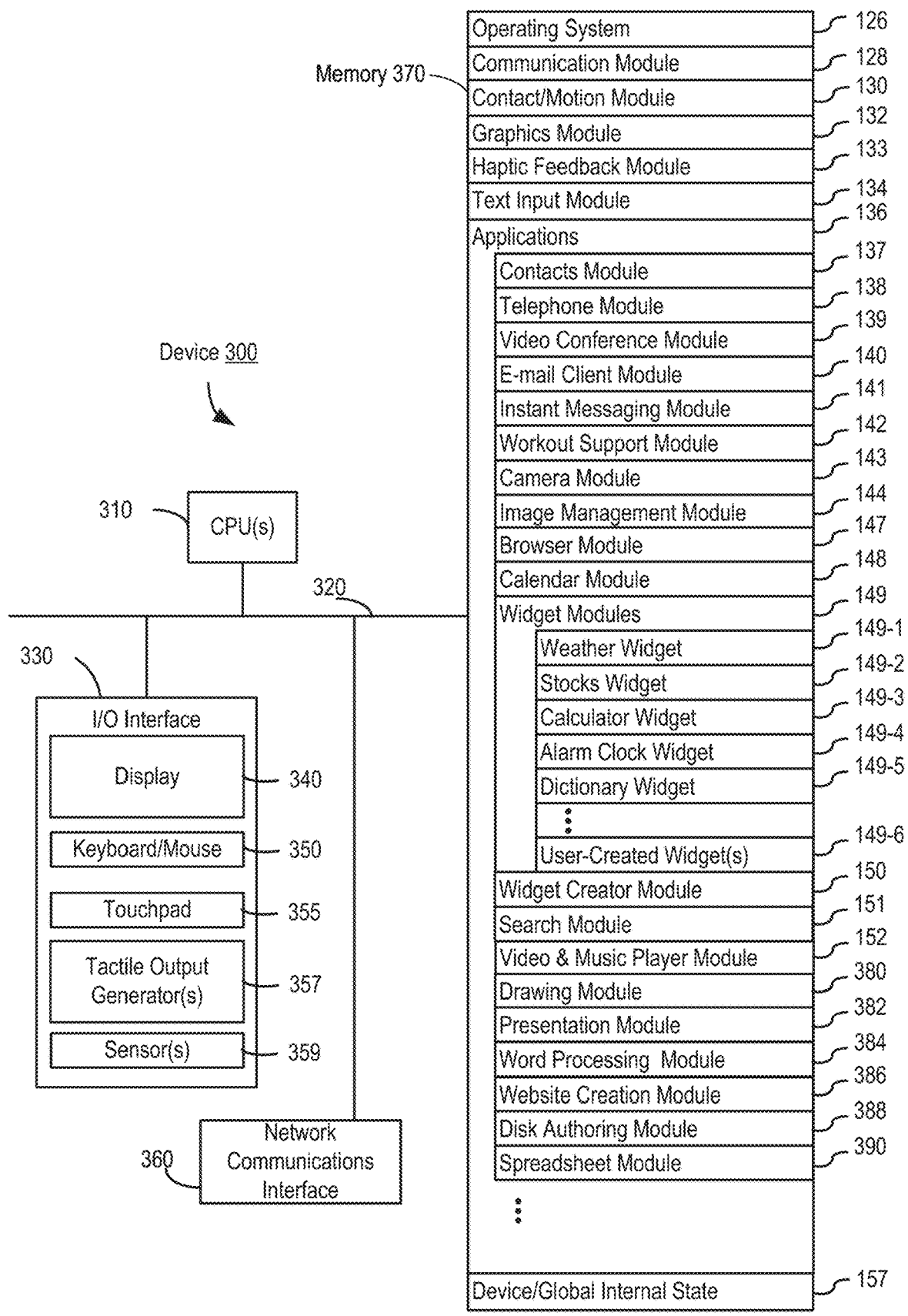
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 is, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
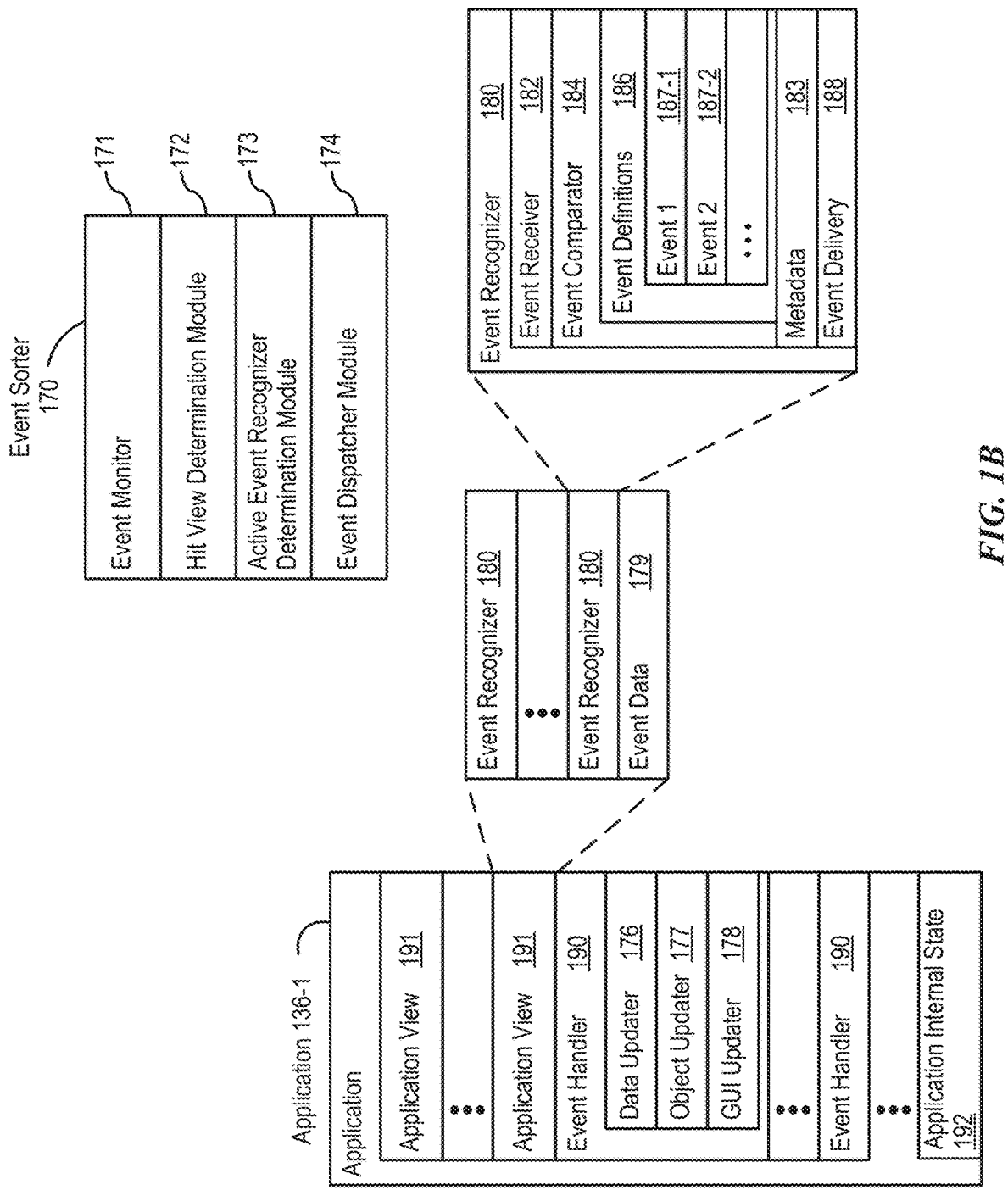
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
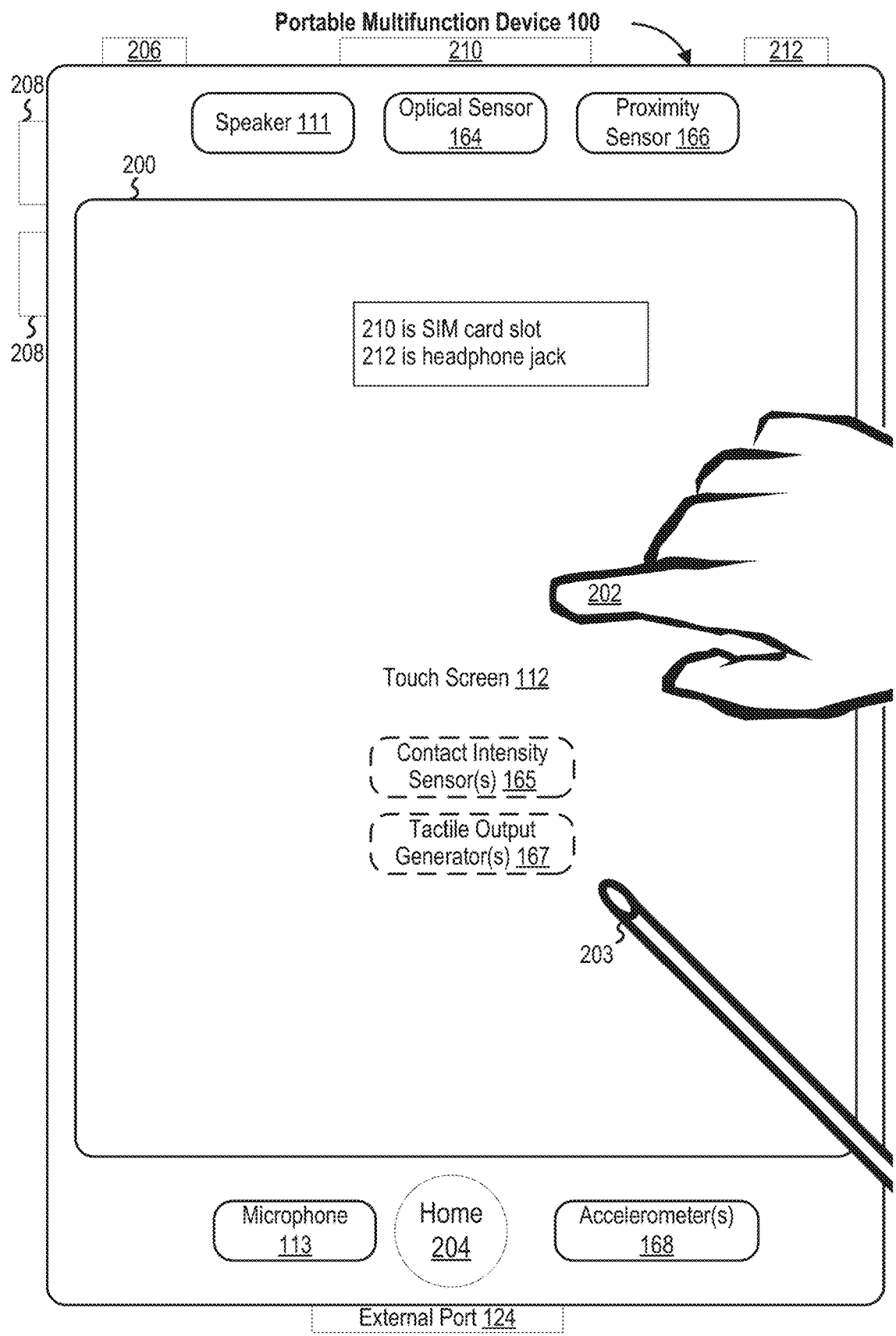
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that is, optionally, implemented on, for example, portable multifunction device 100.

Figure 4A:
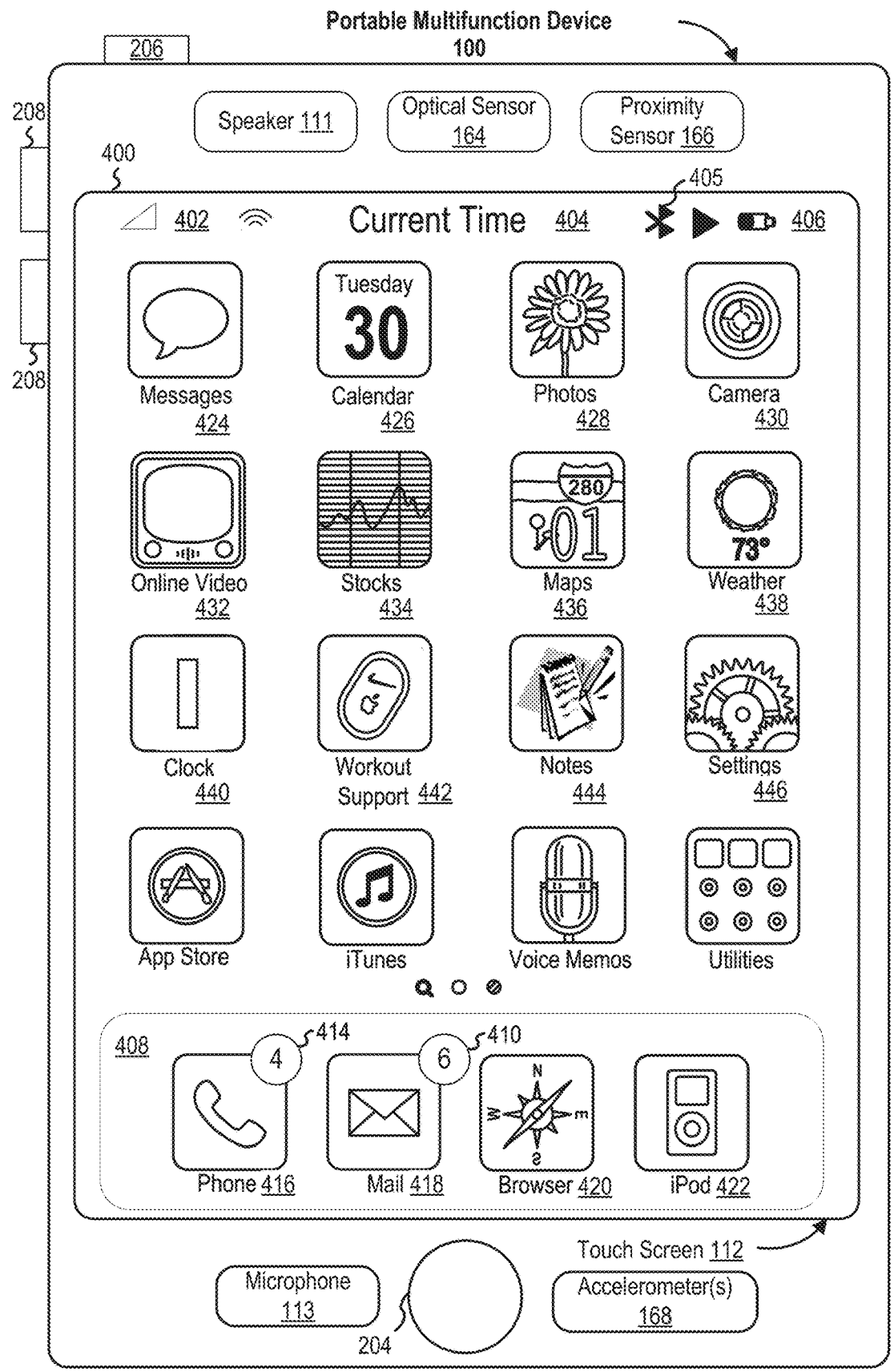
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces is, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
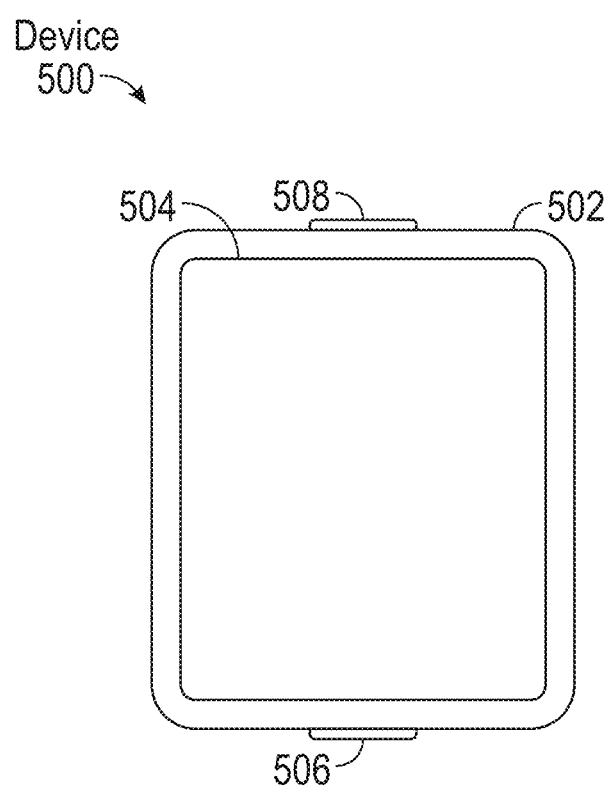
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
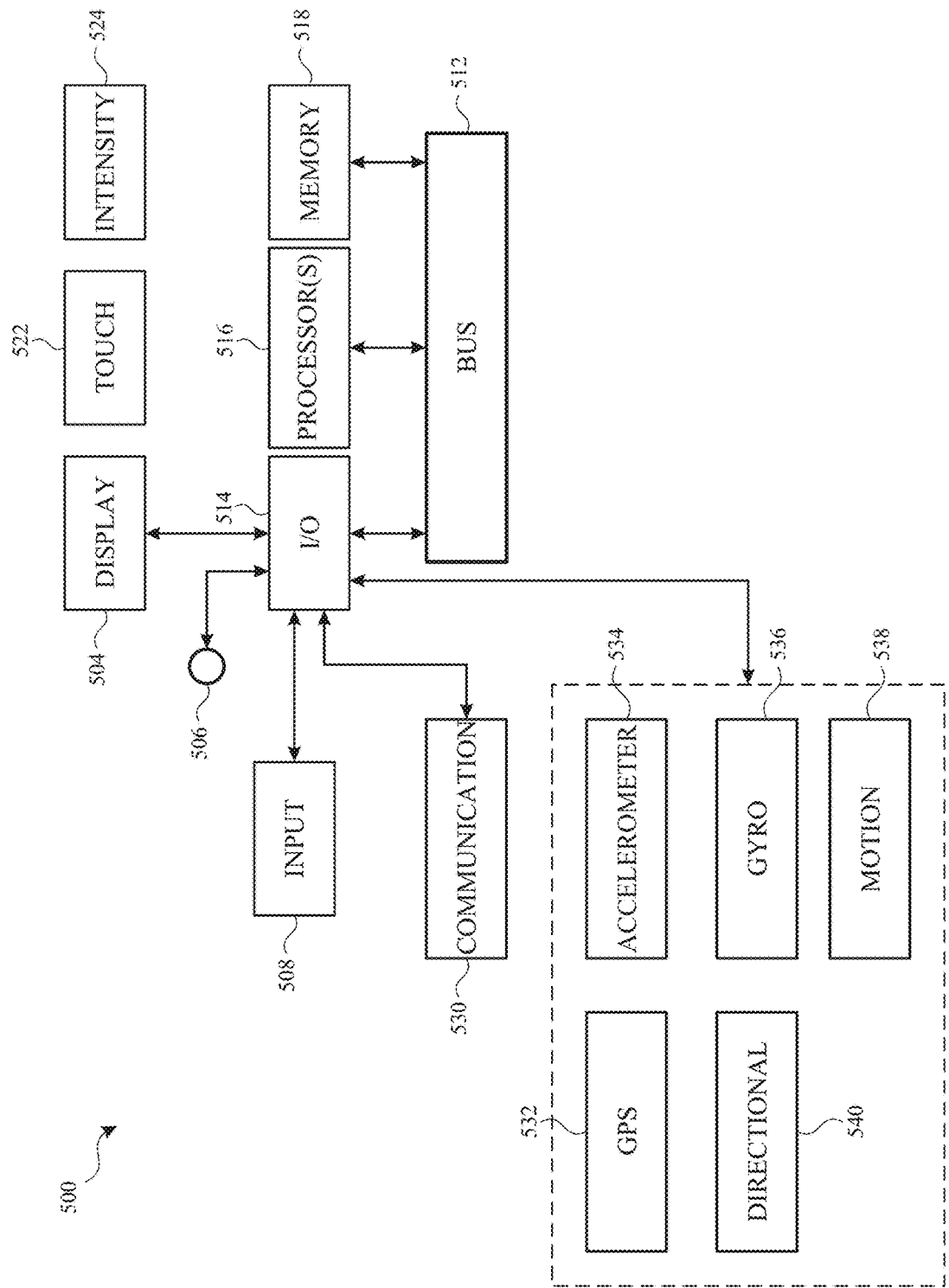
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 24:
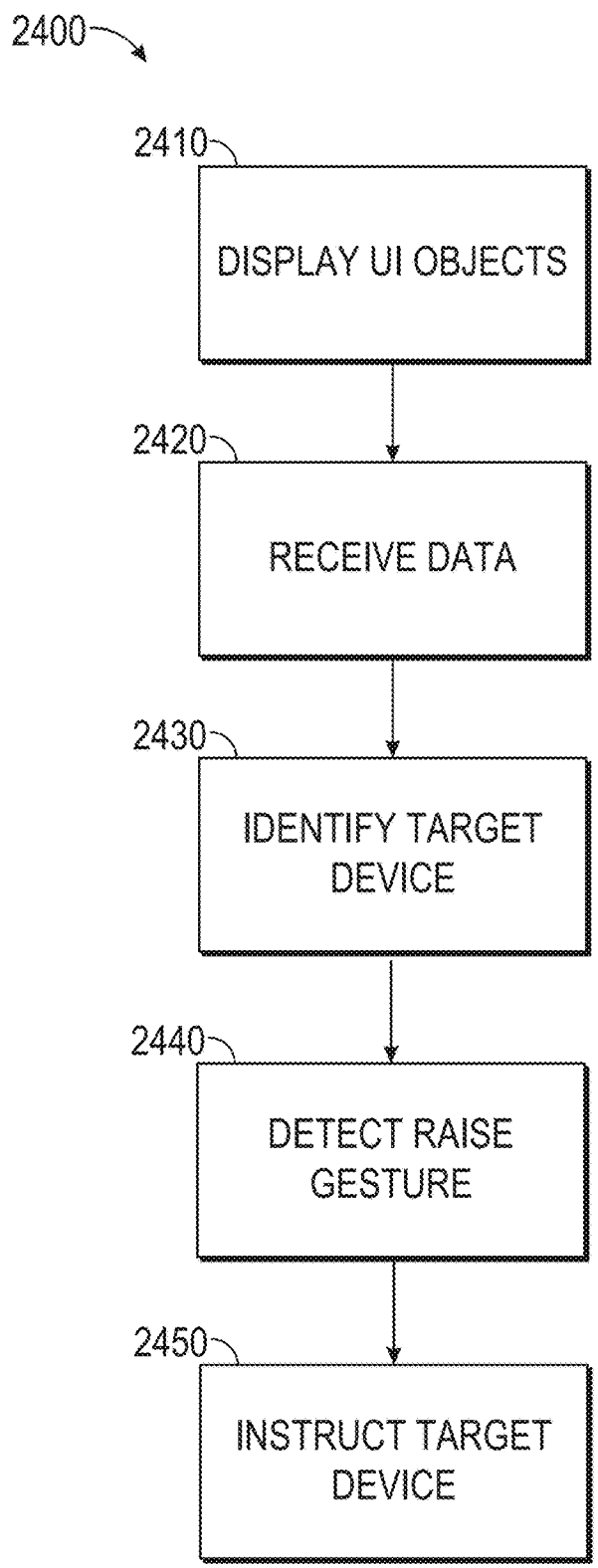
FIG. 24 illustrates an exemplary process for remotely controlling a target electronic device.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1500-1850 (FIGS. 15A-18B) and process 2400 (FIG. 24). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.5, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6:
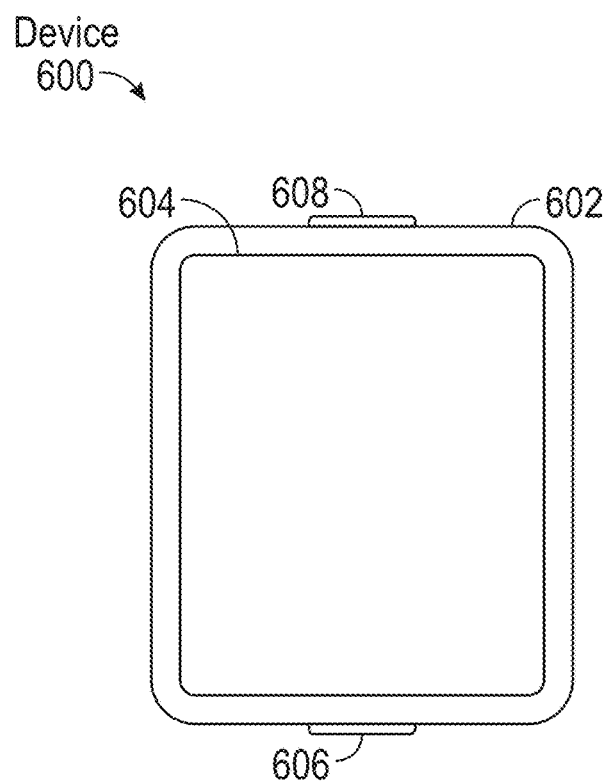
FIG. 6 illustrates an exemplary personal electronic device.

FIG. 6 illustrates exemplary personal electronic device 600 (hereafter device 600) that can have a remote control software application that permits electronic device 600 to remotely control other electronic devices. Device 600 includes body 602. In some examples, device 600 has touch-sensitive display screen (hereafter touchscreen) 604. Touchscreen 604 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like.

Touchscreen 604 can allow a user to perform various functions by touching or hovering near the touch sensor panel. The user may make contact with touchscreen 604 using any suitable object or appendage, such as a stylus, a finger, and so forth. In some examples, device 600 is designed to work primarily with finger-based contacts and gestures, which can be less precise than stylus-based inputs due to the larger area of contact of a finger on the touchscreen. In some examples, the device translates the rough finger-based input into a precise pointer/cursor position or command for performing the actions desired by the user.

Touchscreen 604 can display graphical user interface objects. Examples of such graphical user interface objects include images, video, text, and other graphics. As used here, the term "icon" refers to a graphical user interface object—such as an image—that provides a visual indication of a device feature and optionally, when activated, initiates that feature. Also, as used here, the term "affordance" refers to a graphical user interface object—such as an image—and/or its content—such as text within the image.

In some examples, touchscreen 604 has one or more intensity sensors (not shown) for detecting intensity of contacts being applied. The one or more intensity sensors of touchscreen 604 can provide output data that represents the intensity of contacts. The user interface of device 600 can respond to contacts based on their intensity, meaning that contacts of different intensities can invoke different user interface operations on device 600. As used here, the term "intensity" of a contact on touchscreen 604 refers to the force or pressure (force per unit area) of a contact (e.g., a finger) on the touchscreen.

In some examples, touchscreen 604 does not have the above-described intensity sensors; rather, device 600 uses a substitute (proxy) for the force or pressure of a contact on touchscreen 604. In these examples, the size of the contact area detected on the touchscreen 604 and/or changes thereto, the capacitance of the touchscreen 604 proximate to the contact and/or changes thereto, and/or the resistance of the touchscreen 604 proximate to the contact and/or changes thereto can be used as a substitute for the force or pressure of the contact on touchscreen 604. These substitute measurements for contact force or pressure may be used directly to determine whether an intensity threshold has been exceeded (e.g., the intensity threshold is described in units corresponding to the substitute measurements). Alternatively, these substitute measurements for contact force or pressure may be converted to an estimated force or pressure and the estimated force or pressure may then be used to determine whether an intensity threshold has been exceeded (e.g., the intensity threshold is a pressure threshold measured in units of pressure).

In some examples, regardless of whether touchscreen 604 has the above-described intensity sensors, device 600 can optionally communicate with a stylus having a pressure-sensitive tip that detects and provides data regarding the intensity of the stylus's contact on device 600, particularly touchscreen 604.

In some examples, device 600 has one or more input mechanisms 606 and 608. Input mechanisms 606 and 608, if included, can be physical. Examples of physical input mechanisms include push buttons and rotatable mechanisms. In some examples, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth.

1. Remote Control User Interface

Figure 7:
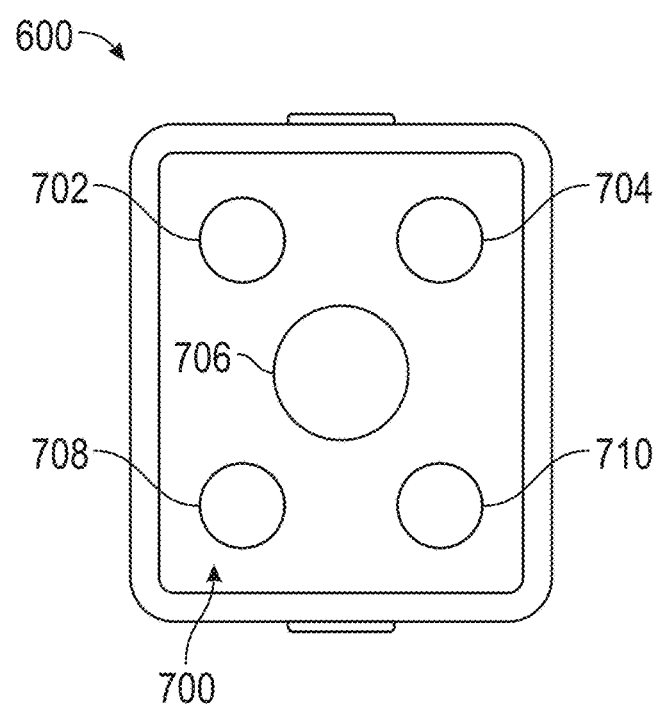
FIG. 7 illustrates an exemplary user interface.

FIG. 7 shows exemplary user interface screen 700 that device 600 can display on touchscreen 604. Screen 700 can be, for example, a home screen that appears when the display of device 600 is powered on, or that appears in response to user input on device 600. Screen 700 has icons 702, 704, 706, 708, and 710. These icons correspond to software applications that are available on device 600. A user can make contact with icons 702, 704, 706, 708, or 710 to launch a corresponding application. Launching an application means causing the application to run in the foreground of device 600 and to appear on touchscreen 604.

Icon 706 corresponds to a remote control application. A remote control application allows a user to remotely control other electronic devices. These other electronic devices can be referred to as target electronic devices. Target electronic devices are capable of being remotely controlled, meaning that they have the requisite hardware and/or software to receive and act on instructions from remote controllers. Some target electronic devices, however, may not always be responsive to remote control even if they are capable. For example, a target electronic device may be configured to receive and process incoming instructions when it is running some software applications but not others. Such a target electronic device may be identified as responsive to remote control when it is executing logic (e.g., a target software application) that has an operation that can be initiated remotely (e.g., from device 600). In some cases, a target electronic device is responsive to remote control when it is executing a relevant target software application in the foreground, but not be responsive to remote control when the target software application is executing in the background. Device 600 may require an external electronic device to be registered with device 600 before it is treated as a target electronic device capable of remote communication. The registration process may be akin to "pairing" processes used in the context of Bluetooth™ communication, WiFi Protected Setup (WPS), operating system device setup, and the like.

In some examples, electronic device 600 may determine responsiveness by listening for network discovery information broadcasted by target electronic devices that are responsive to remote control. In these examples, electronic device 600 expects target electronic devices that are responsive to remote control to send out communication datagrams (e.g., using a service discovery protocol) indicating their presence and responsiveness onto a communication channel (e.g., a network). In some examples, electronic device 600 may determine responsiveness by sending requests onto a communication channel and listening for acknowledgements from target electronic devices that are responsive to remote control. In these examples, electronic device 600 expects target electronic devices that are responsive to remote control to acknowledge requests. Electronic device 600 may broadcast requests and/or target requests to registered electronic devices. In some examples, electronic device 600 may determine responsiveness using a combination of the above-described techniques. For example, electronic device 600 may actively poll for target electronic devices by sending broadcast signals when its battery level is relatively full (e.g., above a threshold), but passively listen for network discovery data from target electronic devices when its battery level is relatively empty (e.g., below a threshold).

Figure 8:
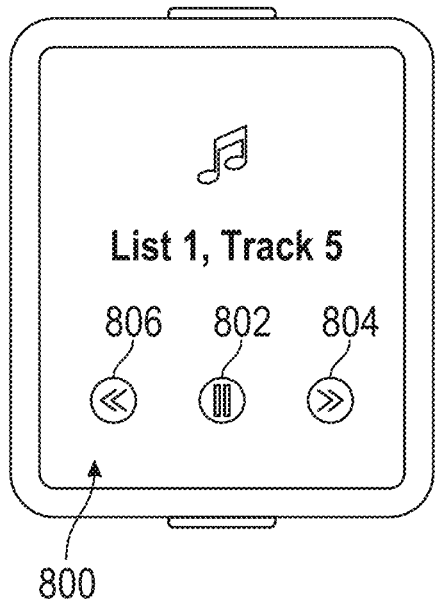
FIG. 8 illustrates an exemplary user interface.

A user may make contact with icon 706 to launch the remote control application. This causes device 600 to display one of several possible graphical user interface screens (e.g. landing screen). In some examples, when a user activates icon 706, device 600 identifies whether there is a registered target electronic device that is currently responsive to remote control. If so, device 600 displays a screen depicting possible operations of the identified target electronic device. One example of a target electronic device that is responsive to remote control is a media player that is currently playing media. FIG. 8 shows an exemplary screen for controlling such a media player. Screen 800 has graphical user interface objects 802, 804, and 806 representing operations on a target electronic device that has been identified as being responsive to remote control. User interface object 802 represents a "pause" operation, object 804 represents a "fast forward" operation, and object 806 represents a "rewind" operation. These operations constitute transport operations. When a user contacts object 802, for example, device 600 sends data representing an instruction to the media player instructing it to pause. Screen 800 may additionally include other objects representing additional transport operations (e.g., "play," "stop," "next," "previous," and so forth). In some examples, user interface object 802 (representing pause) may be replaced with a user interface object representing play after being invoked.

Another example of a target electronic device that is responsive to remote control is a computer that is running a presentation program, such as Microsoft™ PowerPoint or Apple™ KeyNote. In some examples, the remote control application prioritizes the display of remote controls for presentation programs. Restated, if two target devices are responsive to remote control, and one of the two target devices is running a presentation program, the remote control application may land on remote controls for the presentation program upon launch.

Device 600 can display other landing screens. When a user activates icon 706 (FIG. 7), device 600 may be unable to identify any registered target electronic device that is currently responsive to remote control. In some examples, when this occurs, device 600 may display a screen that corresponds to the last target electronic device that was remotely controlled using device 600, even if that target electronic device is not currently responsive. In other examples, when this occurs, device 600 may display a screen that corresponds to the last media playback device that was remotely controlled using device 600, even if that target media device is not currently responsive.

Figure 9:
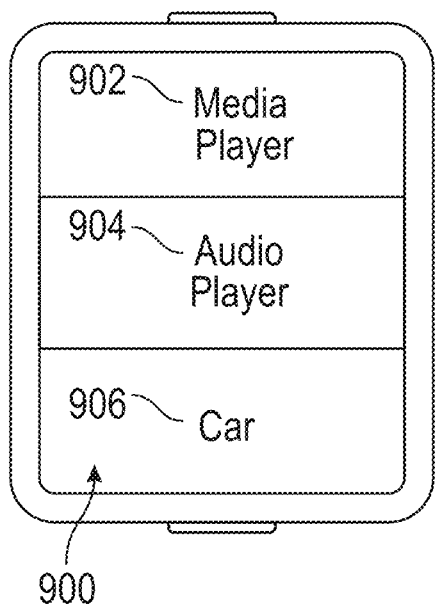
FIG. 9 illustrates an exemplary user interface.

In yet other examples, when this occurs, device 600 may display a graphical user interface screen permitting a user's selection of a target electronic device (from a list of devices) to control remotely. FIG. 9 shows an example of such a screen. Screen 900 has graphical user interface objects 402, 404, and 406. These graphical user interface objects correspond to electronic devices that are capable of being remotely controlled and have been registered with device 600. Object 902 is related to a set-top media playback device, object 904 is related to an audio player, and object 906 is related to an automobile. A user can activate one of these objects to view the remotely controllable operations of the corresponding target electronic device. For example, a user can make contact with object 904 to view transport operations for the corresponding audio player. When a user contacts object 904, device 600 may display screen 800 (FIG. 8), in some examples.

Device 600 can display still other landing screens. In some examples, when a user activates icon 706 (FIG. 7) and device 600 determines that no registered target electronic device is currently responsive to remote control, then device 600 may display a screen for registering target electronic devices (instead of screen 900 as shown in FIG. 9). The possibility of this alternate behavior means that device 600 can respond differently when it is (i) unable to detect a responsive electronic device, as opposed to when it (ii) detects affirmatively that nearby registered electronic devices exist but are not responding to remote control instructions. More specifically, device can display screen 900 (FIG. 9) when (i) occurs but display a device registration screen when (ii) occurs. This distinction is especially relevant if target electronic devices can execute multiple software applications. Such target electronic devices may be responsive to remote control when certain applications are running, but be unresponsive to remote control at other times. Device 600 can thus react accordingly, meaning that in some examples device 600 avoids asking a user to register additional target electronic devices simply because his registered target electronic devices are momentarily unresponsive to remote control.

Figure 10:
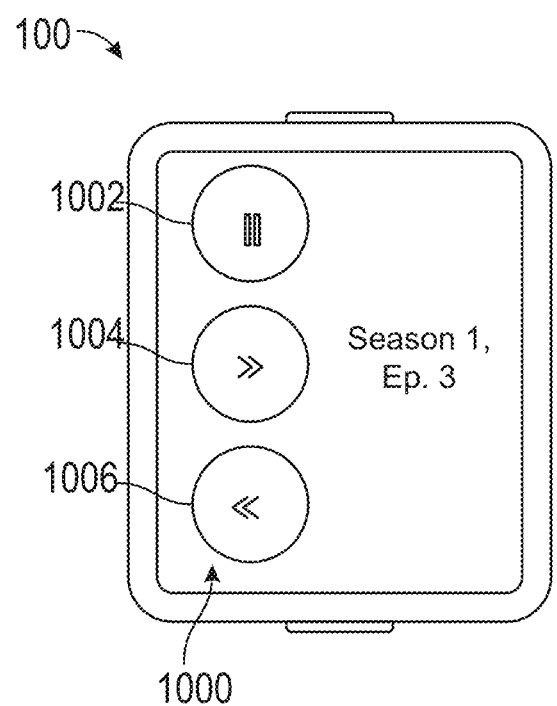
FIG. 10 illustrates an exemplary user interface.

Returning to FIG. 9, a user may make contact with graphical user interface object 902 to see operations of the corresponding media player that can be controlled remotely. FIG. 10 depicts graphical user interface screen 1000 showing the remote-controllable operations of the media player. The relevant media player may be a set-top media device or other device. Screen 1000 includes graphical user interface objects 1002, 1004, and 1006 representing transport operations. A user may contact object 504, for example, to fast-forward into the media playback. Screen 1000 also includes text (e.g., affordances) identifying the media being played.

As can be seen from the exemplary user interfaces screens of 800 (FIG. 8) and 1000 (FIG. 10), device 600 can share graphical user interface objects between different screens of its remote control application. In some examples, the sharing of graphical user interface objects refers to the re-use of graphical user interface objects to cause the same effect among different user interface screens of target electronic devices. That is, graphical user interface objects 802 (FIG. 8) and 1002 (FIG. 10) are shared in that they have the same visual appearance and the same effect of pausing playback on different electronic devices. In some examples, the sharing of remote control components refers to the ability of one graphical user interface object to concurrently cause the same effect across multiple target electronic devices. That is, graphical user interface object 1002 can have the effect of pausing playback on multiple set-top devices that are registered with device 600 in response to a single user contact, such as multiple living room cable boxes.

Figure 11:
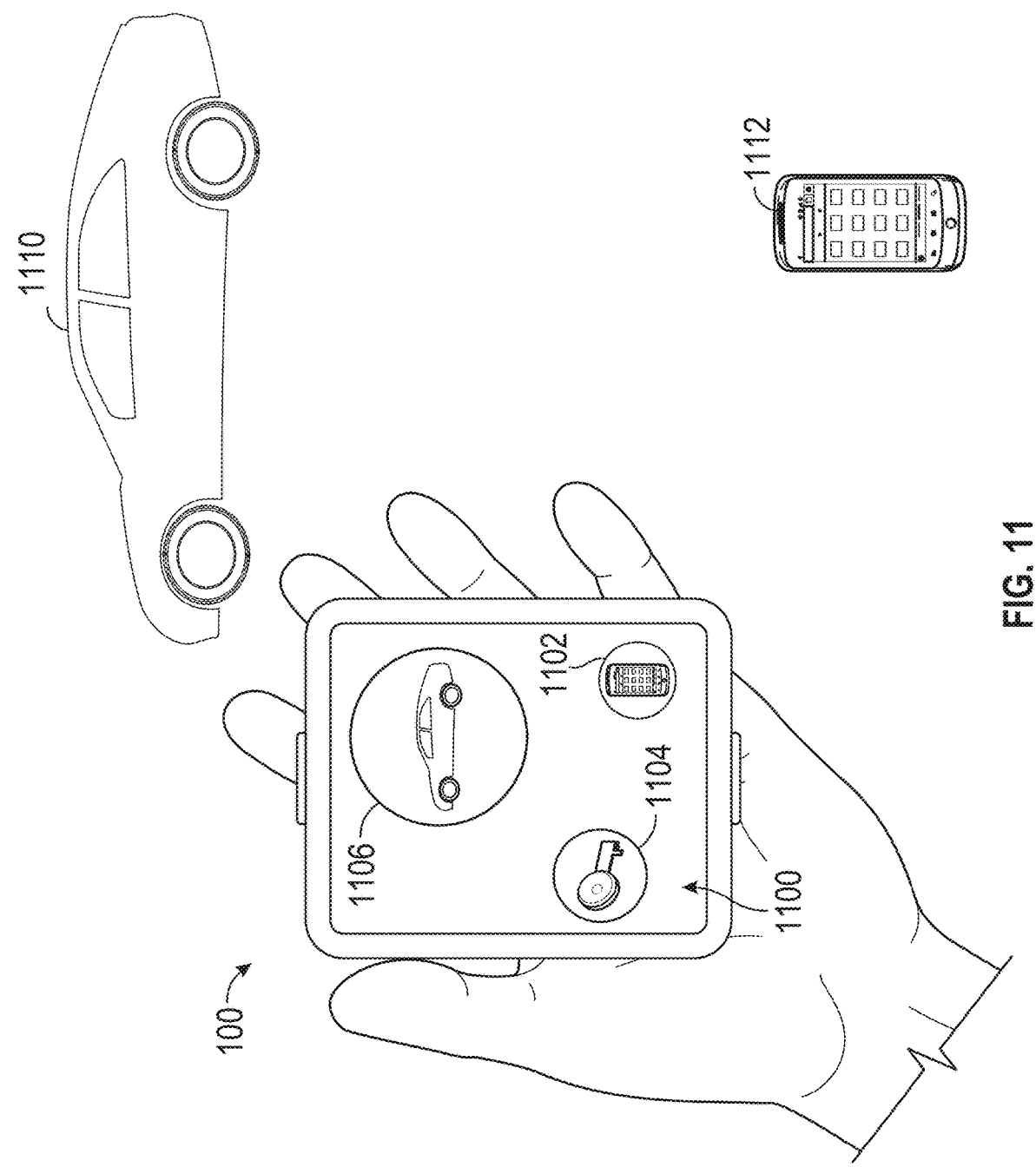
FIG. 11 illustrates an exemplary user interface.

Device 600 can display yet still other landing screens. In some examples, when a user activates icon 706 (FIG. 7), device 600 may determine the positioning of nearby target electronic devices. Device 600 may then display graphical representations of nearby target electronic devices based on their relative positions and/or proximities. For example, device 600 may determine that a first target electronic device is in front of the user and a second target electronic device is to the left of the user. In this situation, device 600 may display a first icon representing the first target electronic device near the top of touchscreen 604 and a second icon representing the second target electronic device near the left of touchscreen 604. FIG. 11 illustrates exemplary graphical user interface screen 1100 in which graphical user interface objects representing different target electronic devices are positioned and sized on-screen according to their positions and proximities with respect to device 600.

As background, car 1110, cellular phone 1112, and door entry system 1114 are nearby and are positioned to the north, east, and west of device 600, respectively. Car 1110 is physically closest to device 600 while cellular phone 1112 is farthest away. In view of these positions and proximities, device 600 displays screen 1100 having graphical user interface object 1106 (representing car 1110) near the top edge of touchscreen 1104, object 1102 (representing cellular phone 1112) near the right edge, and object 1104 (representing door entry system 1114) near the left edge. In other words, in some examples, the on-screen position of a graphical user interface object corresponds to the relative position of its corresponding target electronic device with respect to device 600. Device 600 also displays object 1106 in larger size as compared with icon 1102. In some examples, the on-screen size of a graphical user interface object is inversely proportional to the distance between device 600 and its corresponding target electronic device.

Note, while distance can be measured using physical units, in some examples, distance between devices may be approximated based on meta-data such as network access delays and GPS location information, for example.

Figure 12:
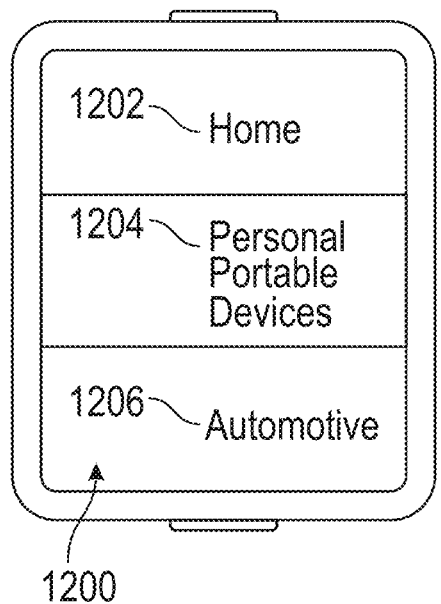
FIG. 12 illustrates an exemplary user interface.

Device 600 can display yet still other landing screens. In some examples, when a user activates icon 706 (FIG. 7), device 600 groups target electronic devices into categories and display a listing of device categories. This grouping is useful when the number of registered target electronic devices exceeds that which can be usefully displayed on touchscreen 604. In some examples, this limit is based on a predetermined numeric threshold. In some examples, particularly where touch input is used, graphical user interface objects that are smaller than the tip of the average human index finger are considered not useful for touch input. FIG. 12 shows exemplary graphical user interface screen 1200. Screen 1200 has graphical user interface objects 1202, 1204, and 1206 indicating the categories of "home," "personal portable devices," and "automotive," respectively. A user may make contact with object 1202 to view a more detailed listing of target electronic devices related to home automation, such as media playback devices, door entry devices, lighting devices, and so forth. A user may contact object 1204 to view a more detailed listing of target electronic devices such as portable music players and cellular phones, for example. A user may contact object 1206 to view a more detailed listing of target electronic devices related to in-car telematics systems.

Figure 13:
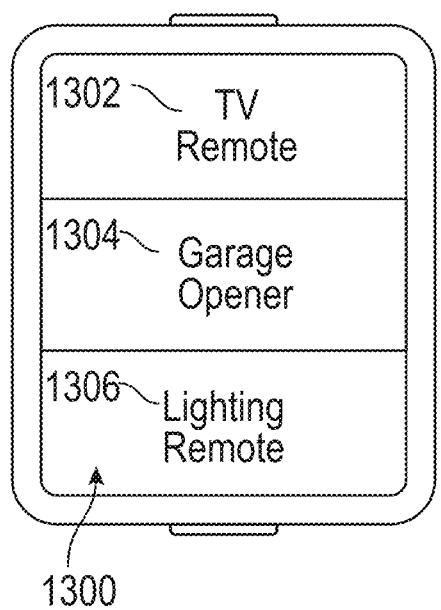
FIG. 13 illustrates an exemplary user interface.

Turning to FIG. 13, in response to activation of graphical user interface object 1202 (FIG. 12), device 600 displays graphical user interface screen 1300. Screen 1300 includes user interface objects 1302, 1304, and 1306 corresponding to target electronic devices in the Home category: User interface object 1302 corresponds to a television remote control, user interface object 1304 corresponds to a garage door opener, and user interface object 1306 corresponds to a remote lighting controller. A user may activate user interface object 1302, 1304, or 1306 to launch remote control screens for these target electronic devices.

In some examples, device 600 may be able to detect motion that represents a raise gesture. For example, if device 600 is a wearable device configured to be worn on a user's arm, the device may be able to detect when the user has raised his arm. When a raise gesture is detected, device 600 may send an instruction that instructs a target electronic device to perform an operation, or to stop the performance of an operation. For example, device 600 may instruct a media playback device to stop (or pause) playback when a user raises the device. Techniques for determining raising gestures such as wrist raises are described in, e.g., U.S. Provisional Patent Application Ser. No. 62/026,532, "Raise Gesture Detection in a Device," filed Jul. 18, 2014, the content of which is hereby incorporated by reference. In addition, device 600 may display user interface object representing additional controls (e.g., transport controls) for the target electronic device.

Figure 22A:
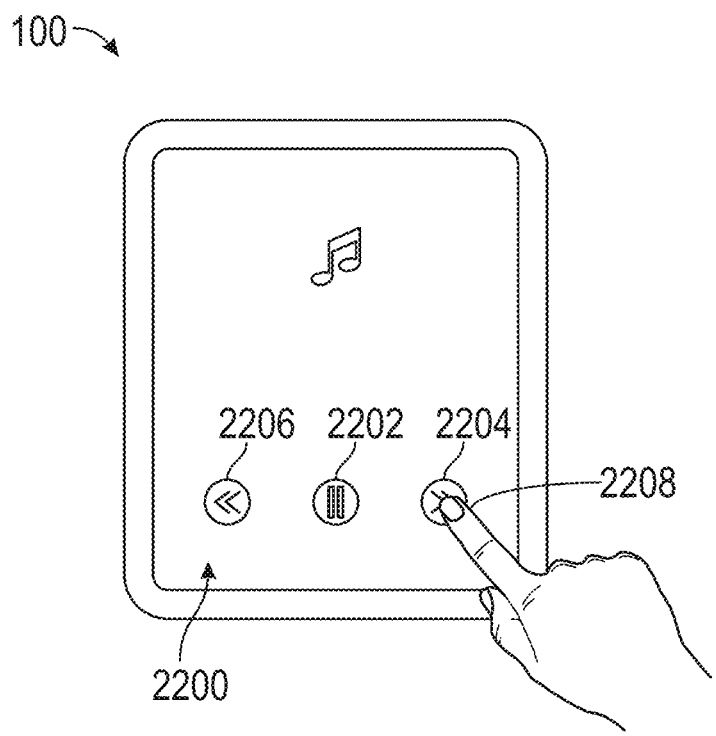
FIG. 22A illustrates an exemplary user interface.
Figure 22B:
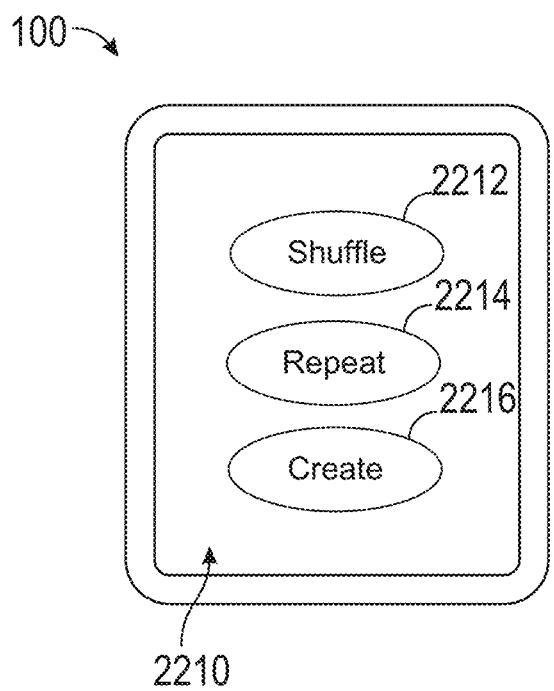
FIG. 22B illustrates an exemplary user interface.

Device 600 can display user interface screen based on the intensity of contacts being applied to touchscreen 604 (FIG. 6). Specifically, device 600 can respond differently when a user contacts touchscreen 604 of device 600 with a greater intensity than what is normally needed to activate a graphical user interface object. This aspect is described with reference to FIGS. 22A-B. As shown in FIG. 22A, device 600 may display user interface screen 2200. Screen 2200 may be screen 800 (FIG. 8) for remotely controlling a target electronic device, in this instance an audio player. A user may activate (e.g., tap) a displayed icon to invoke a corresponding transport control of the target audio player. In some examples, if the intensity of the user's contact (e.g., tap 2208) on icon 2204 (or more generally touchscreen 604) exceeds a threshold intensity, device 600 may, instead of invoking a corresponding remote operation of the target electronic device, replace the display of screen 2200 with a graphical user interface screen 2210 showing alternate features of the target electronic device. For example, as shown in FIG. 22B, screen 2210 include shuffling playback icon 2212, repeating playback icon 2214, and/or playlist and/or station icon 2216. These features constitute alternate features. More generally, the term "alternate features" refers to features different from those features otherwise displayed on device 600 had the intensity of contact 2208 been below the threshold intensity (e.g., features corresponding to screen 2200).

2. Registering Electronic Devices

As discussed above, device 600 may require registration of an electronic device before allowing remote control of the electronic device. When this is the case, device 600 provides graphical user interface screens for registering target electronic devices. In some examples, device 600 proactively displays the necessary registration screens under some usage conditions, as discussed above.

Figure 21A:
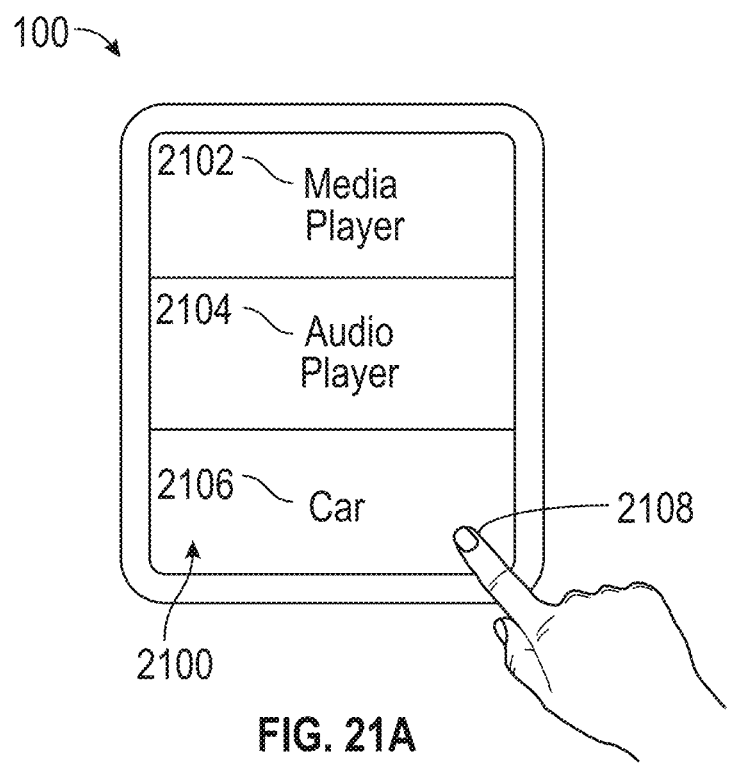
FIG. 21A illustrates an exemplary user interface.
Figure 21B:
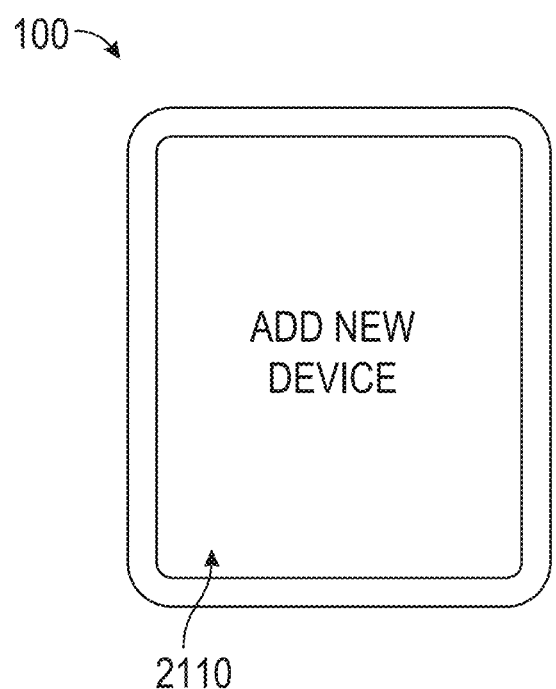
FIG. 21B illustrates an exemplary user interface.

In some examples, device 600 reactively displays the necessary registration screens when a user contacts touchscreen 604 of device 600 with a greater intensity than what is normally needed to activate a graphical user interface object. When the intensity sensors of device 600 detect a contact that has a maximum intensity that is greater than a threshold intensity, device 600 can display graphical user interface screens for registering electronic devices as target electronic devices. This aspect is described with reference to FIGS. 21A-B. In FIG. 21A, device 600 is displaying user interface screen 2100 which may be screen 900 (FIG. 9) for selecting a target electronic device to remote control. A user may activate (e.g., tap) on a displayed graphical user interface object to select a corresponding electronic device that is to be remotely controlled. In some examples, if the intensity of the user's contact (e.g., tap 2108) on icon 2106 (or more generally touchscreen 604) exceeds a threshold intensity, device 600 may, instead of displaying remote controls for the corresponding electronic device, replace the display of screen 2100 with graphical user interface screen 2110. Screen 2110, as shown, provides an alternate feature of registering new target electronic devices.

Device 600 may limit what electronic devices can be registered as target electronic devices. In some examples, device 600 registers only nearby electronic devices. Device 600 may consider an electronic device to be "nearby" if the two are within the communication range of a short-range wireless communication protocol such as Bluetooth™ (whether classic or low energy), near-field communication, ZigBee™, and the like. Also, device 600 may consider an electronic device to be "nearby" if the two are within communication range of a local area network such as IEEE 802.11 network. Also, device 600 considers an electronic device to be "nearby" if the two are within communication range of a wide area network such as a cellular network, a cellular data network, or a wide area network (e.g., internet). Also, device 600 may consider network response times between itself and a target electronic device in determining whether the target electronic device is nearby. Also, device 600 may consider additional meta-data, such as GPS location information, in determining whether a target electronic device is nearby.

In some examples, in response to a user contact at a maximum intensity that is greater than the predetermined threshold intensity, device 600 displays a user interface for viewing and changing configuration settings associated with the remote control application.

3. Progressive Disclosure

Figure 14A:
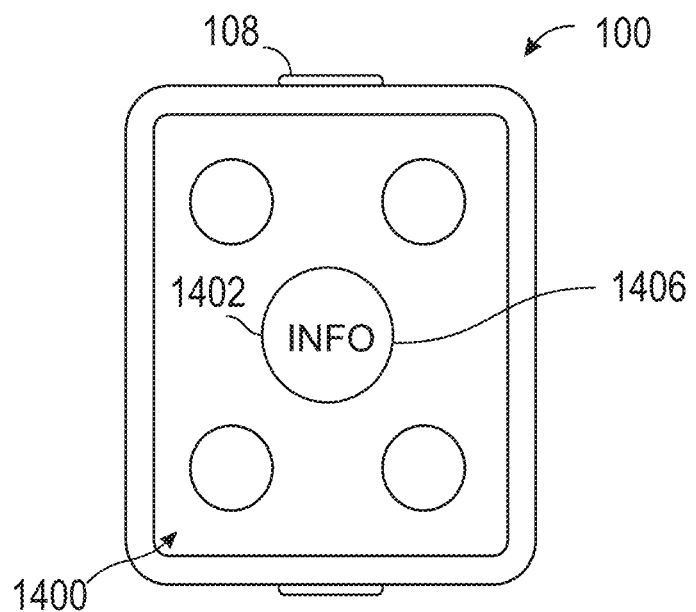
FIG. 14A illustrates an exemplary user interface.
Figure 14B:
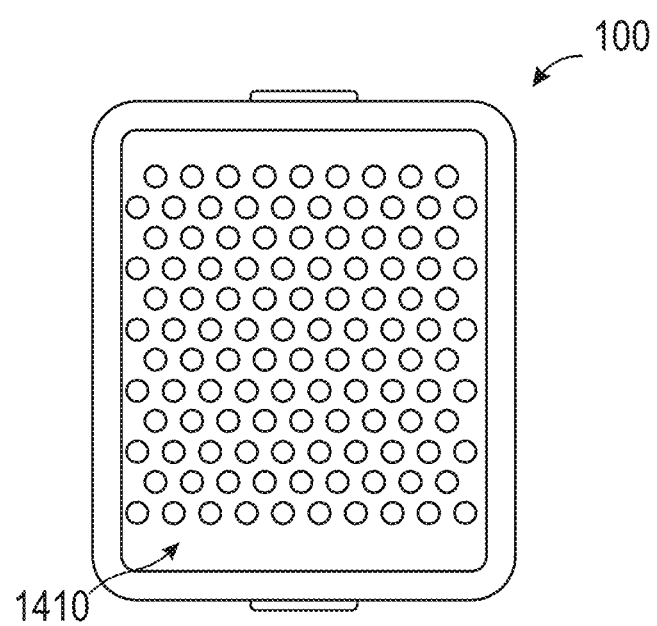
FIG. 14B illustrates an exemplary user interface.

FIG. 14A shows graphical user interface screen 1400, which can be an alternative to screen 700 (FIG. 7) in some examples. As shown, screen 1400 includes graphical user interface object 1402 corresponding to a remote control application. Screen 1400 also includes affordance 1406 indicating additional information related to the remote control application. Affordance 1406 may appear inside graphical user interface object 1402 (as shown), or may appear outside but adjacent to graphical user interface object 1402 (not shown). Exemplary affordances can show, for example, (i) whether at least one registered electronic device is responsive to remote control; (ii) the types and/or number of registered electronic devices responsive to remote control; (iii) the types and/or number of electronic devices capable of remote control; (iv) the types and/or number of electronic devices capable of remote control and available for registration with device 600; and/or (iv) the types and/or number of electronic devices registered with device 600. These affordances can range from a simple visual indicator (such as an image) to rows of text (such as scrolling/marquee text).

Affordance 1402 need not always be displayed. As demonstrated by FIG. 14B, in some examples, affordance 1402 disappears when graphical user interface object 1406 is reduced in size. Object 1406 may become reduced in size when a user zooms-out from screen 1400 using one or more of the input mechanisms of device 600, for example. Suitable input mechanisms may include one or more of the touchscreen(s), button(s) and rotatable mechanism described above. Restated, affordance 1402 may be displayed in one graphical user interface screen at one zoom level (e.g., screen 1400) but not on another screen at another zoom level (e.g., screen 1410).

4. Processes for Remotely Controlling a Target Electronic Device

Figure 15A:
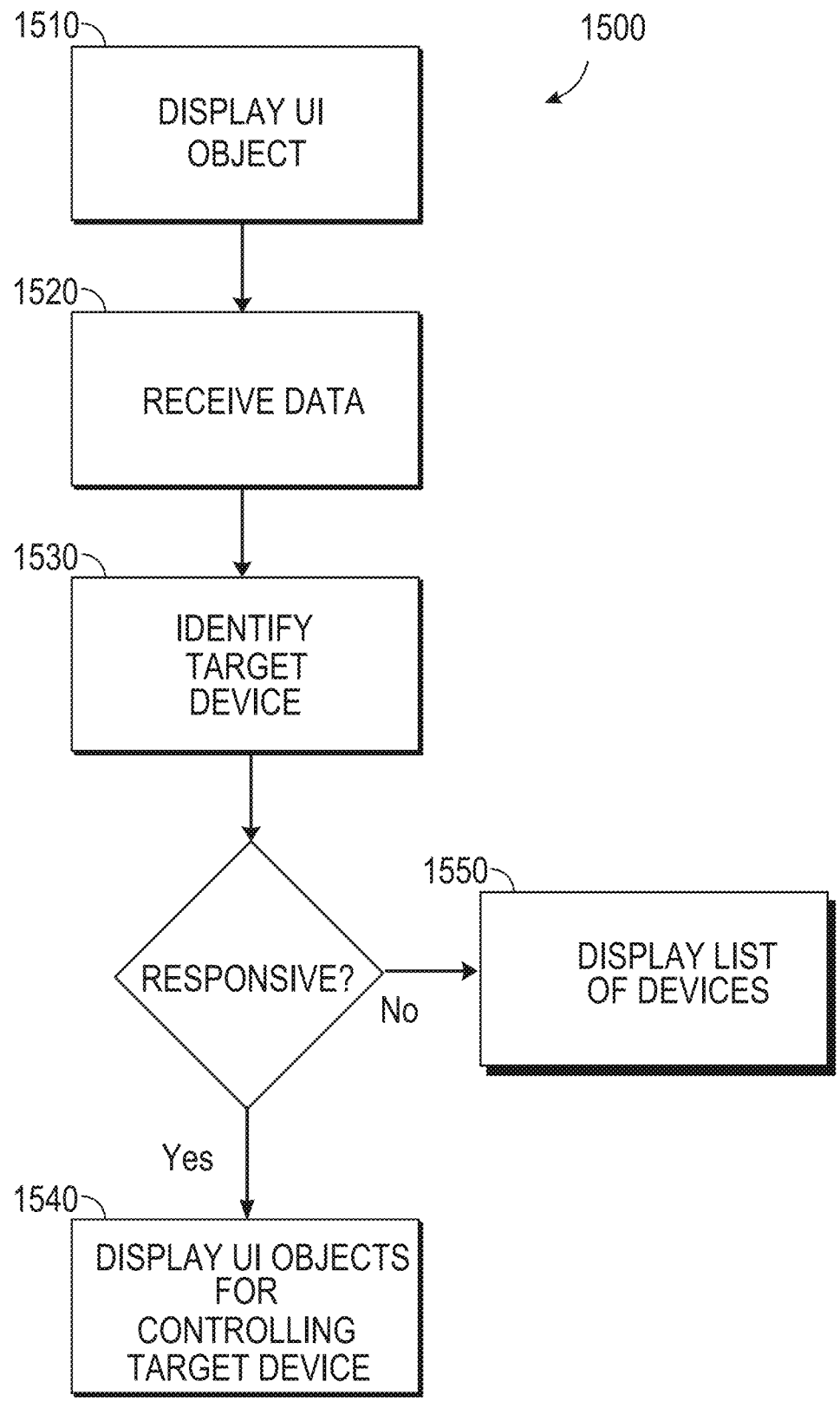
FIG. 15A illustrates an exemplary process for remotely controlling a target electronic device.

FIG. 15A depicts exemplary process 1500 that device 600 can perform to control a target electronic device. At block 1510, a graphical user interface object is displayed on a touchscreen. The graphical user interface object represents a remote control application for remotely controlling a target electronic device. At block 1520, data representing a contact input such as a finger tap is obtained. A determination is made that the contact occurred on the user interface object representing the remote control application. In response to the determination that the received data represents a relevant contact, at block 1530, an electronic device that can be remotely controlled is identified. The identified target electronic device may have been registered on device 600. If the identified target electronic device is determined to be presently responsive to remote control, processing proceeds to block 1540, where graphical user interface objects for controlling the identified target electronic device are displayed. The displayed graphical user interface objects may depend on the operations supported by the identified target electronic device. If no target electronic device is identified, processing proceeds to block 1550, where graphical user interface objects for manually selecting a target electronic device for remote control are displayed.

Figure 15B:
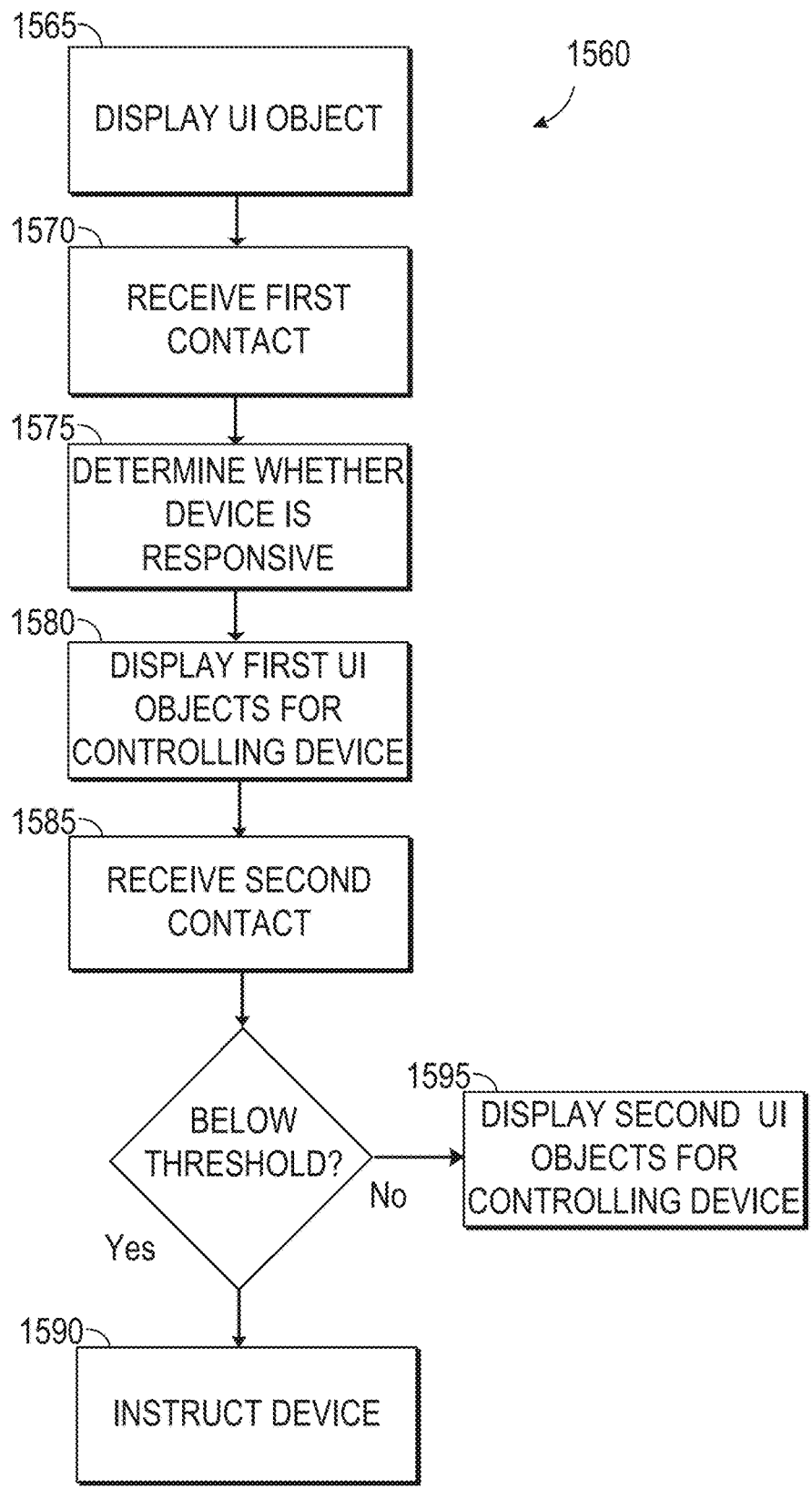
FIG. 15B illustrates an exemplary process for remotely controlling a target electronic device.

FIG. 15B depicts exemplary process 1560 that device 600 can perform to control a target electronic device. At block 1565, a graphical user interface object is displayed on a touchscreen. The graphical user interface object includes a plurality of icons including an icon that represents a remote control application for remotely controlling a target electronic device. At block 1570, a first contact on a touch-sensitive display is received at the location of the icon. At block 1575, a determination is made as to whether a target device out of a plurality of target devices is responsive to remote control. In response to the first contact and a determination that the target device is responsive to remote control, at block 1580, a first plurality of remote controls for the target device is displayed. At block 1585, while displaying the first plurality of remote controls, a second contact on the touch-sensitive display is received. The second contact has a maximum intensity in some examples. At block 1590, in response to the second contact and a determination that the maximum intensity is below a threshold intensity, the target device is instructions to perform an operation. At block 1595, in response to the second contact and a determination that the maximum intensity is above the threshold intensity, a second plurality of remote controls for the first target device is displayed.

The identified target electronic device may have been registered on device 600. If the identified target electronic device is determined to be presently responsive to remote control, processing proceeds to block 1540, where graphical user interface objects for controlling the identified target electronic device are displayed. The displayed graphical user interface objects may depend on the operations supported by the identified target electronic device. If no target electronic device is identified, processing proceeds to block 1550, where graphical user interface objects for manually selecting a target electronic device for remote control are displayed.

Figure 16:
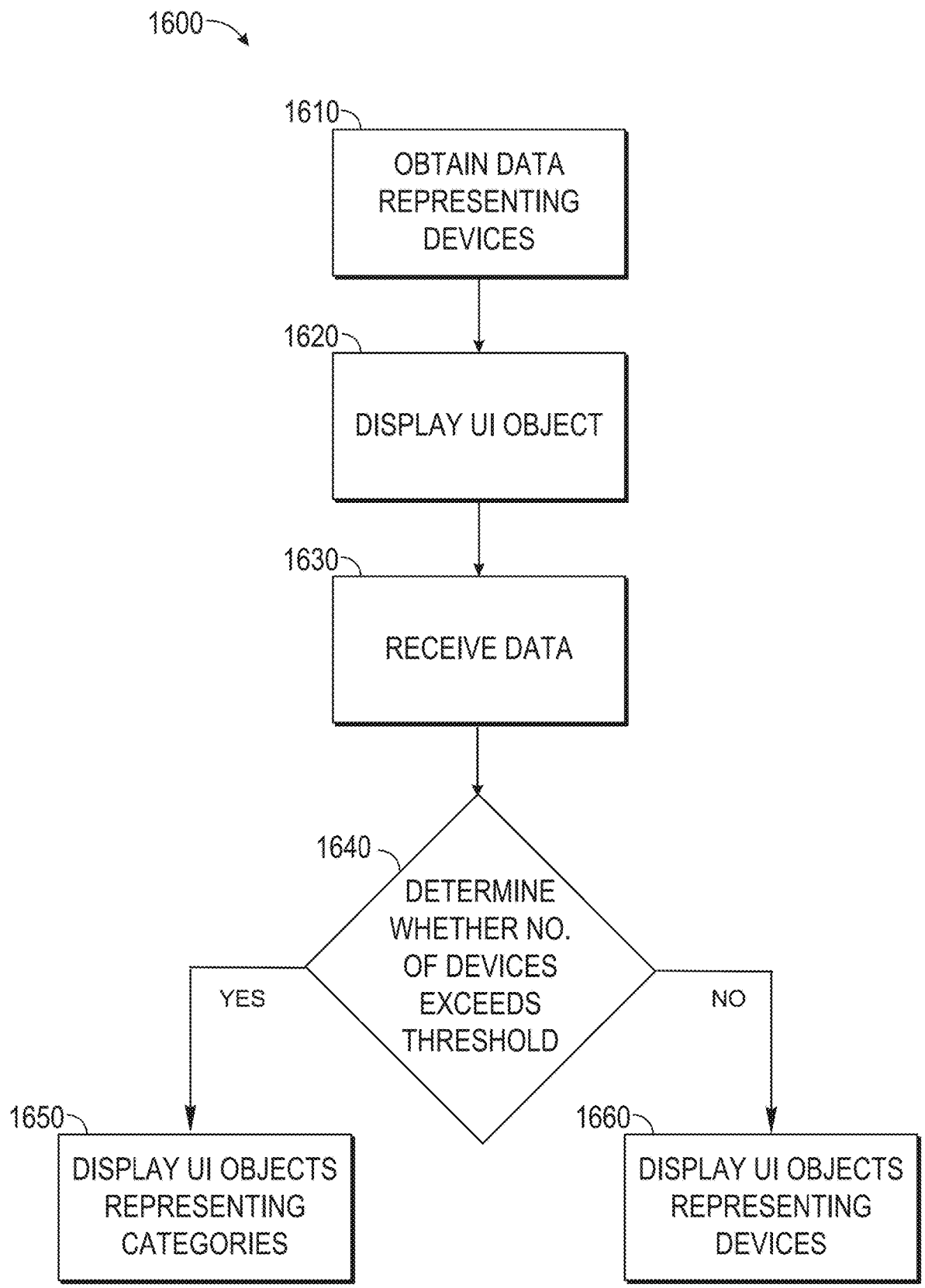
FIG. 16 illustrates an exemplary process for remotely controlling a target electronic device.

FIG. 16 depicts exemplary process 1600 that device 600 can perform to control a target electronic device. At block 1610, information representing multiple target electronic devices is obtained. The obtained information may be used to identify target electronic devices that are responsive to remote control. At block 1620, a user interface object is displayed on touchscreen 604. The user interface object may represent a remote control application for remotely controlling a target electronic device. At block 1630, data representing a contact, such as a finger tap, on the user interface object is received. At block 1640, a determination is made as to whether the number of target electronic devices that may be remotely controlled exceeds a threshold. This determination may be based on the information obtained at block 1610. If the number of devices is determined to exceed the threshold, then processing proceeds to block 1650 where graphical user interface objects representing categories of target electronic devices are displayed. If the number of devices is determined not to exceed the threshold, then processing proceeds to block 1660 where graphical user interface objects representing target electronic devices are displayed.

Figure 17:
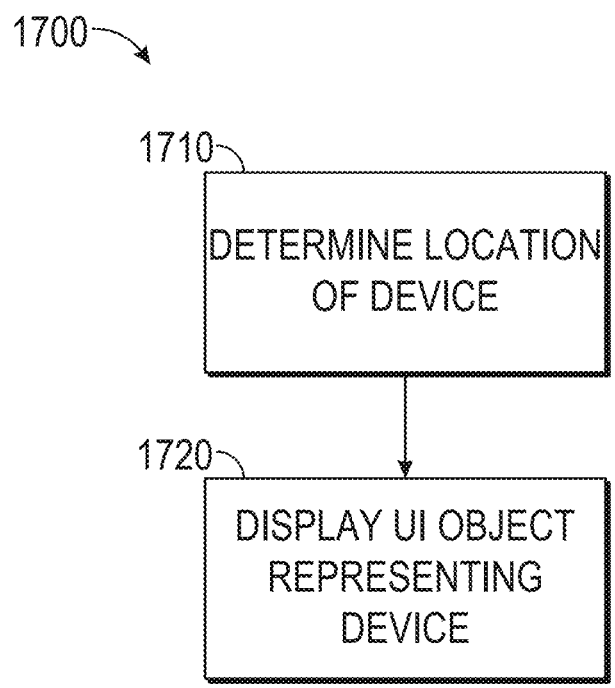
FIG. 17 illustrates an exemplary process for remotely controlling a target electronic device.

FIG. 17 depicts exemplary process 1700 that device 600 can perform to identify target electronic devices for remote control. At block 1710, the location of a target electronic device is determined. The location of the target electronic device relative to device 600 may be determined by obtaining network and/or location information from the target electronic devices, for example. At block 1720, a user interface object representing the target electronic device is displayed on touchscreen 604. The user interface object may be displayed at a location on touchscreen 604 that illustrates the location of the target electronic device relative to device 600, as discussed above with respect to FIG. 6.

Figure 18A:
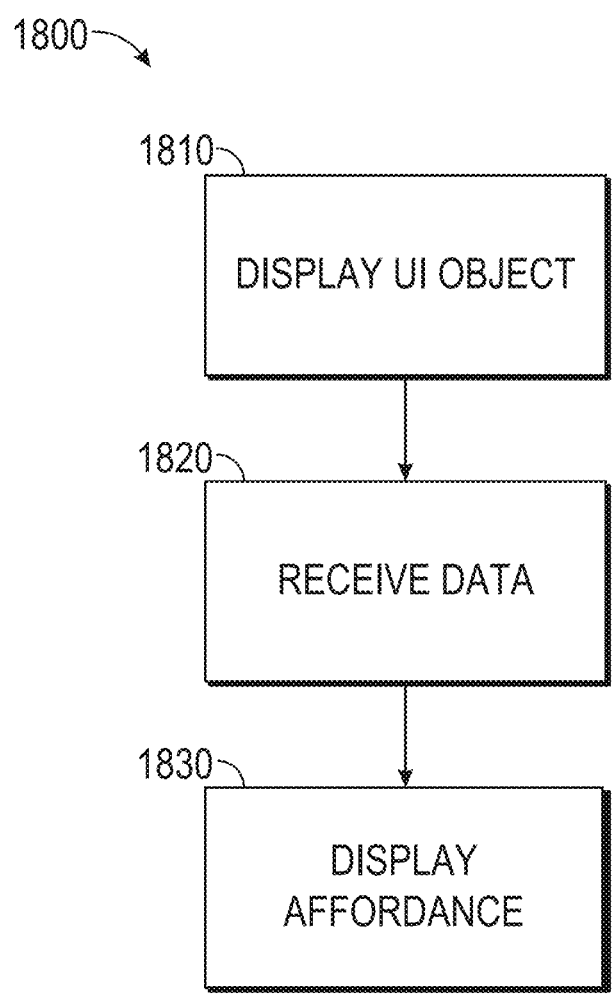
FIG. 18A illustrates an exemplary process for remotely controlling a target electronic device.

FIG. 18A depicts exemplary process 1800 that device 600 can perform to indicate whether target electronic device are available for remote control. At block 1810, a relative larger number (as compared with block 1830) of graphical user interface objects are displayed on touchscreen 604. The displayed graphical user interface objects include an object representing a remote control application. At block 1820, data representing a user input is obtained form an input device of device 600. A determination is made that the received data represents a zoom-in operation. In response to the determination that the received data represents a zoom-in operation, at block 1830, a reduced number (as compared with block 1810) of graphical user interface objects are displayed on touchscreen 604. The displayed graphical user interface objects still include the object representing the remote control application being displayed in a relatively larger size (as compared with block 1810). Additionally, the object representing the remote control application includes an additional affordance. The additional affordance may indicate, for example: (i) whether at least one registered electronic device is responsive to remote control; (ii) the types and/or number of registered electronic devices responsive to remote control; (iii) the types and/or number of electronic devices capable of remote control; (iv) the types and/or number of electronic devices capable of remote control and available for registration with device 600; and/or (iv) the types and/or number of electronic devices registered with device 600.

Figure 18B:
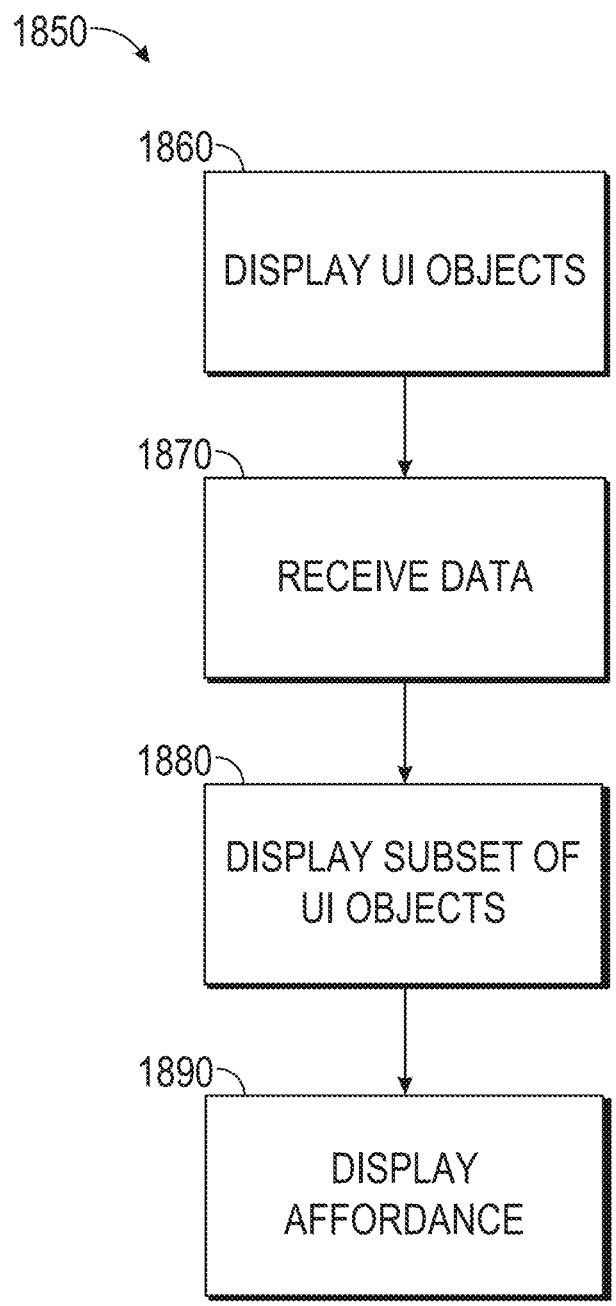
FIG. 18B illustrates an exemplary process for remotely controlling a target electronic device.

FIG. 18B depicts exemplary process 1850 that device 600 can perform to indicate whether target electronic device are available for remote control. At block 1860, a relative larger number (for example, as compared with block 1880) of graphical user interface objects are displayed on touchscreen 604. The displayed graphical user interface objects include an object (e.g., icon) representing a remote control application. At block 1870, data representing a first movement of a rotatable input device is received. In response to the receiving the data representing the first movement, at block 1880, a reduced number (as compared with block 1860) of graphical user interface objects are displayed on touchscreen 604. The displayed graphical user interface objects still include the object representing the remote control application being displayed in a relatively larger size (as compared with block 1860). At block 1890, an additional affordance is displayed. The additional affordance may indicate, for example: (i) whether at least one nearby electronic device is responsive to remote control; (ii) the types and/or number of nearby electronic devices responsive to remote control; (iii) the types and/or number of electronic devices capable of remote control; (iv) the types and/or number of electronic devices capable of remote control and available for registration with device 600; and/or (iv) the types and/or number of electronic devices registered with device 600.

FIG. 24 depicts exemplary process 2400 that device 600 can perform to control a target device. At block 2410, a plurality of icons representing applications, including an icon representing a remote control application, are displayed. At block 2420, data representing user input is obtained from an input device of device 600. A determination is made that the received data represents a touch at a position of the icon representing the remote control application. At block 2430, a target device that is responsive to remote control is identified from a larger plurality of target devices. At block 2440, a raise gesture is detected based on motion of the electronic device detected by a motion sensor. At block 2450, in response to detecting the raise gesture, an instruction is sent to the target device instructing the target device to perform an operation.

In some examples, the instruction is an instruction to stop (or pause) an operation on the target device. For example, device 600 may instruct a media player to stop (or pause) playback in response to a raise gesture. In some examples, blocks 2430-2450 are performed only if blocks 2410-2420 are performed, meaning that an electronic device would send remote control instructions only the user has launched the remote control application by touching a corresponding icon. In some examples, blocks 2430-2450 are performed even if blocks 2410-2420 are not performed, meaning that an electronic device may send remote control instructions based on raise gestures even if the user has not launched the remote control application. Techniques for detecting a raise gesture involving an electronic device may include those described in U.S. Provisional Patent Application Ser. No. 62/026,532, "Raise Gesture Detection in a Device," filed Jul. 18, 2014, the content of which is hereby incorporated by reference.

5. Computing Systems

FIG. 19 depicts exemplary computing system 1900 that, in some examples, supports device 600. Computing system 1900 has bus 1902 that operatively couples I/O section 1904 with one or more computer processors 1906 and memory 1908. I/O section 1904 can be connected to display 1910, which can have touch-sensitive component 1912 and, optionally, touch-intensity sensitive component 1930. In addition, I/O section 1904 can be connected with communication unit 1918 for receiving application and operating system data, using Wi-Fi, Bluetooth™, near field communication ("NFC"), cellular and/or other wireless communication techniques. Computing system 1900 can include input mechanisms 1914 and/or 1916. Input mechanism 1914 may be a rotatable input device, for example. Input mechanism 1916 may be a button, for example. Computing system 1900 can include various sensors, such as GPS sensor 1920, accelerometer 1922, directional sensor 1924 (e.g., compass), gyroscope 1926, motion sensor 1928, and/or a combination thereof, all of which can be operatively connected to I/O section 1904.

Memory 1908 of computing system 1900 can be a non-transitory computer readable storage medium, for storing computer-executable instructions, which, when executed by one or more computer processors 1906, for example, can cause the computer processors to perform the remote control techniques described above, including processes 1500-1850 (FIGS. 15A-18B) and process 2400 (FIG. 24). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Computing system 1900 is not limited to the components and configuration of FIG. 19, but can include other or additional components in multiple configurations.

Figure 23:
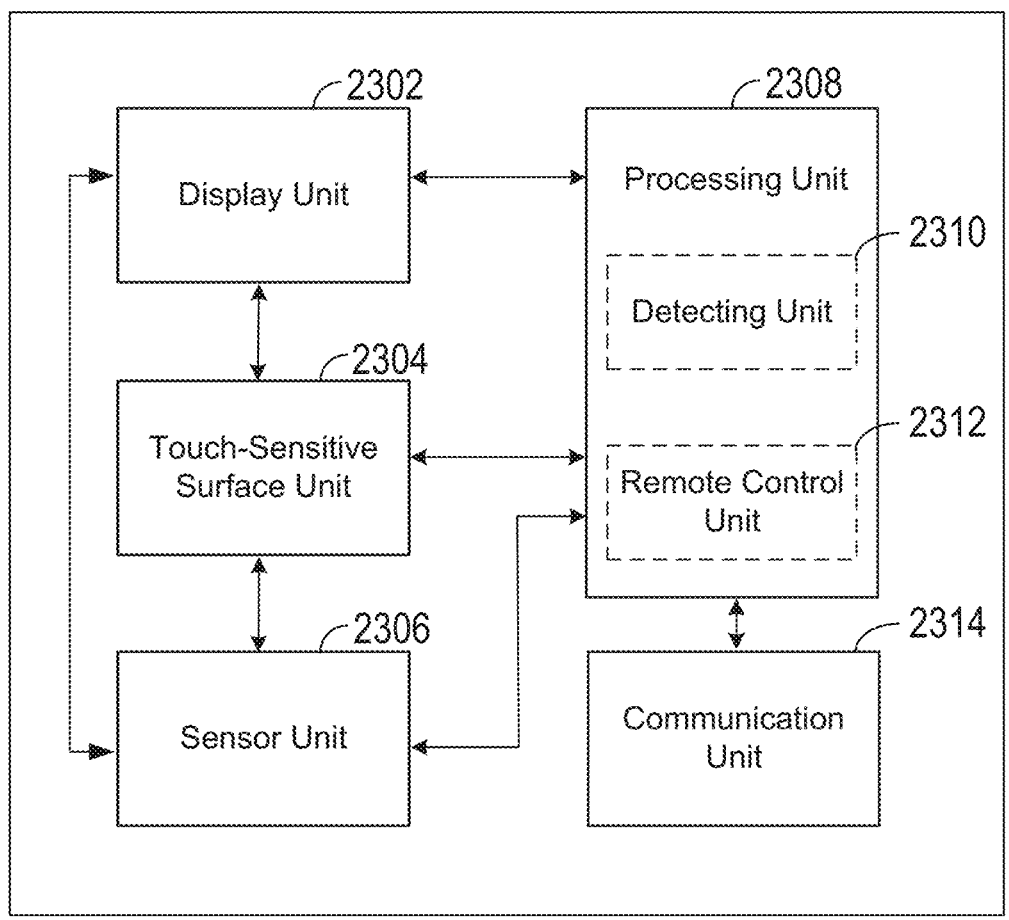
FIG. 23 illustrates exemplary components of an electronic device.

FIG. 23 shows exemplary functional blocks of an electronic device 2300 that, in some examples, perform the features described above. As shown in FIG. 23, an electronic device 2300 includes a display unit 2302 configured to display graphical objects; a touch-sensitive surface unit 2304 configured to receive user gestures; one or more sensor units 2306 configured to detect intensity of contacts with the touch-sensitive surface unit; and a processing unit 2308 coupled to the display unit 23002, the touch-sensitive surface unit 2304, and the sensor units 2306. In some examples, the processing unit includes a detecting unit 2310, a remote control unit 2312, and a communication unit 2314. The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein. In some examples, processing unit 2308 is configured to detect a contact (e.g., with the detecting unit 2310), on the touch-sensitive surface unit 2304 over a graphical user interface object; and in response to detecting the contact, instruct a target electronic device to perform an operation. The instruction may be transmitted using communication unit 2314.

In some examples, processing unit 2308 is configured to detect a contact (e.g., with the detecting unit 2310), on the touch-sensitive surface unit 2304 over a graphical user interface object; and in response to detecting the contact: in accordance with a determination that the contact is below a predefined intensity criteria, perform a first operation (e.g., display a default set of remote control operations) using remote control unit 2312; and in accordance with a determination that the contact is above the predefined intensity criteria, perform a different second operation (e.g., display an alternate set of remote control operations).

In some examples, processing unit 2308 is configured to detect a contact (e.g., with the detecting unit 2310), on the touch-sensitive surface unit 2304 over a graphical user interface object. In addition, communication unit 2314 is configured to detect nearby target electronic devices. In response to detecting the contact and based on information about nearby target electronic device, device 2300 can display on display unit 2302 a plurality of graphical user interface objects representing the nearby target electronic devices. The on-screen location of the graphical user interface units can reflect the relative location of the nearby target electronic devices with respect to device 2300.

6. Remote Control Via Intermediate Device

The availability of components in system 1900, particularly short and long range communication interfaces, may affect the operation of device 600. In some examples, a target electronic device may use a communication protocol not supported by device 600. For example, the target electronic device may support WiFi but not Bluetooth™, while device 600 may support Bluetooth™ but not WiFi. In this situation, device 600 may use an intermediate device that supports both Bluetooth™ and WiFi protocols to communicate with the target electronic device. The intermediate device may be a Bluetooth™ and WiFi-enabled cellular phone, for example.

Figure 20:
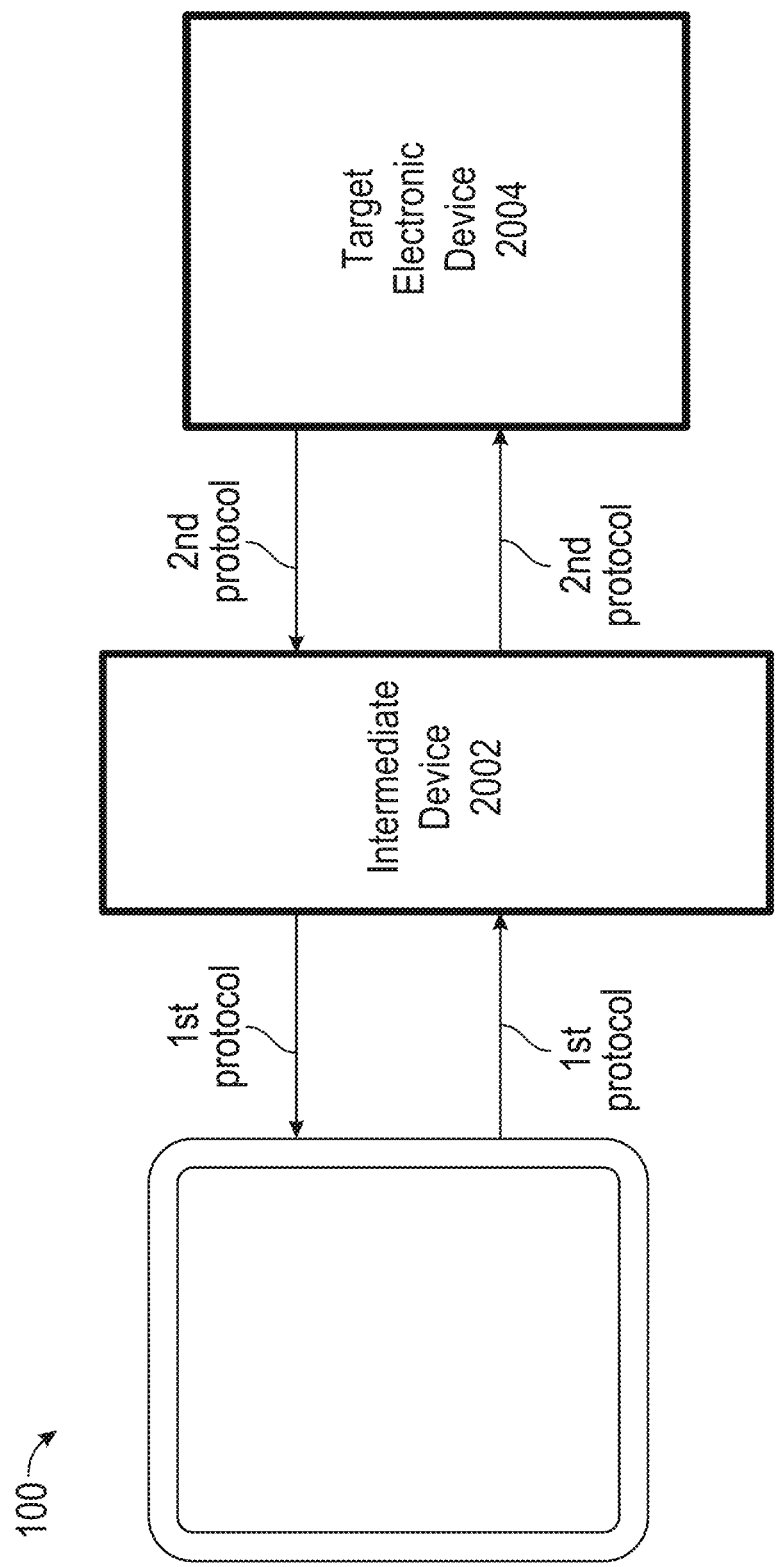
FIG. 20 illustrates an exemplary communication path.

FIG. 20 depicts an exemplary communication path between device 600, intermediate device 2002, and target electronic device 2004. Device 600 communicates with intermediate device 2002 using a first communication protocol that may not be supported by target electronic device 2004, and intermediate device 2002 relays that communication to target electronic device 2004 using a second communication protocol that is supported by target electronic device 2004. The reverse communication path may also be supported, meaning that target electronic device 2004 can communicate with device 600 via intermediate device 2002.

Communications sent to target electronic device 2004 may include instructions that cause the target electronic device to perform an operation. In some examples, intermediate device 2002 relays an instruction from device 600 to target electronic device 2004 verbatim. In some examples, intermediate device 2002 processes an instruction from device 600 and creates a corresponding instruction for transmission to target electronic device 2004. In some examples, intermediate device 2002 modifies an instruction from device 600 and transmits the modified instruction to target electronic device 2004. Note, in some examples, the communication path depicted by FIG. 20 can be utilized even if device 600 and target electronic device 2004 support a common communication protocol. In these examples, the communication path depicted in FIG. 20 may be preferred by device 600 because intermediate device 2002 contains data relevant to the remote control operation. Also, in these examples, the datagrams sent by device 600 to intermediate device 2002 need not be identical to the datagrams sent by intermediate device 2002 to target electronic device 2004, meaning that, in "relaying" an instruction, intermediate device 2002 may create a new instruction datagram for transmission to target electronic device 2004 based on an instruction datagram received from device 600.

Figure 25:
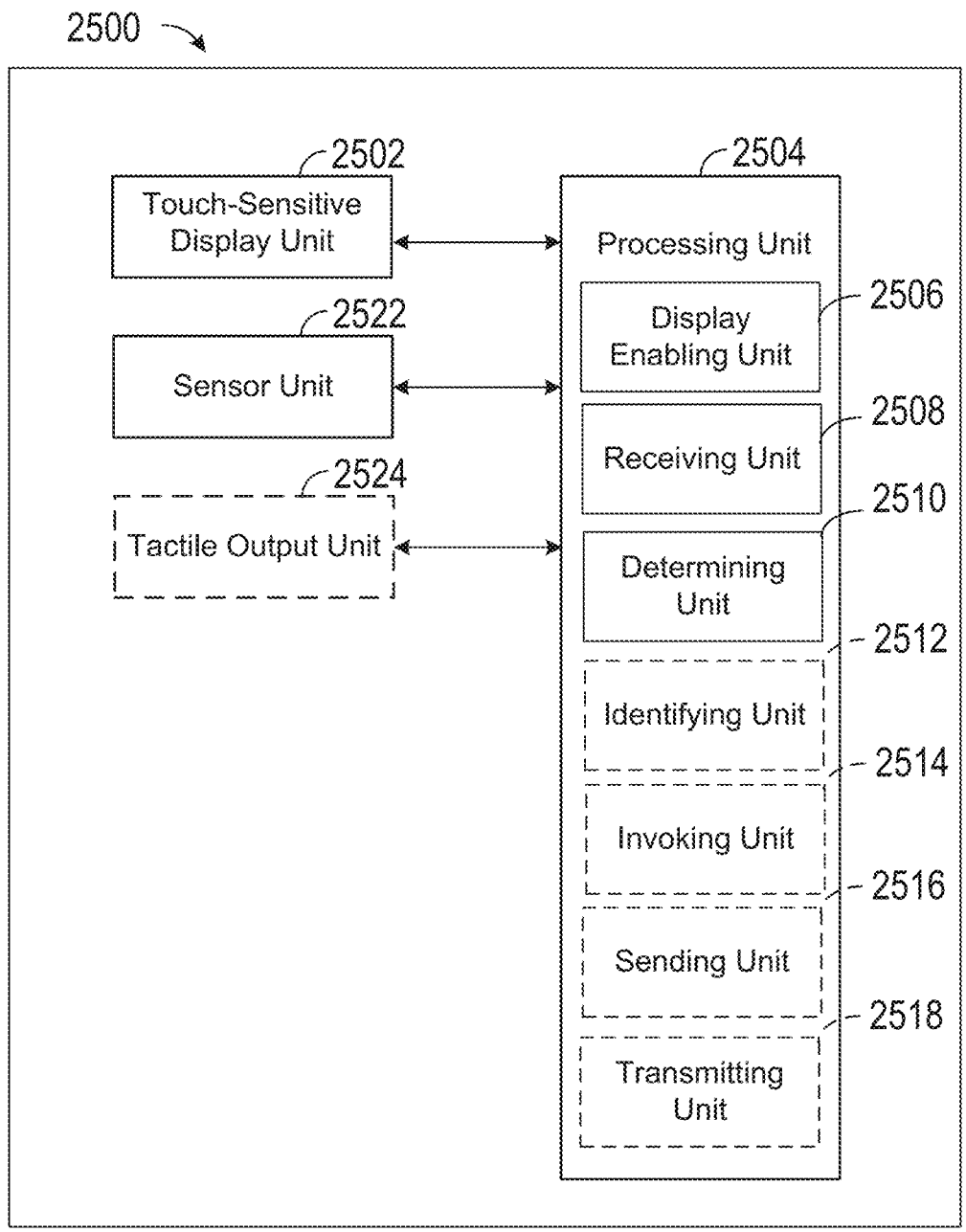
FIG. 25 illustrates a function block diagram of an electronic device in accordance with some embodiments.

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes a touch-sensitive display unit 2502 configured to detect the intensity of contacts with the touch-sensitive display unit 2502 and optionally one or more sensor units 2522 and a tactile output unit 2524. The one or more sensor units 2522 may be configured to detect the intensity of contacts, for instance, with the touch-sensitive display 2522 and/or the touch-sensitive display unit 2502 and the tactile output unit 2524 may be configured to provide haptic outputs, for instance, in response to user inputs. The electronic device 250 further may include a processing unit 2504 coupled to the touch-sensitive display unit 2502, the one or more sensor units 2522, and the tactile output unit 2524. In some embodiments the processing unit 2504 includes one or more of a display enabling unit 2506, a receiving unit 2508, a determining unit 2510, an identifying unit 2512, an invoking unit 2514, a sending unit 2516, and a transmitting unit 2518.

In some embodiments, the processing unit 2504 is configured to: enable display (e.g., with the display enabling unit 2506) of a plurality of icons representing applications, including an icon representing a remote control application; receive (e.g., with the receiving unit 2508) a first contact on the touch-sensitive display at a location of the icon; determine (e.g., with the determining unit 2510) whether a target device out of a plurality of target devices is responsive to remote control. The processing unit 2504 is further configured to, in response to the first contact and a determination of the target device being responsive to remote control: enable display (e.g., with the display enabling unit 2506) of a first plurality of remote controls for the target device; while enabling display of the first plurality of remote controls, receive (e.g., with the receiving unit 2508) of a second contact on the touch-sensitive display, the second contact having a maximum intensity; in response to receiving the second contact and a determination that the maximum intensity is below a threshold intensity, instruct the target device to perform an operation; and in response to receiving the second contact and a determination that the maximum intensity is above the threshold intensity, enable display (e.g., with the display enabling unit 2506) of a second plurality of remote controls for the first target device.

In some embodiments, the processing unit 2504 is configured to: enable display (e.g., with the display enabling unit 2506) of a user interface object on the touch-sensitive display of the electronic device, wherein the displayed user interface object represents a remote control application; receive data (e.g., with the receiving unit 2508) representing a selection on the displayed user interface object; identify (e.g., with the identifying unit 2512) a target device, out of a plurality of target devices, that is responsive to remote control; and in response to receiving the data representing the selection, enable display (e.g., with the display enabling unit 2506) of a plurality of graphical user interface objects for controlling operations of the identified target device.

In some embodiments, the processing unit 2504 is further configured to: in response to an identification that no target device is responsive to remote control, enable display (e.g., with the display enabling unit 2506) of a plurality of graphical user interface objects representing the plurality of target devices.

In some embodiments, the touch-sensitive display unit includes one or more sensor units to detect the intensity of contacts with the touch-sensitive display, the data representing the selection is a first data, the target device is a first target device. The processing unit is further configured to: receive (e.g., with the receiving unit 2508) second data representing a second contact at a location on the touch-sensitive display, the second contact having a maximum intensity above a threshold intensity; and in response to the second contact, invoke (e.g., with the invoking unit 2514) a user interface for registering a second target electronic device with the electronic device.

In some embodiments, the touch-sensitive display unit includes one or more sensor units to detect the intensity of contacts with the touch-sensitive display, the data representing the selection is a first data, the target device is a first target device. Further, the processing unit 2504 is further configured to: receive (e.g., with the receiving unit 2508) second data representing a second contact at a location on the touch-sensitive display, the second contact having a maximum intensity below a threshold intensity, the location associated with an operation of the first target device; in response to the second contact, send (e.g., with the sending unit 2516) an instruction to the target device instructing the target device to perform the operation; receive (e.g., with the receiving unit 2508) third data representing a third contact on the display, the third contact having a maximum intensity above the threshold intensity; and in response to the third contact, enable display (e.g., with the display enabling unit 2506) of a user interface for registering a second target device with the remote control application.

In some embodiments, the data representing the selection is a first data. Further, the processing unit 2504 is further configured to: send (e.g., with the sending unit 2516), from the electronic device to an intermediate electronic device, data representing an instruction instructing the target device to perform the operation, and the instruction is communicated by the intermediate electronic device to the target device.

In some embodiments, the intermediate electronic device is a phone.

In some embodiments, the processing unit 2504 is configured to identify (e.g., with the identifying unit 2512) a target device by receiving network service information sent by the target device.

In some embodiments, the processing unit 2504 is configured to identify (e.g., with the identifying unit 2512) the target device by transmitting (e.g., via a transmitting unit 2518) a request message and receiving (e.g., with the receiving unit 2508) an acknowledgement message sent by the target device, wherein the acknowledge message was sent by the target device in response to the request message.

In some embodiments, the target device is responsive to remote control when the target device is executing an application having an operation that can be requested using the remote control application.

In some embodiments, the application executing on the target device is executing in the background.

In some embodiments, the target device is a device other than the electronic device.

In some embodiments, the plurality of graphical user interface objects includes transport controls.

In some embodiments, the processing unit 2504 is configured to determine (e.g., with the determining unit 2510) the plurality of graphical user interface objects based on the identified target device.

In some embodiments, the plurality of graphical user interface objects is shared by the identified target device and at least one other device of the plurality of target devices.

The operations described above with reference to FIG. 15A are, optionally, implemented by components depicted in FIG. 1A-1B, 6, 19, 20, or 25. For example, displaying operations 1510, 1540, and 1550; receiving operation 1520; and identifying operation 1530 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
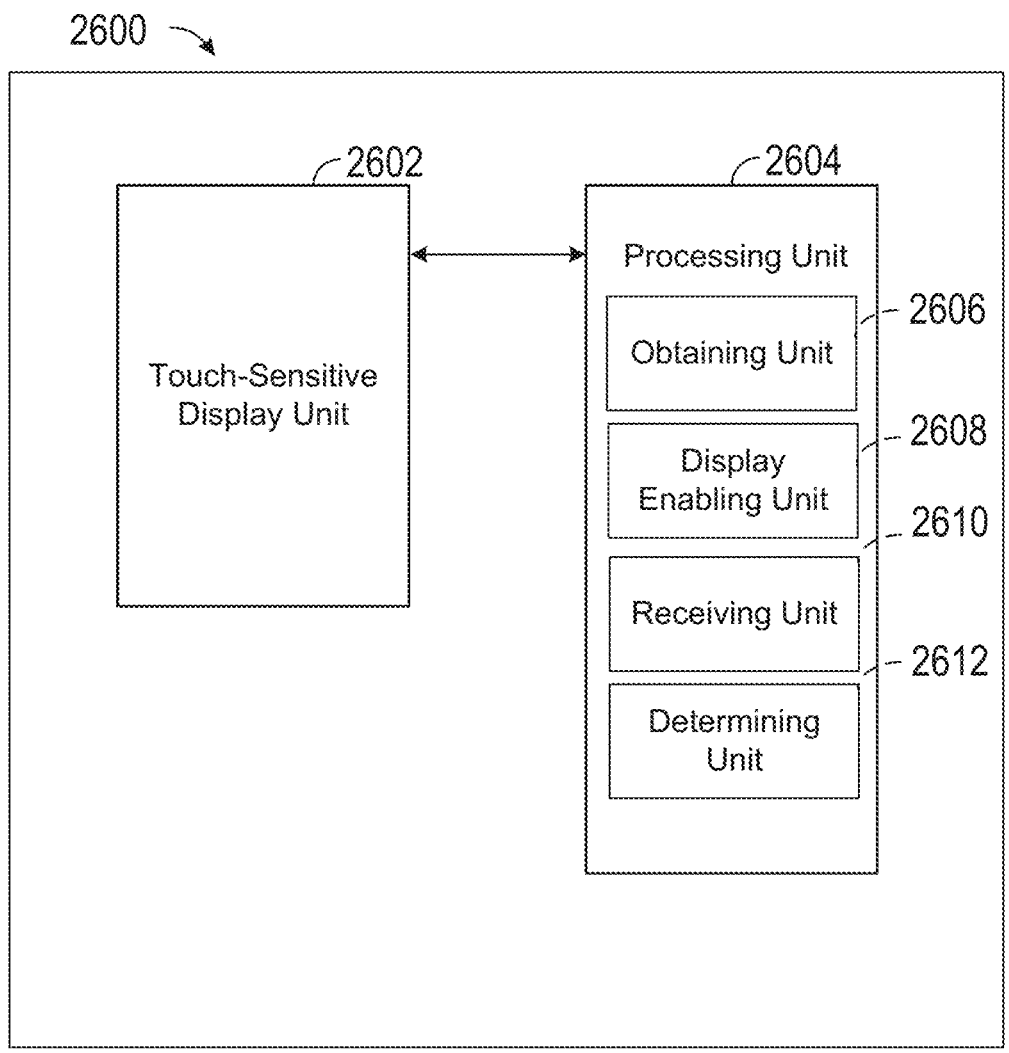
FIG. 26 illustrates a function block diagram of an electronic device in accordance with some embodiments.

In accordance with some embodiments, FIG. 26 shows an exemplary functional block diagram of an electronic device 2600 configured in accordance with the principles of the various described embodiments. In accordance with some embodiments, the functional blocks of electronic device 2600 are configured to perform the techniques described above. The functional blocks of the device 2600 are, optionally, implemented by hardware, software, or a combination of hardware and software to carry out the principles of the various described examples. It is understood by persons of skill in the art that the functional blocks described in FIG. 26 are, optionally, combined or separated into sub-blocks to implement the principles of the various described examples. Therefore, the description herein optionally supports any possible combination or separation or further definition of the functional blocks described herein.

As shown in FIG. 26, an electronic device 2600 includes a touch-sensitive display unit 2602, and a processing unit 2604 coupled to the touch-sensitive display unit 2602. The processing unit 2604 includes an obtaining unit 2606, a display enabling unit 2608, a receiving unit 2610, and a determining unit 2612.

The processing unit 2604 is configured to: obtain (e.g., with the obtaining unit 2606) data representing a plurality of target devices; enable display (e.g., with the display enabling unit 2608) of a user interface object representing a remote control application; receive (e.g., with the receiving unit 2610) data representing a selection on the displayed user interface object; and determine (e.g., with the determining unit 2612) whether the number of target devices exceeds a threshold; in accordance with a determination that the number exceeds the threshold, enable display (e.g., with the display enabling unit 2608) of a plurality of graphical user interface objects representing categories of target devices, in response to receiving the data, and in accordance with a determination that the number does not exceed the threshold, enable display (e.g., with the display enabling unit 2608) of a plurality of graphical user interface objects representing the plurality of target devices, in response to receiving the data.

The operations described above with reference to FIG. 16 are, optionally, implemented by components depicted in FIG. 1A-1B, 6, 19, 20, or 26. For example, obtaining operation 1610; displaying operations 1620, 1650, and 1660; receiving operation 1630; and determining operation 1640 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 27:
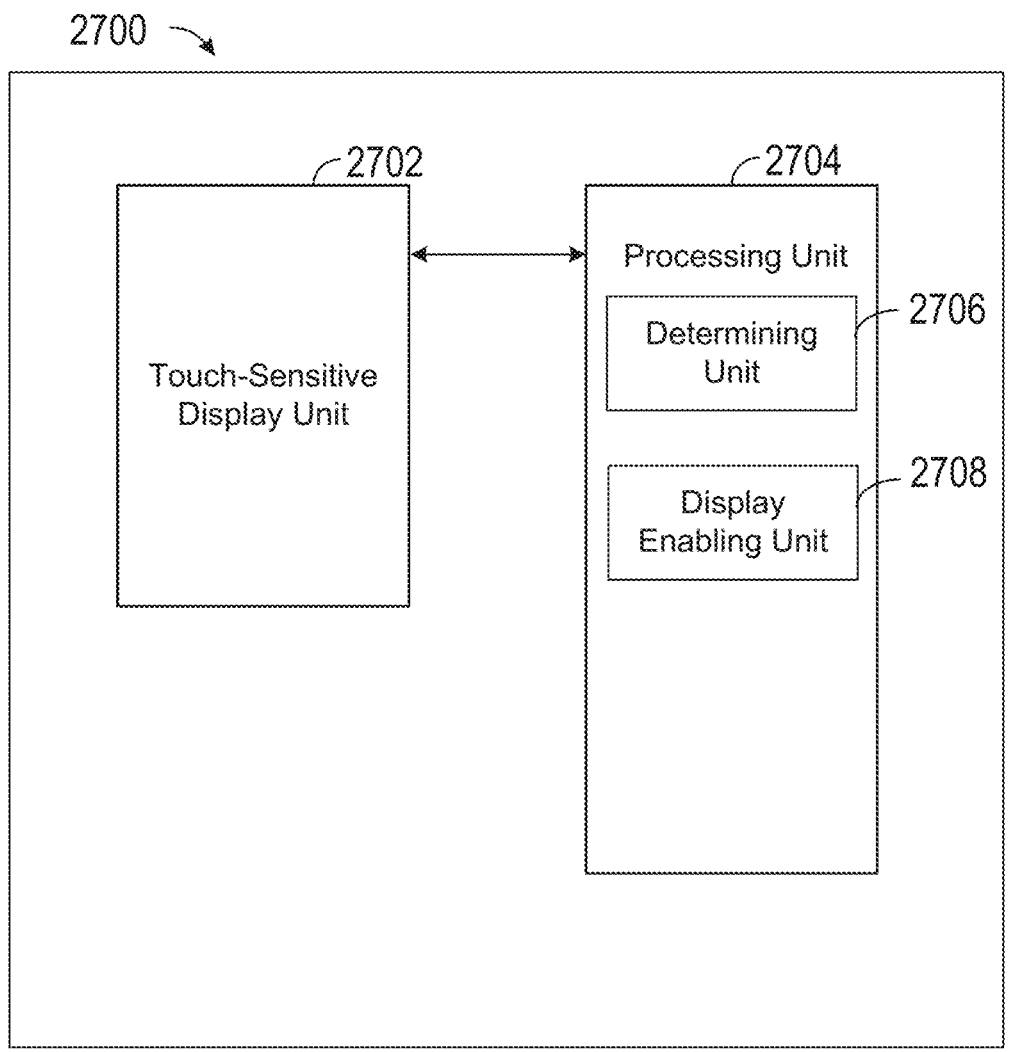
FIG. 27 illustrates a function block diagram of an electronic device in accordance with some embodiments.

In accordance with some embodiments, FIG. 27 shows an exemplary functional block diagram of an electronic device 2700 configured in accordance with the principles of the various described embodiments. In accordance with some embodiments, the functional blocks of electronic device 2700 are configured to perform the techniques described above. The functional blocks of the device 2700 are, optionally, implemented by hardware, software, or a combination of hardware and software to carry out the principles of the various described examples. It is understood by persons of skill in the art that the functional blocks described in FIG. 27 are, optionally, combined or separated into sub-blocks to implement the principles of the various described examples. Therefore, the description herein optionally supports any possible combination or separation or further definition of the functional blocks described herein.

As shown in FIG. 27, an electronic device 2700 includes a touch-sensitive display unit 2702, and a processing unit 2704 coupled to the touch-sensitive display unit 2702. The processing unit 2704 includes a determining unit 2706, and a display enabling unit 2708.

The processing unit 2704 is configured to: determine (e.g., with determining unit 2706) the location of a target device relative to the electronic device; and enable display (e.g., with display enabling unit 2708), on the touch-sensitive display unit, of a user interface object representing the target device, the target device is nearby, and the display position of the user interface object, on the touch-sensitive display, is based on the location of the target device relative to the electronic device.

In some embodiments, the processing unit 2704 is further configured to enable display (e.g., with the display enabling unit 2708) of the user interface object on the top half of the touch-sensitive display unit when the location of the target device is in front of a user of the electronic device.

In some embodiments, the processing unit 2704 is further configured to determine (e.g., with the determining unit 2706) a distance between the target device and the electronic device and the processing unit is configured to enable display (e.g., with display enabling unit 2708) of the user interface object at a size that is inversely proportional to the determined distance.

The operations described above with reference to FIG. 17 are, optionally, implemented by components depicted in FIG. 1A-1B, 6, 19, 20, or 27. For example, determining operation 1710 and displaying operation 1720 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 28:
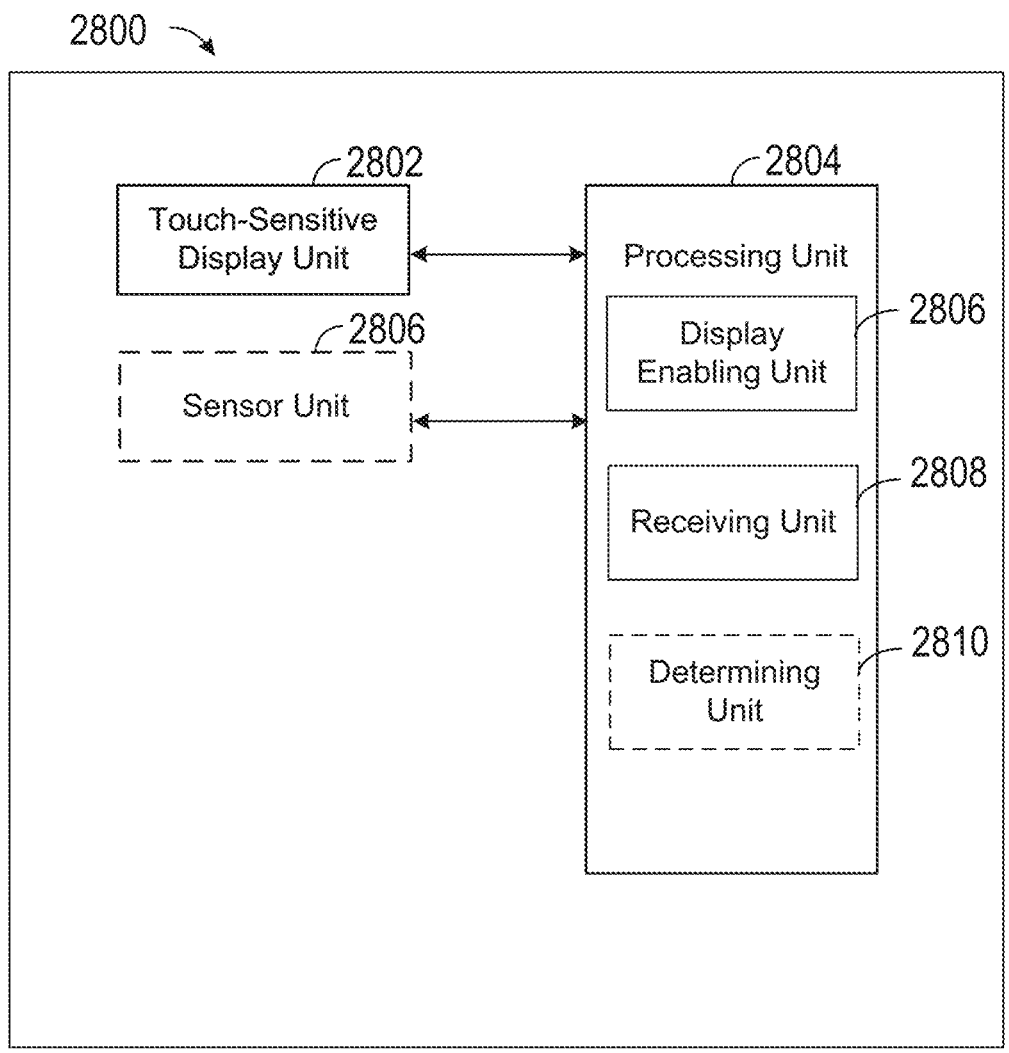
FIG. 28 illustrates a function block diagram of an electronic device in accordance with some embodiments.

In accordance with some embodiments, FIG. 28 shows an exemplary functional block diagram of an electronic device 2800 configured in accordance with the principles of the various described embodiments. In accordance with some embodiments, the functional blocks of electronic device 2800 are configured to perform the techniques described above. The functional blocks of the device 2800 are, optionally, implemented by hardware, software, or a combination of hardware and software to carry out the principles of the various described examples. It is understood by persons of skill in the art that the functional blocks described in FIG. 28 are, optionally, combined or separated into sub-blocks to implement the principles of the various described examples. Therefore, the description herein optionally supports any possible combination or separation or further definition of the functional blocks described herein.

As shown in FIG. 28, an electronic device 2800 includes a touch-sensitive display unit 2802, optionally one or more sensor units 2806 to detect the intensity of contacts, for instance, with the touch-sensitive display, and a processing unit 2804 coupled to the touch-sensitive display unit 2802 and, optionally, the one or more sensor units 2806. The processing unit 2804 includes a display enabling unit 2806, a receiving unit 2808 and a determining unit 2810.

The processing unit configured to: enable display (e.g., with display enabling unit 2806) of a user interface object on the touch-sensitive display of the electronic device, the displayed user interface object representing a remote control application; receive (e.g., with the receiving unit 2808) first data representing a zoom function on the displayed user interface object; and in response to receiving the first data representing the zoom function, enable display of an affordance including indication of nearby target devices capable of being remotely controlled.

In some embodiments, the indication indicates a number of nearby target devices capable of being remotely controlled.

In some embodiments, the processing unit 2804 is further configured to: receive (e.g., with the receiving unit 2808) second data representing a second selection on the displayed affordance including indication of nearby target devices; and in response to receiving the second data representing the second selection, enable display (e.g., with display enabling unit 2806) of a listing of the nearby target devices capable of being remotely controlled.

In some embodiments, the processing unit 2804 is further configured to: receive (e.g., with the receiving unit 2808) third data representing selection of a target device from the listing of target devices; and in response to receiving the third data representing the selection of the target device, enable display (e.g., with display enabling unit 2806) of a plurality of graphical user interface objects for controlling operations of the selected target device.

In some embodiments, the plurality of graphical user interface objects includes transport controls.

In some embodiments, the plurality of graphical user interface objects are determined based on the selected target device.

In some embodiments, the plurality of graphical user interface objects are shared by the selected target device and at least one other device in the listing of target devices.

In some embodiments, the processing unit 2804 is further configured to: in response to receiving the first data representing the first zoom function, determine (e.g., with the determining unit 2810) a number of nearby target devices capable of being remotely controlled.

In some embodiments, the processing unit 2804 is further configured to: in response to a determination that no nearby target device is capable of being remotely controlled, enable display (e.g., with display enabling unit 2806) of a plurality of graphical user interface objects for controlling operations on the last selected target device.

In some embodiments, the touch-sensitive display unit includes one or more sensor units (e.g., sensor units 2810) to detect the intensity of contacts with the touch-sensitive display. The processing unit 2804 is further configured to: determine (e.g., with the determining unit 2810) the intensity of the third selection, wherein the third selection is a contact with the touch-sensitive display unit; in response to a determination that the intensity of the third selection is greater than a predetermined threshold: enable display (e.g., with display enabling unit 2806) of a user interface for registering an additional target device capable of being remotely controlled by the remote control application; and in response to a determination that the intensity of the third selection is less than the predetermined threshold: enable display (e.g., with display enabling unit 2806) of the listing of the nearby target devices capable of being remotely controlled.

In some embodiments, the processing unit 2804 is further configured to: receive (e.g., with the receiving unit 2808) data representing a fourth selection on the touch-sensitive display, wherein the fourth selection is a contact on the touch-sensitive display; determine (e.g., with the determining unit 2810) the intensity of the fourth selection; and in response to a determination that the intensity of the fourth selection is greater than the predetermined threshold: enable display (e.g., with the display enabling unit 2806) of a user interface for viewing the settings associated with the remote control application.

In some embodiments, the nearby target devices capable of being remotely controlled include target devices registered with the electronic device.

In some embodiments, the nearby target devices capable of being remotely controlled include target devices responsive to remote control.

In some embodiments, the nearby target devices capable of being remotely controlled include target devices accessible via a wireless communications interface.

The operations described above with reference to FIG. 18A are, optionally, implemented by components depicted in FIG. 1A-1B, 6, 19, 20, or 28. For example, displaying operations 1810 and 1830 and receiving operation 1820 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 29:
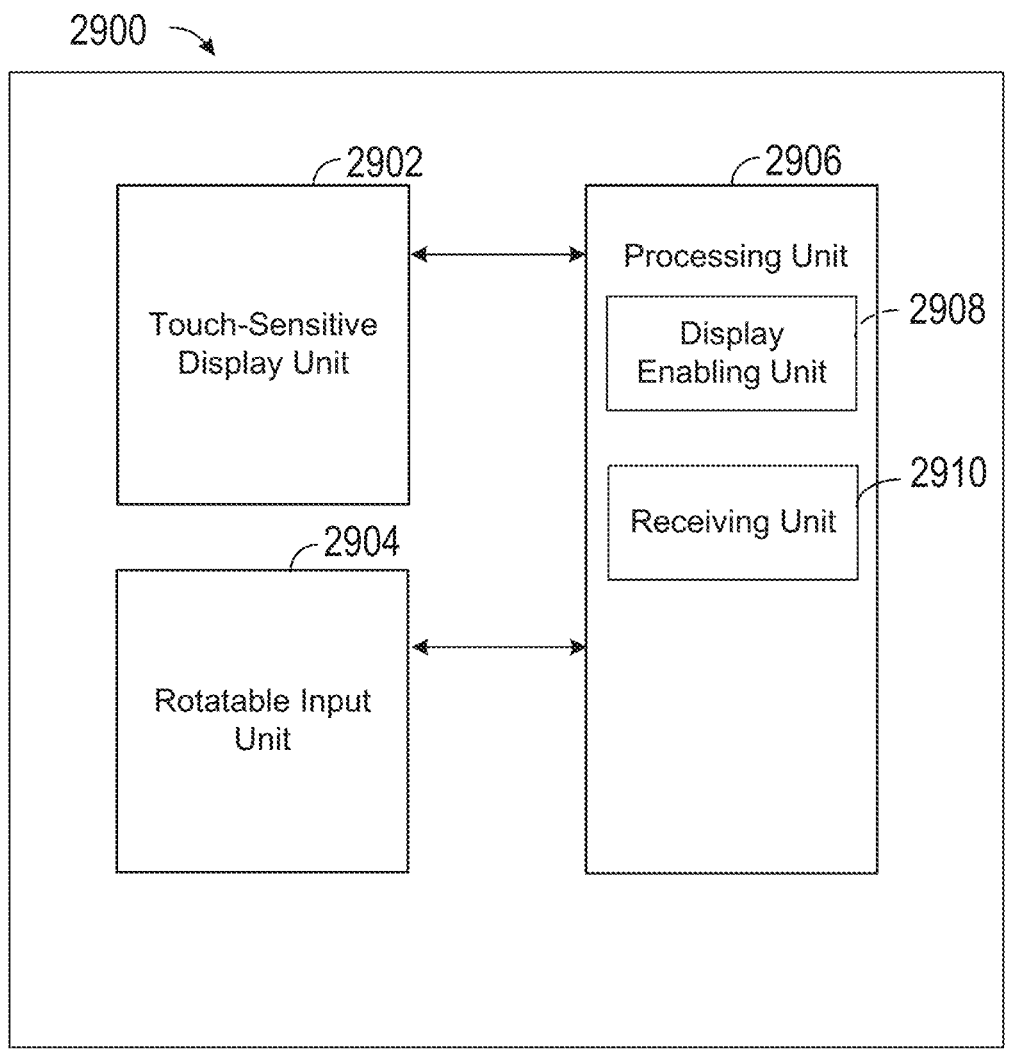
FIG. 29 illustrates a function block diagram of an electronic device in accordance with some embodiments.

In accordance with some embodiments, FIG. 29 shows an exemplary functional block diagram of an electronic device 2900 configured in accordance with the principles of the various described embodiments. In accordance with some embodiments, the functional blocks of electronic device 2900 are configured to perform the techniques described above. The functional blocks of the device 2900 are, optionally, implemented by hardware, software, or a combination of hardware and software to carry out the principles of the various described examples. It is understood by persons of skill in the art that the functional blocks described in FIG. 29 are, optionally, combined or separated into sub-blocks to implement the principles of the various described examples. Therefore, the description herein optionally supports any possible combination or separation or further definition of the functional blocks described herein.

As shown in FIG. 29, an electronic device 2900 includes a touch-sensitive display unit 2902, a rotatable input device unit 2904; and a processing unit 2906 coupled to the touch-sensitive display unit 2902 and the rotatable input device unit 2904. The processing unit 2906 includes a display enabling unit 2908 and a receiving unit 2910.

The processing unit is configured to: enable display (e.g., with display enabling unit 2908) of a plurality of graphical user interface objects, wherein a user interface object of the plurality of graphical user interface objects is an icon representing a remote control application; receive (e.g., with receiving unit 2910) data representing a first movement of the rotatable input device; and in response to receiving the data representing the first movement: enable display (e.g., with display enabling unit 2908) of only a subset of the plurality of graphical user interface objects, the displayed subset of graphical user interface objects includes the icon representing the remote control application, and enable display (e.g., with display enabling unit 2908) of an affordance including indication of nearby target devices capable of being remotely controlled In some embodiments, the affordance indicates a number of nearby target devices capable of being remotely controlled.

In some embodiments, the affordance is displayed within the icon representing the remote control application.

The operations described above with reference to FIG. 18B are, optionally, implemented by components depicted in FIG. 1A-1B, 6, 19, 20, or 29. For example, display operations 1860, 1880, and 1890; and receiving operation 1860 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 30:
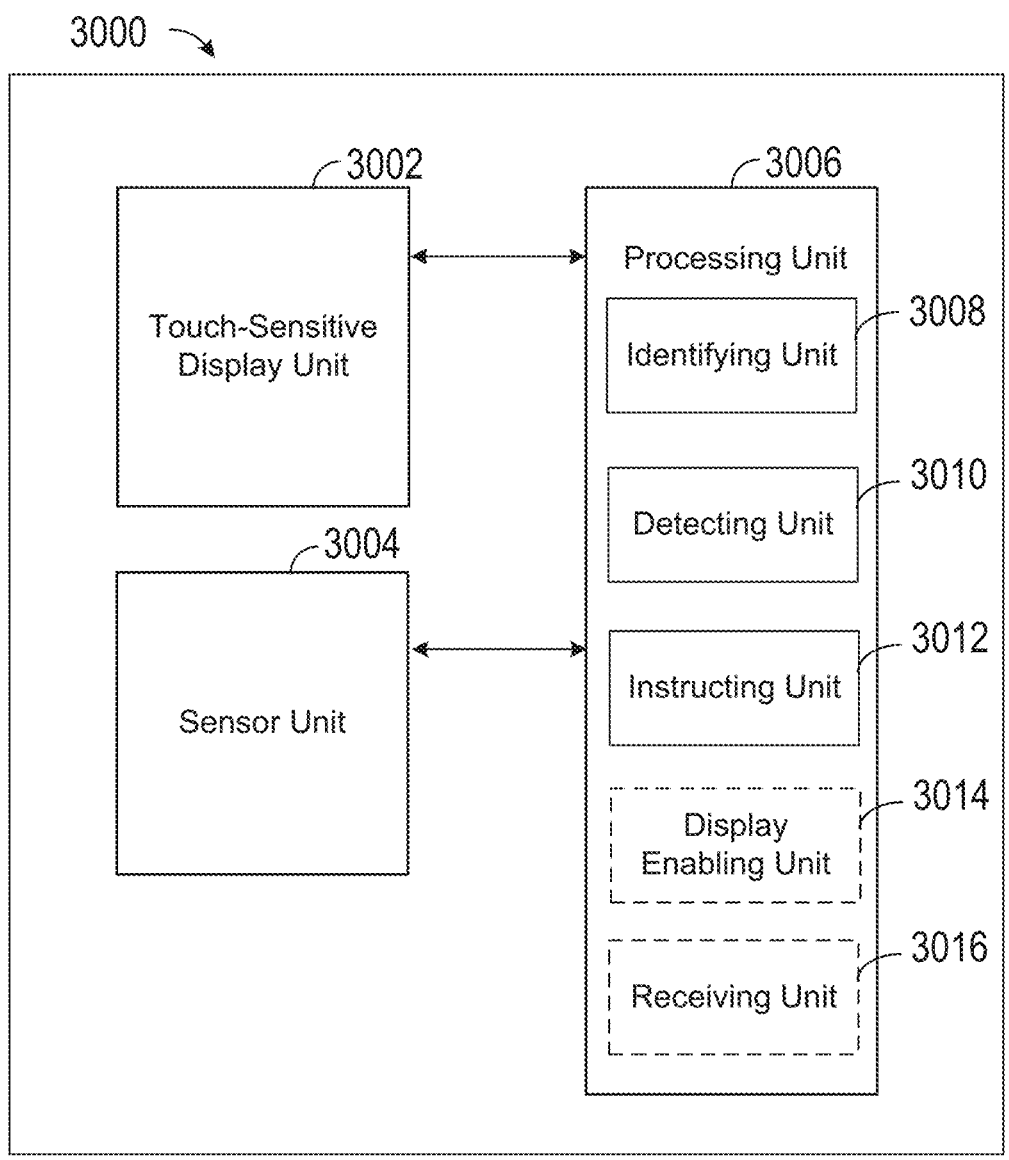
FIG. 30 illustrates a function block diagram of an electronic device in accordance with some embodiments.

In accordance with some embodiments, FIG. 30 shows an exemplary functional block diagram of an electronic device 3000 configured in accordance with the principles of the various described embodiments. In accordance with some embodiments, the functional blocks of electronic device 3000 are configured to perform the techniques described above. The functional blocks of the device 3000 are, optionally, implemented by hardware, software, or a combination of hardware and software to carry out the principles of the various described examples. It is understood by persons of skill in the art that the functional blocks described in FIG. 30 are, optionally, combined or separated into sub-blocks to implement the principles of the various described examples. Therefore, the description herein optionally supports any possible combination or separation or further definition of the functional blocks described herein.

As shown in FIG. 30, an electronic device 3000 includes a touch-sensitive display unit 3002, one or more sensor units 3004 to detect motion of the electronic device; and a processing unit 3006 coupled to the touch-sensitive display unit 3002 and the or more sensor units 3004. The processing unit 3006 includes one or more of an identifying unit 3008, a detecting unit 3010, an instructing unit 3012, a display enabling unit 3014, and a receiving unit 3016.

The processing unit is configured to: identify (e.g., with the identifying unit 3008) a target device that is responsive to remote control out of a plurality of target devices; detect (e.g., with the detecting unit 3010) a raise gesture based on detected motion of the electronic device; and in response to detecting the raise gesture, instruct (e.g., with the instructing unit 3012) the target device to perform an operation.

In some embodiments, the processing unit is further configured to: enable display (e.g., with display enabling unit 3014) of a plurality of icons representing applications, including an icon representing a remote control application; and receive (e.g., with receiving unit 3016) a first contact on the touch-sensitive display at a location of the icon, where at least one of identifying the target device that is responsive to remote control and detecting the raise gesture occurs after receiving the first contact.

In some embodiments, instructing (e.g., with the instructing unit 3012) the target device includes instructing the target device to pause or stop an operation.

In some embodiments, instructing (e.g., with the instructing unit 3012) the target device includes instructing the target device to pause or stop playback of audio and/or visual content.

In some embodiments, identifying (e.g., with the identifying unit 3008) the target device that is responsive to remote control includes identifying a target device that performs audio and/or visual playback.

In some embodiments, identifying (e.g., with the identifying unit 3008) the target device that is responsive to remote control includes identifying a television or a television set-top media playback device.

In some embodiments, identifying (e.g., with the identifying unit 3008) a target device includes receiving network service information sent by the target device.

In some embodiments, the processing unit 3010 is further configured to: enable display (e.g., with the display enabling unit 3014) of a plurality of graphical user interface objects for controlling operations of the identified target device.

The operations described above with reference to FIG. 24 are, optionally, implemented by components depicted in FIG. 1A-1B, 6, 19, 20, or 30. For example, obtaining operation 1610; displaying operations 1620, 1650, and 1660; receiving operation 1630; and determining operation 1640 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 31:
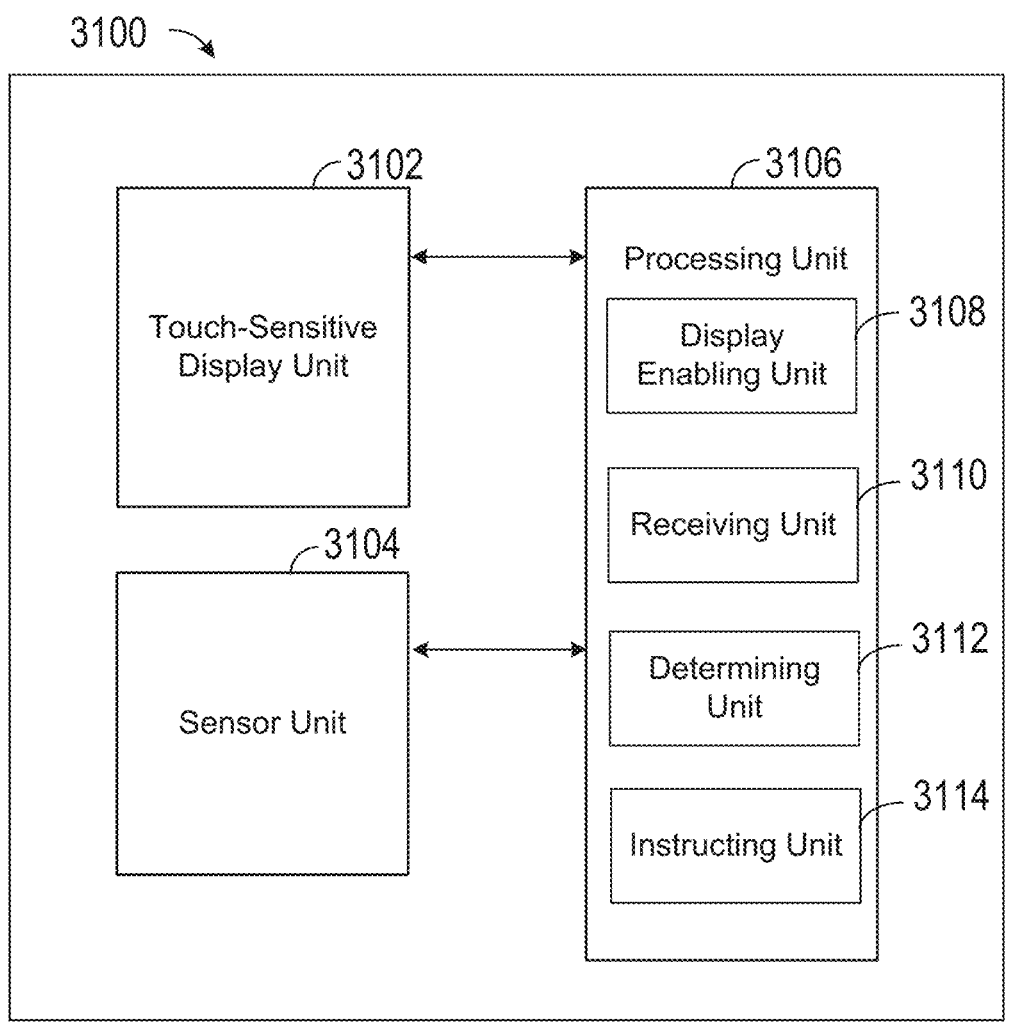
FIG. 31 illustrates a function block diagram of an electronic device in accordance with some embodiments.

In accordance with some embodiments, FIG. 31 shows an exemplary functional block diagram of an electronic device 3100 configured in accordance with the principles of the various described embodiments. In accordance with some embodiments, the functional blocks of electronic device 3100 are configured to perform the techniques described above. The functional blocks of the device 3100 are, optionally, implemented by hardware, software, or a combination of hardware and software to carry out the principles of the various described examples. It is understood by persons of skill in the art that the functional blocks described in FIG. 31 are, optionally, combined or separated into sub-blocks to implement the principles of the various described examples. Therefore, the description herein optionally supports any possible combination or separation or further definition of the functional blocks described herein.

As shown in FIG. 31, an electronic device 3100 includes a touch-sensitive display unit 3002, one or more sensor units 3004 to detect motion of the electronic device; and a processing unit 3006 coupled to the touch-sensitive display unit 3102 and the or more sensor units 3004. The processing unit 3106 includes one or more of a display enabling unit 3108, a receiving unit 3110, a determining unit 3112, and an instructing unit 3116.

The processing unit 3106 is configured to display (e.g., with the display enabling unit 3108) a plurality of icons representing applications, including an icon representing a remote control application; receive (e.g., with the receiving unit 3110) a first contact on the touch-sensitive display at a location of the icon; determine whether a target device out of a plurality of target devices is responsive to remote control; in response to the first contact and a determination of the target device being responsive to remote control: enable display (e.g., with the display enabling unit 3108) of a first plurality of remote controls for the target device; while enabling display of the first plurality of remote controls, receive (e.g., with the receiving unit 3110) a second contact on the touch-sensitive display, the second contact having a maximum intensity; in response to receiving the second contact and a determination that the maximum intensity is below a threshold intensity, instruct (e.g., with the instructing unit 3116) the target device to perform an operation; and in response to receiving the second contact and a determination that the maximum intensity is above the threshold intensity, enable display (e.g., with the display enabling unit 3108) of a second plurality of remote controls for the first target device.

The operations described above with reference to FIG. 15B are, optionally, implemented by components depicted in FIG. 1A-1B, 6, 19, 20, or 30. For example, displaying operations 1565, 1580, 1595; receiving operations 1570 and 1585; determining operation 1575, and instructing operation 1590 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
one or more sensors;
one or more processors;
a display;
a memory; and
one or more programs, wherein the one or more programs are stored in the memory and configured to be executed by the one or more processors, the one or more programs including instructions for:
associating the electronic device with one or more target devices that are responsive to remote control out of a plurality of target devices, wherein the plurality of target devices includes a first target device and a second target device;
detecting, via the one or more sensors, a single gesture that is motion of the electronic device; and
in response to detecting the single gesture that is motion of the electronic device:
displaying, on the display, a first set of one or more graphical user interface objects representing controls for the one or more target devices;
in accordance with a determination that the electronic device is associated with the first target device, instructing the first target device to perform an operation; and
in accordance with a determination that the electronic device is associated with the first target device and the second target device, concurrently instructing the first target device and the second target device to perform the operation.

2. The electronic device of claim 1, wherein the display of the electronic device includes a touch-sensitive display, the one or more programs further including instructions for:
displaying a plurality of icons representing applications, including an icon representing a remote control application; and
receiving a first contact on the touch-sensitive display at a location of the icon,
wherein at least one of associating the electronic device with one or more target devices that are responsive to remote control and detecting the single gesture that is motion of the electronic device occurs after receiving the first contact.

3. The electronic device of claim 1, wherein instructing the first target device comprises instructing the first target device to pause or stop an operation; and
wherein concurrently instructing the first target device and second target device comprises concurrently instructing the first target device and the second target device to pause or stop an operation.

4. The electronic device of claim 1, wherein instructing the first target device comprises instructing the first target device to pause or stop playback of audio and/or visual content; and
wherein concurrently instructing the first target device and second target device comprises concurrently instructing the first target device and the second target device to pause or stop playback of audio and/or visual content.

5. The electronic device of claim 1, wherein associating the electronic device with one or more target devices that are responsive to re comprises identifying target devices that perform audio and/or visual playback.

6. The electronic device of claim 1, wherein associating the electronic device with one or more target devices that are responsive to remote control comprises identifying television or television set-top media playback devices.

7. The electronic device of claim 1, wherein associating the electronic device with one or more target devices that are responsive to remote control comprises receiving network service information sent by the one or more target devices.

8. The electronic device of claim 1, the one or more programs further including instructions for:
prior to detecting the single gesture that is motion of the electronic device, displaying, via the display, a second set of one or more graphical user interface objects for controlling operations of the one or more associated target devices.

9. The electronic device of claim 1, wherein associating the electronic device with one or more target devices that are responsive to remote control comprises:
receiving a user input; and
selecting the one or more target devices that are responsive to remote control based on the user input.

10. The electronic device of claim 1, wherein the single gesture that is motion of the electronic device is a raise gesture.

11. The electronic device of claim 1, the one or more programs further including instructions for:
prior to detecting the single gesture that is motion of the electronic device, displaying, via the display, a graphical representation of the one or more target device that are responsive to remote control.

12. The electronic device of claim 1, the one or more programs further including instructions for:
prior to detecting the single gesture that is motion of the electronic device:
detecting a second plurality of target devices in proximity to the electronic device;
in accordance with a determination that a third target device of the second plurality of target devices is closest to the electronic device, displaying, via the display, a graphical representation of the third target device; and
in accordance with a determination that a fourth target device, different from the third target device, of the second plurality of target devices is closest to the electronic device, displaying, via the display, a graphical representation of the fourth target device.

13. The electronic device of claim 12, wherein:
displaying the graphical representation of the third target device includes:
displaying the graphical representation of the third target device at a first size; and
displaying the graphical representation of the fourth target device at a second size that is smaller than the first size; and
displaying the graphical representation of the fourth target device includes:
displaying the graphical representation of the fourth target device at the first size; and
displaying the graphical representation of the third target device at the second size.

14. The electronic device of claim 12, wherein the displayed graphical representation is of a respective target device that is responsive to remote control that is selected.

15. A method, comprising:
at an electronic device with a display and one or more sensors:
associating the electronic device with one or more target devices that are responsive to remote control out of a plurality of target devices, wherein the plurality of target devices includes a first target device and a second target device;
detecting, via the one or more sensors, a single gesture that is motion of the electronic device; and
in response to detecting the single gesture that is motion of the electronic device:
displaying, on the display, a first set of one or more graphical user interface objects representing controls for the one or more target devices;
in accordance with a determination that the electronic device is associated with the first target device, instructing the first target device to perform an operation; and
in accordance with a determination that the electronic device is associated with the first target device and the second target device, concurrently instructing the first target device and the second target device to perform the operation.

16. The method of claim 15, wherein the display of the electronic device includes a touch-sensitive display, the method further comprising:
displaying a plurality of icons representing applications, including an icon representing a remote control application; and
receiving a first contact on the touch-sensitive display at a location of the icon,
wherein at least one of associating the electronic device with one or more target devices that are responsive to remote control and detecting the single gesture that is motion of the electronic device occurs after receiving the first contact.

17. The method of claim 15, wherein instructing the first target device comprises instructing the first target device to pause or stop an operation; and
wherein concurrently instructing the first target device and second target device comprises concurrently instructing the first target device and the second target device to pause or stop an operation.

18. The method of claim 15, wherein instructing the first target device comprises instructing the first target device to pause or stop playback of audio and/or visual content; and
wherein concurrently instructing the first target device and second target device comprises concurrently instructing the first target device and the second target device to pause or stop playback of audio and/or visual content.

19. The method of claim 15, wherein associating the electronic device with one or more target devices that are responsive to remote control comprises identifying target devices that perform audio and/or visual playback.

20. The method of claim 15, wherein associating the electronic device with one or more target devices that are responsive to remote control comprises identifying television or television set-top media playback devices.

21. The method of claim 15, wherein associating the electronic device with one or more target devices that are responsive to remote control comprises receiving network service information sent by the one or more target devices.

22. The method of claim 15, further comprising:
prior to detecting the single gesture that is motion of the electronic device, displaying, via the display, a second set of one or more graphical user interface objects for controlling operations of the one or more associated target devices.

23. The method of claim 15, wherein associating the electronic device with one or more target devices that are responsive to remote control comprises:
receiving a user input; and
selecting the one or more target devices that are responsive to remote control based on the user input.

24. The method of claim 15, wherein the single gesture that is motion of the electronic device is a raise gesture.

25. The method of claim 15, further comprising:
prior to detecting the single gesture that is motion of the electronic device, displaying, via the display, a graphical representation of the one or more target device that are responsive to remote control.

26. The method of claim 15, further comprising:
prior to detecting the single gesture that is motion of the electronic device:
detecting a second plurality of target devices in proximity to the electronic device;
in accordance with a determination that a third target device of the second plurality of target devices is closest to the electronic device, displaying, via the display, a graphical representation of the third target device; and
in accordance with a determination that a fourth target device, different from the third target device, of the second plurality of target devices is closest to the electronic device, displaying, via the display, a graphical representation of the fourth target device.

27. The method of claim 26, wherein:
displaying the graphical representation of the third target device includes:
displaying the graphical representation of the third target device at a first size; and
displaying the graphical representation of the fourth target device at a second size that is smaller than the first size; and
displaying the graphical representation of the fourth target device includes:
displaying the graphical representation of the fourth target device at the first size; and
displaying the graphical representation of the third target device at the second size.

28. The method of claim 26, wherein the displayed graphical representation is of a respective target device that is responsive to remote control that is selected.

29. A non-transitory computer readable storage medium storing one or more programs configured to be executed by one or more processors of an electronic device with a display and one or more sensors, the one or more programs including instructions for:
associating the electronic device with one or more target devices that are responsive to remote control out of a plurality of target devices, wherein the plurality of target devices includes a first target device and a second target device;
detecting, via the one or more sensors, a single gesture that is motion of the electronic device; and
in response to detecting the single gesture that is motion of the electronic device:
displaying, on the display, a first set of one or more graphical user interface objects representing controls for the one or more target devices;
in accordance with a determination that the electronic device is associated with the first target device, instructing the first target device to perform an operation; and
in accordance with a determination that the electronic device is associated with the first target device and the second target device, concurrently instructing the first target device and the second target device to perform the operation.

30. The non-transitory computer readable storage medium of claim 29, wherein the display of the electronic device includes a touch-sensitive display, the one or more programs further including instructions for:
displaying a plurality of icons representing applications, including an icon representing a remote control application; and
receiving a first contact on the touch-sensitive display at a location of the icon,
wherein at least one of associating the electronic device with one or more target devices that are responsive to remote control and detecting the single gesture that is motion of the electronic device occurs after receiving the first contact.

31. The non-transitory computer readable storage medium of claim 29, wherein instructing the first target device comprises instructing the first target device to pause or stop an operation; and
wherein concurrently instructing the first target device and second target device comprises concurrently instructing the first target device and the second target device to pause or stop an operation.

32. The non-transitory computer readable storage medium of claim 29, wherein instructing the first target device comprises instructing the first target device to pause or stop playback of audio and/or visual content; and
wherein concurrently instructing the first target device and second target device comprises concurrently instructing the first target device and the second target device to pause or stop playback of audio and/or visual content.

33. The non-transitory computer readable storage medium of claim 29, wherein associating the electronic device with one or more target devices that are responsive to remote control comprises identifying target devices that perform audio and/or visual playback.

34. The non-transitory computer readable storage medium of claim 29, wherein associating the electronic device with one or more target devices that are responsive to remote control comprises identifying television or television set-top media playback devices.

35. The non-transitory computer readable storage medium of claim 29, wherein associating the electronic device with one or more target devices that are responsive to remote control comprises receiving network service information sent by the one or more target devices.

36. The non-transitory computer readable storage medium of claim 29, the one or more programs further including instructions for:
  prior to detecting the single gesture that is motion of the electronic device, displaying, via the display, a second set of one or more graphical user interface objects for controlling operations of the one or more associated target devices.

37. The non-transitory computer readable storage medium of claim 29, wherein associating the electronic device with one or more target devices that are responsive to remote control comprises:
  receiving a user input; and
  selecting the one or more target devices that are responsive to remote control based on the user input.

38. The non-transitory computer readable storage medium of claim 29, wherein the single gesture that is motion of the electronic device is a raise gesture.

39. The non-transitory computer readable storage medium of claim 29, the one or more programs further including instructions for:
  prior to detecting the single gesture that is motion of the electronic device, displaying, via the display, a graphical representation of the one or more target device that are responsive to remote control.

40. The non-transitory computer readable storage medium of claim 29, the one or more programs further including instructions for:
  prior to detecting the single gesture that is motion of the electronic device:
    detecting a second plurality of target devices in proximity to the electronic device;
    in accordance with a determination that a third target device of the second plurality of target devices is closest to the electronic device, displaying, via the display, a graphical representation of the third target device; and
    in accordance with a determination that a fourth target device, different from the third target device, of the second plurality of target devices is closest to the electronic device, displaying, via the display, a graphical representation of the fourth target device.

41. The non-transitory computer readable storage medium of claim 40, wherein:
  displaying the graphical representation of the third target device includes:
    displaying the graphical representation of the third target device at a first size; and
    displaying the graphical representation of the fourth target device at a second size that is smaller than the first size; and
  displaying the graphical representation of the fourth target device includes:
    displaying the graphical representation of the fourth target device at the first size; and
    displaying the graphical representation of the third target device at the second size.

42. The non-transitory computer readable storage medium of claim 40, wherein the displayed graphical representation is of a respective target device that is responsive to remote control that is selected.

* * * * *